United States Patent [19]

Faber

[11] 3,878,514

[45] Apr. 15, 1975

[54] LSI PROGRAMMABLE PROCESSOR

[75] Inventor: Ulbe Faber, Honeybrook, Pa.

[73] Assignee: Burroughs Corporation, Detroit, Mich.

[22] Filed: Nov. 20, 1972

[21] Appl. No.: 307,863

[52] U.S. Cl. .............................................. 340/172.5
[51] Int. Cl. .............................................. G06f 9/16
[58] Field of Search .................................. 340/172.5

[56] References Cited

UNITED STATES PATENTS

| | | | |
|---|---|---|---|
| 3,302,183 | 1/1967 | Bennett et al. | 340/172.5 |
| 3,391,394 | 7/1968 | Ottaway et al. | 340/172.5 |
| 3,700,873 | 10/1972 | Yhap | 340/172.5 |
| 3,736,567 | 5/1973 | Lotan et al. | 340/172.5 |
| 3,745,533 | 7/1973 | Erwin et al. | 340/172.5 |
| 3,760,369 | 9/1973 | Kemp | 340/172.5 |
| 3,768,076 | 10/1973 | Recoque | 340/172.5 |

*Primary Examiner*—Harvey E. Springborn
*Attorney, Agent, or Firm*—Edmund M. Chung; Edward J. Feeney, Jr.; Kevin R. Peterson

[57] ABSTRACT

A microprogrammable serial byte processor suitable for complete implementation of memory, logic, control and addressing functions on a single integrated circuit chip through large scale integration technology. An instruction set, at the microprogrammable level, is provided for controlling the processor in executing basic computer functions. Each instruction of the instruction set has a unique format which is decoded and executed by a circuit design that initially represents minimally committed logic or hardware, and which becomes committed to a specific task by control signals which are decoded from the formatted instructions. Specific circuitry for executing serially by bit the individual instructions of the instruction set is maintained at a simple and minimal level by employing a soft mechine architecture with a microprogramming approach.

9 Claims, 49 Drawing Figures

LITERAL ASSIGNMENT INSTRUCTIONS

FORMATS

MICROPROGRAM MEMORY ADDRESSING

| SUCCESSOR COMMAND | NEXT INSTRUCTION ADDRESS | NEXT CONTENT OF MPCR | NEXT CONTENT OF AMPCR |
|---|---|---|---|
| STEP | MPCR+1 | MPCR+1 | x |
| SKIP | MPCR+2 | MPCR+2 | x |
| SAVE | MPCR+1 | MPCR+1 | MPCR+1 |
| JUMP | AMPCR | AMPCR | x |

x-NOT CHANGED BY SUCCESSOR SPECIFICATION

CONDITION TEST INSTRUCTION

FORMAT

EXTERNAL INSTRUCTION

FORMAT

LOGIC UNIT INSTRUCTION

FORMAT

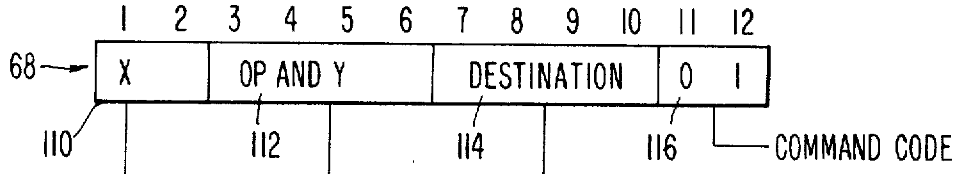

OPERATION AND Y SELECT**

| | |
|---|---|
| 0000 | $X+\bar{B}+1$ |
| 0001 | $X+\bar{B}$ |
| 0010* | X+Z+1 |
| 0011* | X+Z |
| 0100 | X EQV B $(XB \vee \bar{X}\bar{B})$ |
| 0101 | X XOR B $(\bar{X}B \vee X\bar{B})$ |
| 0110 | X-B $(X+\bar{B}+1)$ |
| 0111 | X-B-1 $(X+\bar{B})$ |
| 1000 | X NOR B $(\overline{X \vee B})$ |
| 1001 | X NAN B $(\overline{XB})$ |
| 1010* | X NOR Z $(\overline{X \vee Z})$ |
| 1011* | X NAN Z $(\overline{XZ})$ |
| 1100 | X OR B $(X \vee B)$ |
| 1101 | X AND B (XB) |
| 1110 | X RIM B $(X \vee \bar{B})$ |
| 1111 | X NIM B $(X\bar{B})$ |

DESTINATION

| | |
|---|---|
| 0000 | B |
| 0001 | A1 |
| 0010 | A2 |
| 0011 | A3 |
| 0100 | OUT0,--- |
| 0101 | OUT1 |
| 0110 | OUT2 |
| 0111 | AMPCR,OUT3 |
| 1000# | B, BEX |
| 1001# | A1,BEX |
| 1010# | A2,BEX |
| 1011# | A3,BEX |
| 1100## | B S |
| 1101## | A1 S |
| 1110## | A2 S |
| 1111## | A3 S |

X SELECT

| | |
|---|---|
| 00 | 0 |
| 01 | A1 |
| 10 | A2 |
| 11 | A3 |

* Z=AMPCR. WHEN AMPCR IS NOT SELECTED AS A DESTINATION, THEN AMPCR WILL BE "ZERO" (i.e., Z=0) IN ALL OPERATIONS AS A Y SELECT INPUT.

** Y SELECT=B OR Z AS INDICATED

"BEX" INDICATES SERIAL TRANSFER FROM EXTERNAL IN REGISTER TO B REGISTER WHILE ADDER TRANSFERS TO OTHER SPECIFIED REGISTER (IF B, THEN TWO INPUTS ARE O RED).

"S" INDICATES A ONE-BIT RIGHT SHIFT OF THE DESTINATION REGISTER END OFF, WITH THE MSB BEING FILLED BY THE ADDER OUTPUT.

Fig.6

| tn | tn+1 | |
|---|---|---|
| INPUT D | OUTPUT Q | OUTPUT Q̄ |
| 0 | 0 | 0 |
| 1 | 1 | 0 |

| PRESET | CLEAR | Q |
|---|---|---|
| 1 | 1 | 0 |
| 1 | 0 | 0 |
| 0 | 1 | 1 |
| 0 | 0 | † |

† BOTH OUTPUTS IN 1 STATE n IS TIME PRIOR TO CLOCK n+1 IS TIME FOLLOWING CLOCK

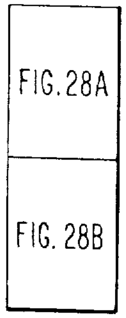
Fig. 28
| ADDRESS INPUTS | | DATA INPUTS | | | | OUTPUT |
|---|---|---|---|---|---|---|
| BIT 1 | BIT 2 | Ø | A1 | A2 | A3 | |
| L | L | L | X | X | X | L |
| L | H | X | L | X | X | L |
| L | H | X | H | X | X | H |
| H | L | X | X | L | X | L |
| H | L | X | X | H | X | H |
| H | H | X | X | X | L | L |
| H | H | X | X | X | H | H |
H = HIGH LEVEL
L = LOW LEVEL
X = IRRELEVANT
Fig. 17
Fig. 28A
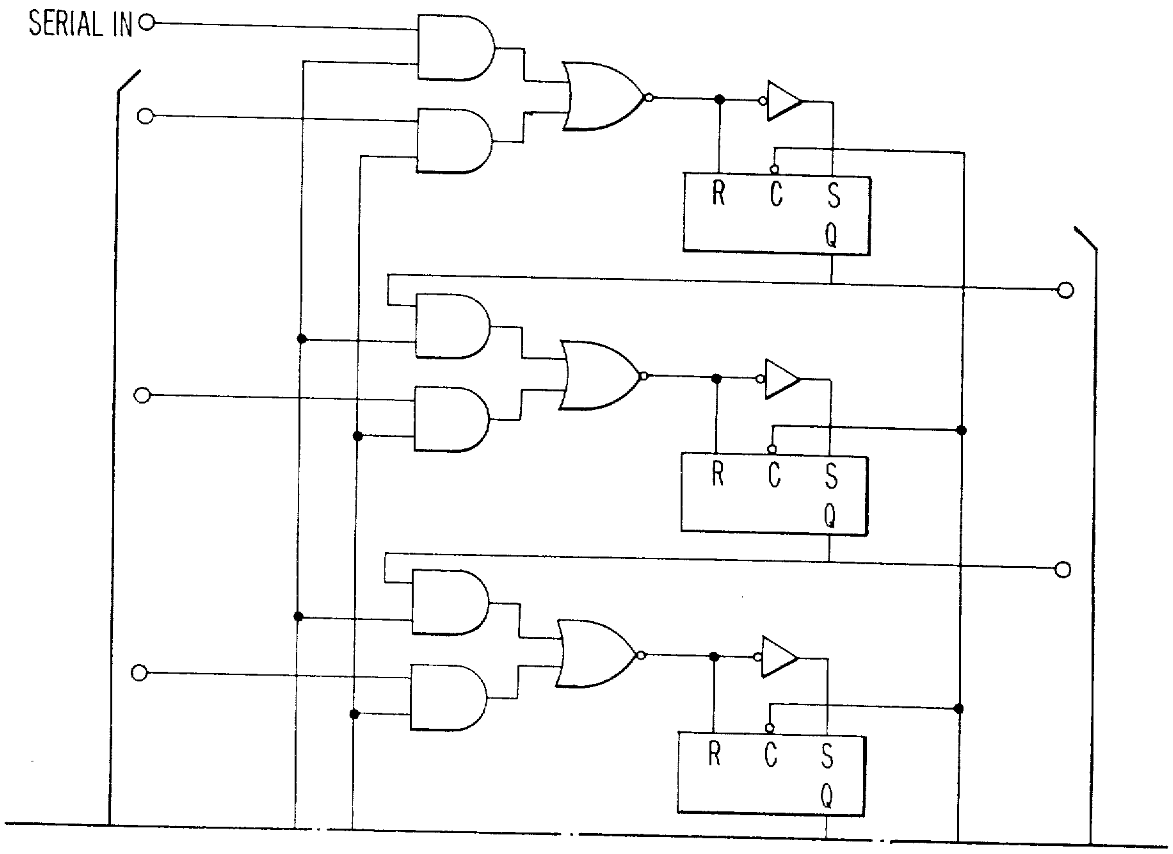

| BIT 10 | BIT 9 | Q0 | Q1 | Q2 | Q3 |
|---|---|---|---|---|---|
| 0 | 0 | 0 | 1 | 1 | 1 |
| 1 | 0 | 1 | 0 | 1 | 1 |
| 0 | 1 | 1 | 1 | 0 | 1 |
| 1 | 1 | 1 | 1 | 1 | 0 |

1 = HIGH STATE
0 = LOW STATE

TRUTH TABLE

| INPUTS | | | | | | | | | | | OUTPUTS | |
|---|---|---|---|---|---|---|---|---|---|---|---|---|
| BIT 3 | BIT 2 | BIT 1 | MST | LC1 | LST | LC3 | AOV | LC2 | ABT | EXT | TRUE | FALSE |
| X | X | X | X | X | X | X | X | X | X | X | 0 | 1 |
| 0 | 0 | 0 | 0 | X | X | X | X | X | X | X | 0 | 1 |
| 0 | 0 | 0 | 1 | X | X | X | X | X | X | X | 1 | 0 |
| 0 | 0 | 1 | X | 0 | X | X | X | X | X | X | 0 | 1 |
| 0 | 0 | 1 | X | 1 | X | X | X | X | X | X | 1 | 0 |
| 0 | 1 | 0 | X | X | 0 | X | X | X | X | X | 0 | 1 |
| 0 | 1 | 0 | X | X | 1 | X | X | X | X | X | 1 | 0 |
| 0 | 1 | 1 | X | X | X | 0 | X | X | X | X | 0 | 1 |
| 0 | 1 | 1 | X | X | X | 1 | X | X | X | X | 1 | 0 |
| 1 | 0 | 0 | X | X | X | X | 0 | X | X | X | 0 | 1 |
| 1 | 0 | 0 | X | X | X | X | 1 | X | X | X | 1 | 0 |
| 1 | 0 | 1 | X | X | X | X | X | 0 | X | X | 0 | 1 |
| 1 | 0 | 1 | X | X | X | X | X | 1 | X | X | 1 | 0 |
| 1 | 1 | 0 | X | X | X | X | X | X | 0 | X | 0 | 1 |
| 1 | 1 | 0 | X | X | X | X | X | X | 1 | X | 1 | 0 |
| 1 | 1 | 1 | X | X | X | X | X | X | X | 0 | 0 | 1 |
| 1 | 1 | 1 | X | X | X | X | X | X | X | 1 | 1 | 0 |

WHEN USED TO INDICATE AN INPUT, X = IRRELEVANT

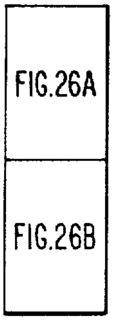
Fig.26
| BIT 4 | BIT 5 | LC1 | LC2 | LC3 |
|---|---|---|---|---|
| 0 | 0 | 0 | 1 | 1 |
| 0 | 1 | 1 | 0 | 1 |
| 1 | 0 | 1 | 1 | 0 |
Fig.25
Fig.26A
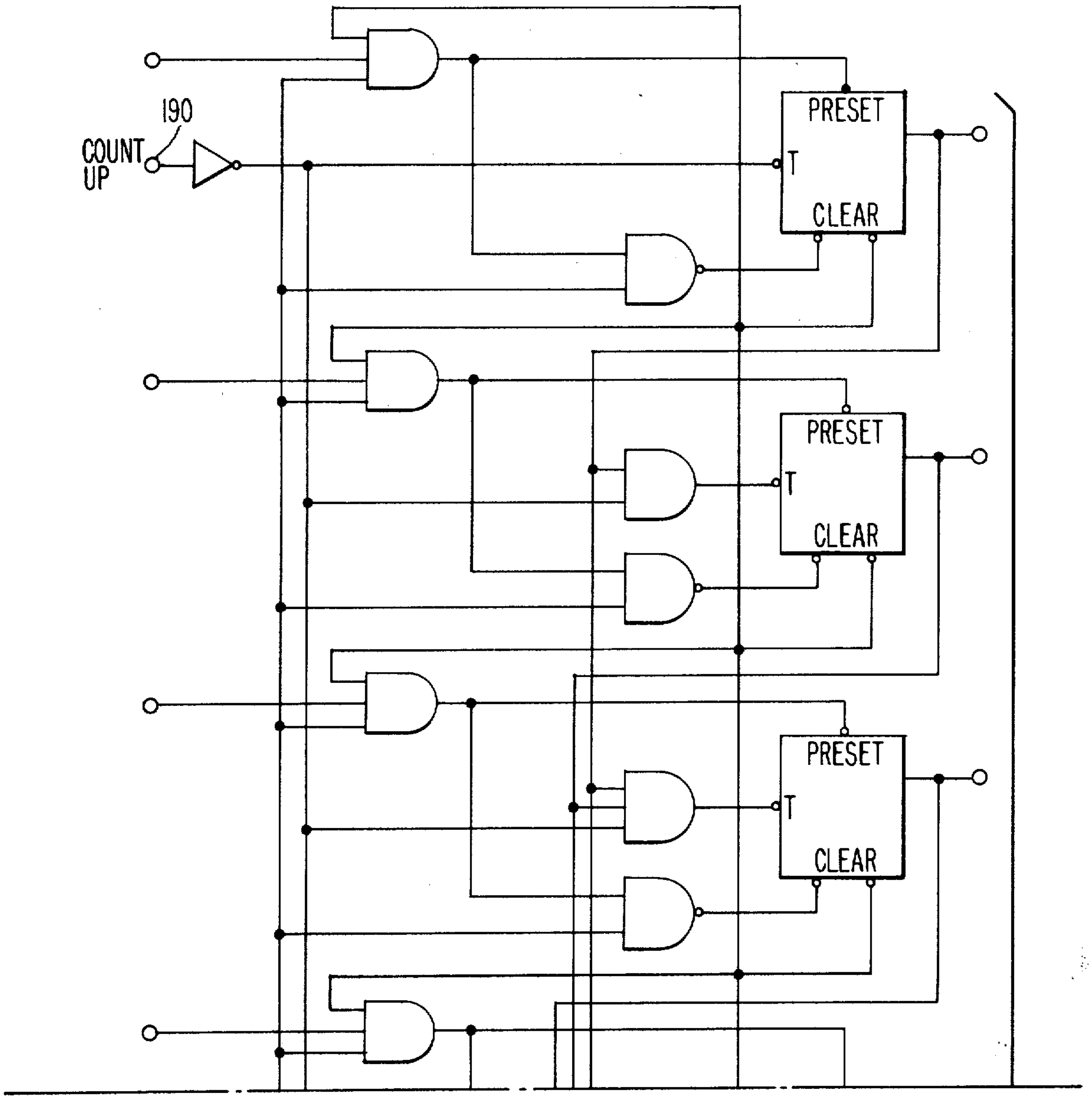

Set and Reset of Conditions

| 1 | 2 | 3 | Condition | 4 | 5 | Set | Reset |
|---|---|---|---|---|---|---|---|
| 1 | 0 | 0 | LC1 | 0 | 0 | Set LC1 | Reset by testing |
| 1 | 0 | 1 | LC2 | 0 | 1 | Set LC2 | Reset by testing |
| 1 | 1 | 0 | LC3 | 1 | 0 | Set LC3 | Reset by testing |
| 1 | 1 | 1 | EXT | 1 | 1 | A level from external devices - controlled by external interfaces (usually the OR of interrupts from several devices) | Reset by external action |
| 0 | 1 | 0 | LST | 1 | 1 | First bit from adder (least significant bit true - bit 1 = 1) | * |
| 0 | 0 | 0 | MST | 1 | 1 | Last bit from adder (most significant bit true - bit 8 = 1) | * |
| 0 | 1 | 1 | ABT | 1 | 1 | All bits true from adder (bits 1 through 8 are all ones) | * |
| 0 | 0 | 1 | AOV | 1 | 1 | Adder overflow true (This is really the carry bit for the serial adder; when eight bits of information have been serially added, it represents the overflow bit.) | * |

*Changed only by logic unit instructions.

TABLE I

| Octal Code | Bit 1 | Bit 2 | X Input To Adder |
|---|---|---|---|
| 0 | 0 | 0 | 0 |
| 1 | 0 | 1 | A 1 |
| 2 | 1 | 0 | A 2 |
| 3 | 1 | 1 | A 3 |

TABLE 2

LSI PROGRAMMABLE PROCESSOR

BACKGROUND OF THE INVENTION

The present invention relates to a digital computer and, more particularly, to a microprogrammable digital building block suitable for LSI (large scale integration) implementation and adapted to provide a variety of diverse functions for modular type multiprocessing systems.

Various types of system architecture have been created to increase the capabilities of information processing systems. Multiprocessing systems have been devised with a plurality of processors and input/output (I/O) controllers, each of which is adapted to access one or more memory modules, through an interlocking switching system. Such multiprocessing systems may be adapted to concurrently execute different programs or to concurrently execute portions of one program where each of the processors is a general purpose processor. In other multiprocessing systems, each processor may be a special purpose processor adapted to implement a particular function such as matrix multiplication and inversion and so forth.

In keeping with the trend in multiprocessing systems, the prior art developed a variety of computer processing systems ranging from the very small to the very large, each being capable of implementing not only business and scientific applications, but also the control of data transmission, data acquisition and the like. In situations in which large scale computational problems were involved, requiring many hundreds or thousands of iterative steps, emphasis was placed both on speed of execution and on the number of data bits that could be handled in a given cycle of instruction execution. For these situations, a system was designed to handle large data width and also many of the algorithmic processes required to be performed upon that data. To achieve greater speed of instruction execution, these systems were implemented directly in wired circuitry. Primarily because of these considerations, however, the large scale or scientific computer was an extremely expensive and cumbersome machine.

On the other hand, for that segment of the data processing community which demanded a more inexpensive computer, a computer system was designed with the cost factor in mind as opposed to speed of instruction execution. As a result, the circuits and systems designed were relatively simple and the various alogrithms were implemented by the programmer. Moreover, in comparison with the larger and more powerful processing systems, the time required for the execution of a program was relatively slow, not only because the less expensive system had to carry out each individual step of the program, but also, because the system was designed to handle data or information of relatively small widths in order to conserve the circuitry of the system. As a consequence, the designers of both types of systems would have to design and manufacture two different arithmetic-logic units for the separate systems, losing as a result the economic advantage that would be found with volume production of but one type of design.

The above design considerations are also inherent in multiprocessing systems which are of sufficient size as to require the control of input-output operations concurrently with the control of computational and other logic operations. Such separate input-output control units may resemble, and sometimes even are, general purpose digital computers in their own right, complete with an arithmetic unit and, in many situations, even a local storage capability. Nevertheless, the function and, therefore, the design of the input-output control unit was still different from that of the general purpose processor with which it was associated.

Another disadvantage associated with multiprocessing systems of different designs is that of programming incompatibility between the different systems. In those situations in which routines were implemented in circuitry in larger and more powerful systems, only one instruction was required to be executed in order to perform a routine. In a smaller system, however, a plurality of such instructions was required to be implemented to carry out the same routine. This lack of program compatibility was even more acute between systems engineered by different hardware companies, since different designers employed different instruction formats which varied in length and also employed different field sizes within the instruction format.

To overcome such differences in the "machine languages," a variety of diverse programming languages were developed, among which the more common are FORTRAN, COBOL, and ALGOL. Programs written in such higher level programming languages could be encoded and used in different computer systems; however, such programs first had to be translated into the machine language of the particular system. This translation was performed by an executive program, sometimes referred to as a compiler, and, if such an executive program had not been provided for a particular programming language, then the computer user was required to rewrite his program in a language for which his system did have a compiler.

As a result, various types of system architectures have been devised to minimize both the circuit, or hardware, incompatibility and the programming, or software, incompatibility described above. While a degree of minimization has occurred within particular product lines, attempts to minimize the incompatibility between the various programming languages have, in essence, only led to the creation of even more programming languages.

Particular architectural techniques which have been employed in the prior art include the design of modular processing units and storage units wherein the capability of a system can be increased by adding additional processing units while the storage capacity of the system can be increased by adding storage units. Other techniques included the design of data path widths for different members of a product line to be multiples of some basic unit segment, and also adapting the instruction fromat for the product line to be multiples of that basic segment.

A particular architectural concept that allows for more flexibility in computer design and also in computer programming has been the concept of microprograms or microinstructions. Initially, a microinstruction was thought of as merely a set of control bits employed within a macroinstruction format. Such control bits were employed to provide a corrective measure during the execution of a multiply instruction or shift instruction and the like. Gradually, as the microprogramming concept enlarged, the macroinstruction specified the particular routine to be performed, such as the addition of two operands. The execution of the macroinstruction was then accomplished through a sequence of executions of microinstructions, each of which specified the particular gate to be set at the different sequence times. Since a plurality of macroinstructions could be implemented by a finite set of microinstructions, it was then apparent that these same microinstructions could be stored in a separate storage to be addressed in a particular sequence upon the execution of different macroinstructions. It was further recognized that various sequences of microinstructions could be formulated to carry out the particular operations and separately stored in any memory. Thus, a great variety of sequences of microinstructions could be created to carry out a great variety of routines, and when a given computer system was designed to perform particular routines, only those required sequences of microinstructions that would be stored could be called forth for execution of these particular routines.

The concept of microinstructions or microprograms, then, became one of sub-instructional sets which were masked or hidden from the programmer, thus, simplifying the writing of particular programs by minimizing the number of individual specific steps that had to be called for by the programmer. Furthermore, the concept of microprogramming allows the computer designer to design a more inexpensive computer system that could provide a great variety of routines to the computer user without the requirement of individual functions being implemented in hand-wired circuitry.

Microprogramming, then, can be broadly viewed as a technique for designing and implementing the control function of a digital computer system as sequences of control signals that are organized on a word basis and stored in a memory. In the prior art, the conventional control unit was designed using flip-flops (e.g., registers and counters) and gating in a relatively irregular ad hoc manner. By contrast the control unit of a microprogrammable processor is implemented using well structured memory elements, thus providing a means for well-organized and flexible control. It should be noted that if a memory unit is alterable, then microprogramming allows the modification of a system architecture as observed at the machine language level. Thus, the same hardware may be made to appear as a variety of system structures, thereby achieving optimum processing capabilities for each task to be performed. This ability to alter the microprogram memory is called dynamic microprogramming as compared to static microprogramming which uses read only memories (ROM).

With the advent of dynamically changeable control stores and other microprogramming techniques, microprogramming units have been designed with instruction execution capabilities that can be altered to accommodate different problems or task requirements. These microprogrammable units bridge the gap between larger scale and smaller size computers with regard to processing capabilities in terms of cost, and virtually eliminate both the circuit, or hardware, incompatibilities and the programming, or software, incompatibility described above. For multiprocessing applications, the input-output controls that are required are incorporated as part of the processing task of the microprogrammable unit.

A particular programmable unit having the functional characteristics described above is disclosed in the Faber et al U.S. Pat. application No., 825,569 filed May 19, 1969 and assigned to the assignee of the present application. The programmable unit disclosed therein is modular in structure and under the control of plural levels of subinstruction sets or microinstruction sets. Only the instruction definitions of the lowest subinstruction level are fixed by hard-wired circuitry, while the definitions of higher level subinstructions can be varied and different strings of microinstructions can be interchanged in accordance with the requirements of whatever program that is currently being executed.

Thus, such a programmable unit may be employed at one time for control of input-output data transfers, at another time to execute a program written in a particular high level program language, and at still another time to execute a program written in still another programming language. Because of the flexibility of such microprogrammable units, two or more units can be employed in a multiprocessing system and additional units can be added to increase the capibility of the multiprocessing system without regard for consideration of particular functions such as input-output control and the like.

A particular feature of the system as described in the above-cited Faber et al application is that the respective microinstructions are interpreted or decoded by a still lower level of subinstructions so that the significance of particular microinstructions can be changed for different applications. A significant and specific advantage which arises from a system of this type is that microinstructions can be executed in an overlapped manner so that certain types of microinstructions can be conditional in nature, the execution of which can be delayed pending the testing of the respective conditions and alternative microinstructions can be fetched pending the outcome of such tests. The Faber et al system, then, allows for branching within the microprogram. As in other microprogram systems, a macroinstruction is executed by the execution of a string of microinstructions each of which specifies some data transfer from one register to another, logic operation or the like.

In the system of the above-mentioned Faber et al application, each microinstruction is in turn implemented by a set of control signals to set the respective gates as required for the transfer of information. These control signals are selected from a control memory and thus may be dynamically alterable depending upon the type control memory. The microinstructions, then, specify memory and device operations, (input-output control) logic operations including data shifts and also can include literal information (data, jump addresses, shift amounts) required for the execution of other microinstructions.

Although the system disclosed in the above-cited Faber et al application represents a significant advancement in the art, a need still exists for an inexpensive and compact microprogrammable processor adapted to implement simple "work functions" which could range from a calculator, a simple controller (e.g., remote teller, teletype multiplexor card, to printer, etc.) to virtually any small intelligent terminal (e.g., key to tape/disk, point of sale, etc.) An inherent structural feature of the system disclosed in the above-cited Faber et al application is that every microinstruction, other than one which specifies a literal type assignment, binds the logic unit irrespective of whether a logic operation is required or not. This feature is primarily due to the overlapped nature of instruction execution in the Faber et al system. Thus, a simple work function such as a device or memory controller, which involves a minimal of logic operations, will bind the logic unit of the system for the entire information transfer operation. In terms of efficiency and cost, the programmable unit, as disclosed in the above-cited Faber et al application, is ill-suited to perform this type of simple work function.

It is therefore, a primary object of this invention to provide a simple, compact and inexpensive microprogrammable unit for implementing basic functions which are characteristic of present day multiprocessing systems.

The microprogrammable unit of the present invention is particularly well suited as a simple hardware interface, including man-machine interfaces, such as a keyboard or badge reader to tape, disk, datacom, etc. In prior art designs, these interfaces take the form of special purpose controllers (e.g., card reader controllers, magnetic tape readers, etc.) which include the required drivers, level converters and bufferings. Each of these controllers requires a separate and complete design cycle for its implementation including logic design, packaging, procurement, application and debugging, followed by sparing and maintenance procedures.

It is, then, another object of the present invention to provide an improved microprogrammable general purpose controller building block which has its own function undefined until applied to a particular function.

The general-purpose controller building block is made unique to an interface by microprogramming the function across a minimal hardware interface. Programmable logic controllers perform sequencing operations by (1) scanning inputs such as relay contacts, limit switches, terminal devices, pushbuttons, valves, etc.; (2) comparing the inputs to the conditions specified in the program; and (3) by sending data, energizing or de-energizing outputs in accordance with the programmed instructions.

Therefore, it is another object of the present invention to provide an improved microprogrammable controller which substantially reduces manufacturing costs through a much abbreviated design cycle, mass production of identical building blocks for a variety of controller applications, ease of update, reduced spare parts inventory, and sharply reduced cost in the area of maintenance and training.

A typical work function to which the microprogrammable unit of the instant invention is directed can be performed by approximately 500–1,000 logic gates. With present day semiconductor technology, particularly metal oxide semiconductor (MOS) technology, the complexity of the microprogrammable unit of the present invention is well within the state of the single chip art.

Therefore, it is another object of the present invention to provide a programmable processor which is designed to be implemented on a single semiconductor chip.

In the past a major drawback to LSI implementation of many conventional circuits has been the great number of external connections required for data transfer and control.

It is, therefore, another object of the present invention to provide a microprogrammable processor which is designed to be implemented, using LSI technology, inside one multi-pin package including a read-only microprogram memory as a single monolithic chip.

Another object of this invention is to provide a microprogrammable man-machine interface enabling an improved operating environment and facilitating relatively simple on-line program debugging, analysis and diagnostics.

A further object of the present invention is to provide a microprogrammable processing unit utilizing an external read-write microprogram memory for deriving an optimum bit pattern for a specific work function for generating a ROM pattern mask which is used in conjunction with the invarient logical portion of the programmable unit to become a module tuned to the specific work function.

An additional object of this invention is to provide an improved machine-language independent, microprogrammable data processor.

A still further object of the present invention is to provide a modular multiprocessing system employing several microprogrammable units, each tailored via a microprogram to a unique work function.

A still further object of the present invention is to provide a microprogrammable controller which has an inherent ease of interfacing with host computers locally or remotely.

Other and further objects of the present invention will become apparent to those skilled in the art upon a study of the following specification and appended claims.

SUMMARY OF THE INVENTION

The present invention is directed towards a self-contained serial byte processor employing a soft machine architecture with a microprogramming technique. Specific circuitry for the execution of individual instructions of an instruction set is maintained at a simple and minimal level, enabling complete implementation of memory, logic, control and addressing functions with large scale integration technology. More specifically, an instruction set, at the microprogram level, is provided for controlling the specific circuitry of the processor in executing basic computer operations. Essentially, the specific circuitry represents minimally committed logic or hardware which becomes committed to a specific task by control signals originating in the instruction set. Logic, control and addressing functions are performed by circuitry which includes only those gates, registers, drivers and related logic which are necessary to implement the basic operations, computer instructions. Directing work functions completely in microprogram reduces the number of external connections required.

BRIEF DESCRIPTION OF THE DRAWINGS

For better understanding of the present invention, reference should be made to the accompanying drawings wherein:

FIG. 6 illustrates the instruction format for a logic type instruction which can be executed by the programmable unit of the present invention;

FIG. 17 is a truth table for the four line to one line multiplexer of FIG. 16;

FIG. 25 is a truth table for the binary to one-of-three-line decoder of FIG. 23;

DETAILED DESCRIPTION OF THE PREFERRED EMBODIMENT

Figure 1:
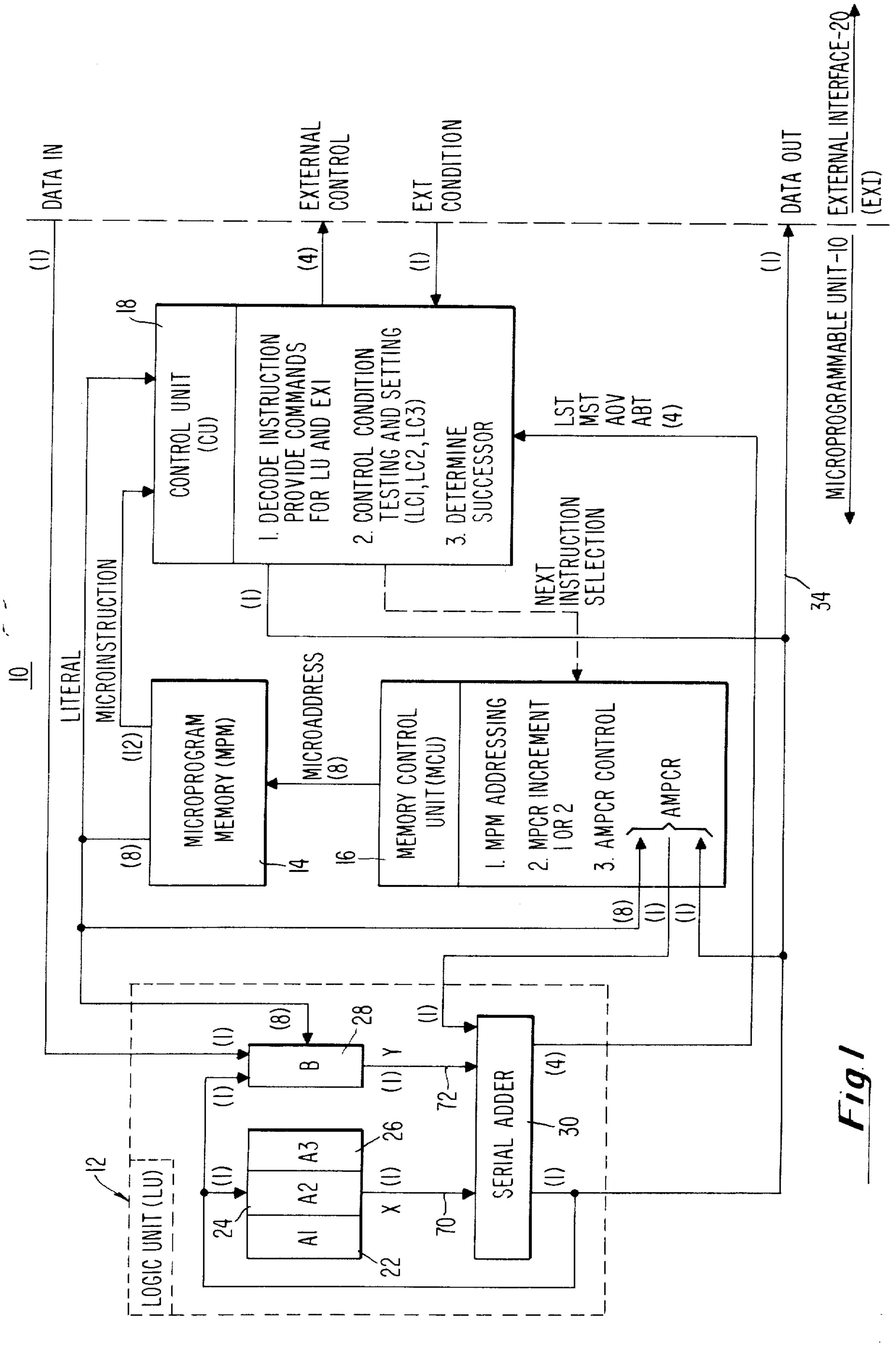
FIG. 1 is a simplified block diagram showing data and control signal flow for the programmable unit of the present invention.

The programmable processing unit 10 (FIG. 1) of the instant invention is comprised of five functional parts, namely, the logic unit 12 (LU) which performs the shifting and the arithmetic and logic functions required, as well as providing a set of scratch pad registers; a microprogram memory 14 (MPM) which provides microprogram sequences some words of which have literals, others have specific controls specified by the microprogrammer; a memory control unit 16 (MCU) which provides the registers for microprogram memory addressing; a control unit 18 (CU) which provides timing and conditional control, successor (next instruction) determination and instruction decoding; and an external interface 20 (EXI). The programmable unit 10, although serially implemented, appears as a parallel processing unit for most functional operations. The functional units will be described broadly and thereafter in detail.

Figure 2:
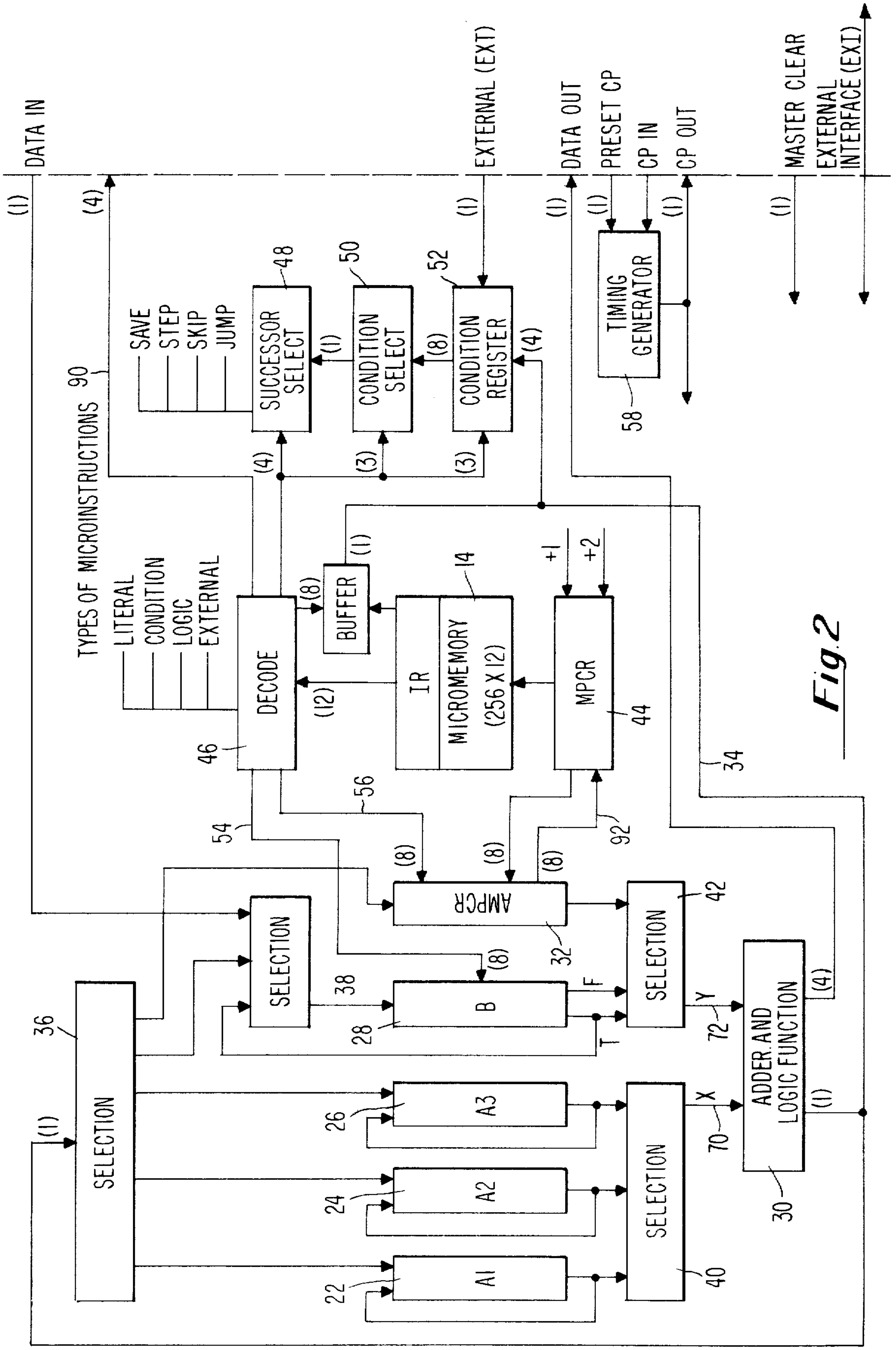
FIG. 2 is a more detailed block diagram showing data and control signal flow for the processor of the present invention.

In the preferred embodiment, the logic unit 12 is comprised of three 8-bit recirculating shift registers 22, 24, and 26, denominated registers A1, A2 and A3, respectively, an 8-bit recirculating shift register 28, denominated the B register, a serial adder 30, and related gating (see FIG. 2). The A registers 22, 24, 26 and the B register 28 are recirculating shift registers so that information can be transferred into the adder 30 without changing the contents of the respective input A register. This feature is ideally suited for MOS dynamic logic implementation.

All A registers 22, 24 and 26 are functionally identical. They temporarily store data within the programmable unit 10 and can be loaded with the output of the adder 30 through a selection gate network 36 (FIG. 2) which determines the input to the respective A register. A selection gate network 40 permits the contents of any of the A registers 22, 24 or 26 to be used as one input, denominated the X input 70 to the adder 30.

The B register 28 is the primary interface from the main memory of the multiprocessing system (shown as DATA IN in FIG. 1) via external interface 20. The B register 28 also serves as a second, or Y, input 72 to the adder 30, and collects certain side effects of arithmetic operations. The B register 28 may be loaded via a selection gate network 38 with the output of the adder 30 through selection gate 36; with externally provided DATA IN via the external interface 20, or with the TRUE contents of B register itself. In addition, literal values which are decoded from certain microinstructions stored in the microprogram memory 14 are fed directly to the B register 28 from a microinstruction decoder 46. The output of the B register 28 has a true-false gate network 42 which serves to provide the TRUE contents of the B register 28 as a Y input 72 to adder 30 or to provide the ONES complement of the contents of the B register 28 to the Y input.

The adder 30 of the logic unit 12 is a conventional serial adder known in the art. Therefore, the details of this operation will not be included here, but will be thoroughly discussed later when the specific circuitry is described. In addition to the A registers 22, 24, 26 and the B register 28, the output of adder 30 can have as its destination either an alternate microprogram count register (AMPCR) 32, or an output line 34 to external registers (shown as DATA OUT in FIG. 2). The AMPCR register 32 is also a recirculating shift register and can serve as a Y input 72 for adder 30 via a selection gate network 42.

The memory control unit (MCU) 16 is comprised of two 8-bit registers, i.e., a microprogram count register (MPCR) 44 and the alternate microprogram count register (AMPCR) 32. The MPCR register 44 is an 8-bit counter which can be incremented by one or by two and is used to select the next instruction from the microprogram memory 14. The AMPCR register 32 contains the jump or return address for program jumps and subroutine returns within microprograms. The address in the AMPCR register 32 is usually one less than the position to be returned to. This register 32 can be loaded from the MPCR register 44, the ouput of adder 30 via selection gate network 36, or with literal values decoded from certain microinstructions stored in microprogram memory 14.

The programmable processing unit 10 of the instant invention requires a source of microprogram instructions to define the operation of the processing unit. In the preferred embodiment this source is provided by microprogram memory 14. Memory 14 can be a read-only memory (ROM) that contains the program defining the processing unit's function. Alternatively, microprogram memory 14 can be a random-access memory (RAM). in any event the program stored by the memory 14 characterizes the processing unit 10 to perform specific tasks in an optimum manner.

The design philosophy of the processing unit 10 assumes that there is no specific instruction set to be utilized, but rather a set of register paths and control sequences that can be used to synthesize functions optimally to the task to be performed. A ROM implementation of the microprogram memory 14 is preferable for a specific application involving a relatively high number of units, since the cost of masking a ROM for a given bit pattern on a MOS LSI monolithic chip for different applications is small, particularly when amortized over multiple copies.

Alternatively, the processing unit 10, constructed utilizing a read-write microprogram memory can be used for experimental purposes or when the function of the processing unit 10 might be changed. In this read-write mode of operation, the programs that will characterize the processing unit 10 to a particular application can be inserted, tested and revised until the desired levels of performance is achieved. At that point, the desired bit pattern will be utilized to generate the appropriate ROM pattern mask, which is used in conjunction with the invariant logical portion, which will be described later, of the processing unit 10 to become a module or building block tuned to the specific application.

Presently, for purposes of discussion, only a ROM memory will be considered. in the preferred embodiment, microprogram memory 14 is comprised of 256 words, each 12 bits in length. The memory 14 contains only executable instructions and cannot be changed under program control. Each microinstruction which comprises the microprogram stored in microprogram memory 14 is 12-bits in length and is decoded by a decoder 46 which is a part of control unit 18. The 12-bits of each instruction are decoded into one of four types, namely: 1) literal, 2) condition, 3) logic and 4) external. A more thorough discussion of these four instruction types will be described in detail later.

Control unit 18 is comprised of the microinstruction decoder 46, a successor (or next instruction) determination logic 48, a condition selection logic 50, and a condition register 52. The successor determination logicc 48, the condition selection logic 50 and the condition register 52 are activated by the output of the microinstruction decoder 46. In addition, the adder 30 feeds four condition bits to the condition register 52, namely the least significant bit true (LST) condition 74 (FIG. 4), the most significant bit true (MST) condition 76, the adder overflow bit (AOV) 78, and an indicator bit (ABT) 80, if all bits of the adder output are true (1's). The successor determination logic 48 determines whether to use the contents of the MPCR register 44, incremented by 1 or by 2 or to use the contents of AMPCR register 32 for addressing the next instruction stored in microprogram memory 14.

The condition register 52, inter alia, stores three resettable local condition bits 82, 84 and 86 (LC1 bit 82, LC2 bit 84 and LC3 bit 86, respectively), and selects one of 8 condition bits (the 4 adder condition bits, MST 76, LST bit 74, AOV bit 78 and ABT bit 80; an external condition bit EXT 88; and the three local condition bits LC1, LC2 and LC3 stored in condition register 52).

An 8-bit transfer path 56 from decoder 46 to the AMPCR register 32 exists for the transfer of 8-bit literal values which have been decoded from microinstructions stored in microprogram memory 14. A similar 8-bit transfer path 54 exists from decoder 46 to B registers 28 for the transfer of 8-bit literal values. For certain instructions, a 4-bit external control path 20 is enclosed and sent to the external interface 20. These four bits, which will be described in detail later, inform the external interface 20 how to use, send and recive data through the interface by informing the external environment what type of instruction the programmable unit 10 is executing at any given time. Control unit 18 also provides timing for the operation of the programmable unit 10 through timing generator 58.

External interface 20 connects the programmable unit 10 with external elements related to a multiprocessing system. This connection is synchronized by one internally generated clock train available to aid in performing 8-bit serial transfers into and out of the programmable unit 10. An external asynchronous input EXT (see FIG. 2) to condition register 52 is available for signalling from the external environment in the form of the EXT condition bit 88, while the four external control lines 90, previously discussed, are utilized to control the use of external registers.

Having now generally described the major functional components of the programmable unit 10, the four types of microinstructions with corresponding bit paterns will be described in detail. An understanding of hese microinstructions will be helpful in the detailed liscussion of the specific circuitry of the programmable nit 10.

Figures 3, 5:
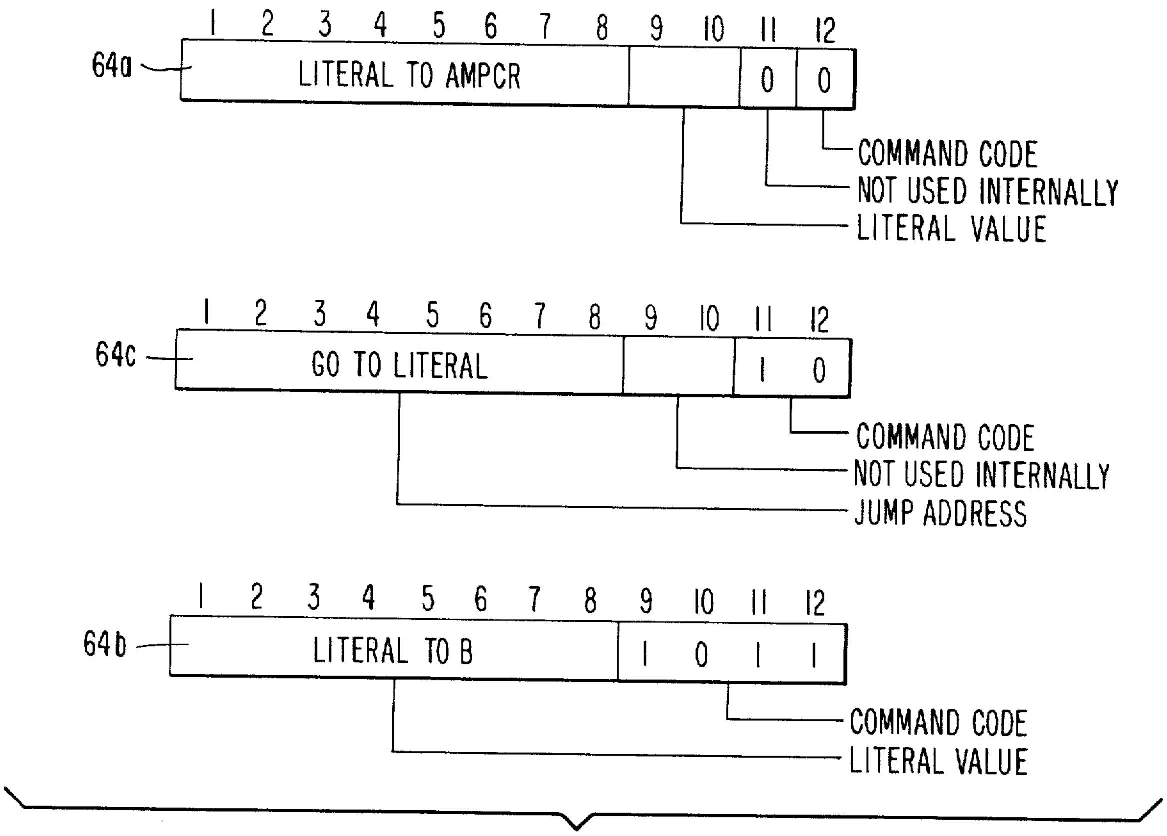
FIG. 3 illustrates the instruction format for a literal assignment instruction executed by the programmable unit of the present invention.
FIG. 5 is a chart of the various commands for addressing the microprogram memory of the programmable unit of the present invention.

As previously discussed, in the preferred embodinent, all microinstructions store in microprogram nemory 14 are 12-bits in width. The first type of micronstruction is the literal assignment instruction 64 (FIG. 3). Bits 1 through 8 of a literal assignment instruction 54 comprise a value or constant, and the receiving register is implicitly specified by the command bits of the nstruction which comprise bits 9 through 12 of the literal assignment instruction 64. Literal values can only be loaded into the B register 28 (LITERAL TO B instruction 64*b*) or the AMPCR register 32 (LITERAL TO AMPCR instruction 64*a*) through their respective 3-bit transfer paths 54, 56.

If bits 11 and 12 of a literal assignment instruction 64 are both ZERO's, a LITERAL TO AMPCR instruction 54a is executed, and the transfer destination is the AMPCR register 32 via transfer path 56. If bits 9 hrough 12 are 1011, respectively, then a LITERAL TO B instruction 64b is executed, and the transfer destination is the B register 28 via transfer path 54. A variation of the LITERAL TO AMPCR instruction 64*a* is a GO TO LITERAL instruction 64*c*. This instruction is executed if bit 11 of the instruction is a ONE and bit 12 is a ZERO. When this instruction is executed, the iteral value specified by the instruction is loaded into the AMPCR register 32 via transfer path 56, and in addition, the contents of the AMPCR register 32 are loaded into the MPCR register 44 via a transfer path 92. The function of a GO TO LITERAL instruction 64c is to load jump addresses, specified by the microprogram stored in microprogram memory 14, into the MPCR register 44. For a LITERAL TO AMPCR instruction 64*a* and a GO TO LITERAL instruction 64*c*, bits 9 and 10 of these instructions are not used internally by the programmable unit 10.

When executing a LITERAL TO B instruction 64b the specified input bits are complemented in the process of loading the literal into the B register 28. This is not the case for a LITERAL TO AMPCR instruction 64a; in which case, the input bits are inserted unmodified as they are received from microinstruction decoder 46.

Figure 4:
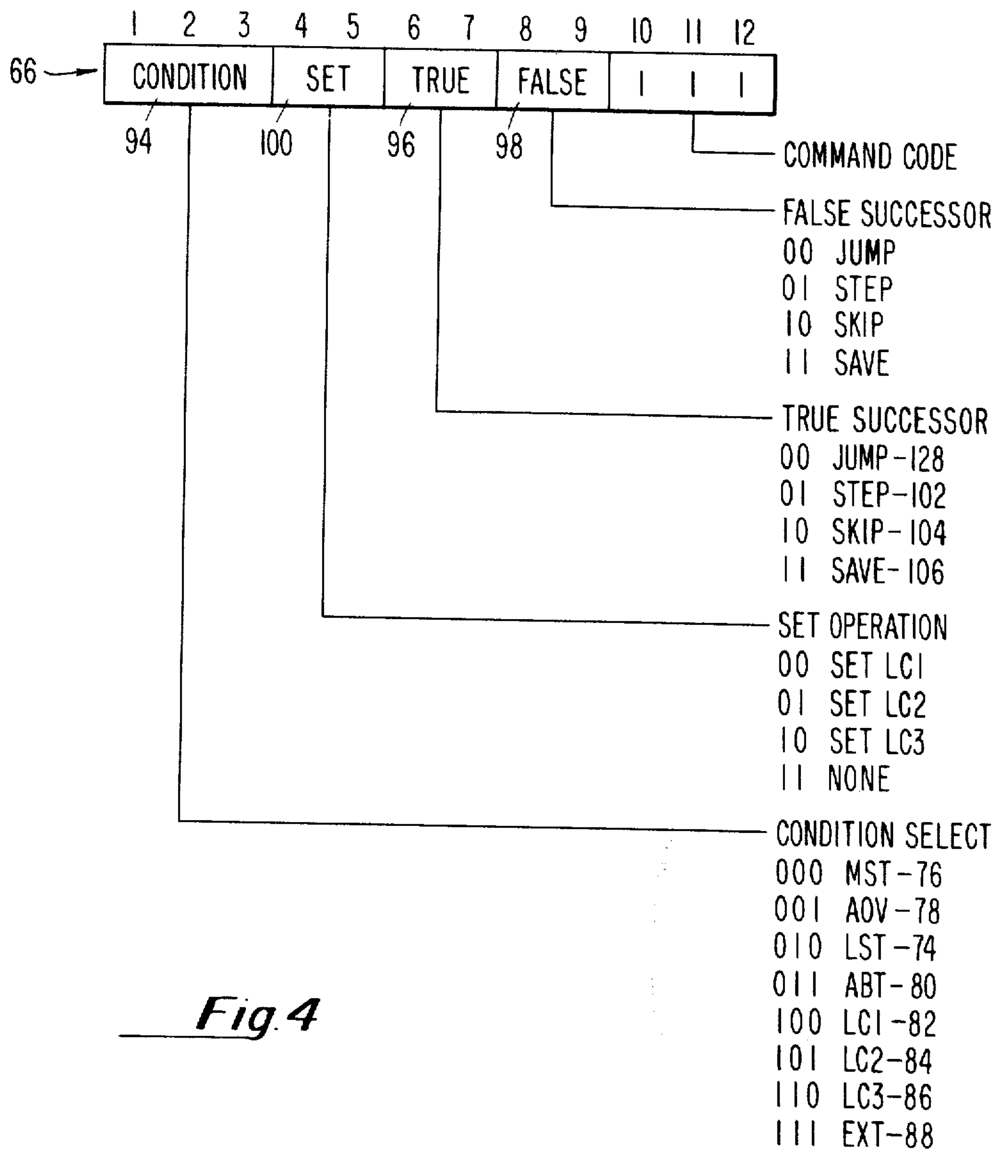
FIG. 4 illustrates the instruction format for a condition test instruction which can be executed by the programmable unit of the present invention.
Figure 7:
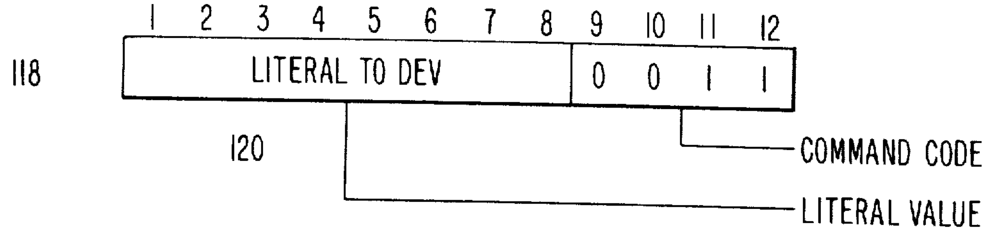
FIG. 7 illustrates the instruction format for an external type instruction which can be executed by the programmable unit of the present invention.

The second type of microprogram insruction is the condition test instruction 66 (FIG. 4). A condition instruction is comprised of five fields, namely the condition field 94; the set field 100; the true successor field 96; the false successor field 98; and the command code field. This instruction performs a test on one of eight conditions specified by the condition field 94 which comprises bits 1 through 3 of the condition test instruction 66. If the test of a condition specified by the condition field 94 is successful or true, then the true successor designated by the true sussessor field 96, which comprises bits 6 and 7 of the condition test instruction 66, determines the address of the next instruction. If the condition test is unsuccessful or false, then the false successor bits defined by the false successor field 98, which comprises bits 8 and 9 of a condition test instruction 66, determines the address of the next instruction. If the condition selected to be tested is true, then in addition to the true successor selection, a set field 100, defined by bits 4 and 5 of a condition test instruction 66, is checked to determine if one of the three local condition bits LC1, LC2, LC3, is to be set Bits 10 through 12 define the command code and are always all ONE's for a condition instruction 66.

As previously discussed, the condition register 52 is a set of eight testable condition bits which are used for one or a combination of the following purposes: conditional or uncoditional transfer of control, and setting and/or resetting local condition bits. The eight conditions consist of the four adder conditions (LST bit 74, MST bit 76, AOV bit 78 and ABT bit 80), the external attention level bit EXT 88 and the three local condition bits (LC1 bit 82, LC2 bit 84, LC3 bit 86).

The LST condition is set if the least significant or first bit out of the adder 30 is a binary 1 and reset if a 0. The MST condition is set if the most significant last bit or 8 bit is a binary 1 and reset if a 0. If all the bits out of the adder 30 are binary 1, the ABT condition is set and otherwise reset. The AOV condition indicates that an overflow has taken place in an addition operation.

The local condition bits 82, 84, 86 (LC1, LC2, LC3) are reset on testing, and the set field 100 is used to set a local condition. It should be noted that it is necessary to test a true condition in order to be able to set a local condition. The external condition bit EXT 88 is completely controlled by the external interface 20 and is usually the result of the ORing of the interrupts for several devices gated by the respective device addresses or in the alternative can be used for timing purposes. The four adder conditions (LST, MST, ABT, AOV) indicate the result of the last logic unit instruction, which will be described later. These condition bits, 74, 76, 78 and 80 are not reset by testing and are sustained until execution of another logic type instruction.

A summary of the setting and resetting of conditions is shown in Table 1.

TABLE 1

Set and Reset of Conditions

| 1 | 2 | 3 | Condition | 4 | 5 | Set | Reset |
|---|---|---|---|---|---|---|---|
| 1 | 0 | 0 | LC1 | 0 | 0 | Set LC1 | Reset by testing |
| 1 | 0 | 1 | LC2 | 0 | 1 | Set LC2 | Reset by testing |
| 1 | 1 | 0 | LC3 | 1 | 0 | Set LC3 | Reset by testing |
| 1 | 1 | 1 | EXT | 1 | 1 | A level from external devices - controlled by external interfaces (usually the OR of interrupts from several devices) | Reset by external action |
| 0 | 1 | 0 | LST | 1 | 1 | First bit from adder (least significant bit true - bit 1 = 1) | * |
| 0 | 0 | 0 | MST | 1 | 1 | Last bit from adder (most significant bit true - bit 8 = 1) | * |
| 0 | 1 | 1 | ABT | 1 | 1 | All bits true from adder (bits 1 through 8 are all ones) | * |
| 0 | 0 | 1 | AOV | 1 | 1 | Adder overflow true (This is really the carry bit for the serial adder; when eight bits of information have been serially added, it represents the overflow bit.) | * |

* Changed only by logic unit instructions.

A literal assignment instruction 64 which may specify loading the B register 28 or the AMPCR register 32 may change the value of an input to adder 30, but this will not change the value of any of the condition bits provided by the output of the adder 30. Moreover, several logic unit operations may have unusual side effects on particular adder operations, as will be explained in greater detail in connection with a logic unit instruction.

The first local condition (LC1) is used for temporary storage of Boolean conditions within the programmable unit 10 and its status is indicated by the LC1 bit 82. It is set locally by the programmable unit 10 and reset locally by testing. The second level condition (LC2) as well as the third local condition (LC3), are similar in function and operation to the first local condition (LC1).

To specify the testing of the MST condition bit 76 the first three bits of a condition test instruction 66 are designated as ZERO's (000). If only the third bit of the first 3 bits of a condition test instruction 66 is a ONE (001), then the AOV condition bit 78 is tested, while if only the second bit of the first three bits of a condition test instruction 66 is a ONE (010) the LST condition bit 74 is tested. If only the first bit of the first three bits of a condition test instruction 66 is a ZERO (011) then the ABT condition bit 80 is tested. If only the first bit of the first 3 bits of a condition test instruction 66 is a ONE (100), then the LC1 condition bit 82 is tested, while if only the second bit of the first 3 bits of the condition test instruction 66 is a ZERO (101), the LC2 condition bit 84 is tested. If only the third bit of the first three bits of a condition test instruction 66 is a ZERO (110) then the LC3 condition bit 86 is tested. The external EXT bit 88 is tested if all of the first three bits of a condition test instruction 66 are ONE's (111).

Either the true successor defined by bits 6 and 7 of a condition test instruction 66 or the false successor defined by bits 8 and 9 of the condition test instruction 66 must be explicitly selected to determine the address of the next instruction to be executed. For unconditional successors, the same successor must be selected in both the true and false successor fields 96 and 98 respectively. The four choices for each successor are: 1) the STEP successor 102 which steps to the next instruction in sequence as defined by the contents of the MPCR register 44 incremented by 1; 2) the SKIP successor 104 which skips to the second next instruction in sequence as defined by the contents of the MPCR register 44 incremented by 2; 3) the SAVE successor 106 which steps and saves the current address in the MPCR register 44 incremented by 1 in the MPCR register 32; and 4) the JUMP successor 108 which transfers control of the determination of the address of the next instruction to the address stored in the AMPCR register 32.

All other types of microinstruction have an implicit successor of STEP as described above.

To summarize the action of a successor command in addressing the microprogram memory 14, a STEP successor command 102 will designate as the next instruction address the contents of the MPCR register 44 incremented by 1 and this new address will now be the contents of the MPCR register 44 (FIG. 5). The SKIP successor command 104 designates as the next instruction address the contents of the MPCR register 44 incremented by 2 and the new contents of the MPCR register 44 will be this new instruction address. The SAVE successor command 106 will designate as the next instruction address the contents of the MPCR register 44 incremented by 1, and the new contents of the MPCR register 44 will also be the address of the new instruction. In addition, the contents of the AMPCR register 32 is changed to the address of the new instruction (MPCR +1). The JUMP successor command 108 designates as the next instruction address the contents of the AMPCR register 32 and causes the contents of the MPCR register 44 to be changed to the address of the new instruction. Note, only a SAVE successor command 106 changes the contents of the AMPCR register 32.

The third type of microinstruction which is decoded by microinstruction decoder 46 is a logic unit instruction 68 which specifies the X and Y operand inputs for the adder 30, and the arithmetic or logic operation and the designation specification for the adder 30. A logic instruction is comprised of four fields, namely, the X operand input field 110, the operation and Y operand input field 112, the destination field 114, and the command code field 116.

The X operand input field 110, which comprises bits 1 and 2 of a logic unit instruction 68, specifies the X input 70 for the adder 30. The X operand can be either a ZERO or the output of one of the three A registers 22, 24 or 26. The operation to be performed by the adder 30 and the Y operand input 72 (the true contents of the B register 28 or the contents of the AMPCR register 32) to the adder 30 are specified as part of the operation field 112, which comprises bits 3, 4, 5 and 6 of a logic unit instruction 68. The operation field can specify both arithmetic and logic operations on the AMPCR register 32 as well as the B register 28. The destinations of the output of the adder 30 are specified by the destination field 114 which comprises bits 7 through 10 of a logic unit instruction 68. The $11^{th}$ and $12^{th}$ bits of a logic unit instruction 68 designate the command code field 116 for a logic unit instruction. The $11^{th}$ bit of a logic unit instruction 68 is always a ZERO and the $12^{th}$ bit is always a ONE.

The four possible X inputs 70 for adder 30 specified by the X input field 110 of a logic unit instruction 68 are: 1) a ZERO designated by ZERO's in the first and second bits (00); 2) the contents of the A1 register 22 designated by a ZERO in the first bit and a ONE in the second bit (01); 3) the contents of the A2 register 24 designated by a ONE in the first bit and a ZERO in the second bit (10); and 4) the contents of the A3 register 26 designated by a ONE in both the first and second bits (11). This is summarized in Table 2.

TABLE 2

| Octal Code | Bit 1 | Bit 2 | X Input To Adder |
|---|---|---|---|
| 0 | 0 | 0 | 0 |
| 1 | 0 | 1 | A 1 |
| 2 | 1 | 0 | A 2 |
| 3 | 1 | 1 | A 3 |

In the preferred embodiment there are 16 possible types of operations which can be performed by the adder 30 and logic unit 12, of which twelve operations involve the output of the B register 28 as the Y operand input 72 for adder 30, (see FIG. 6). The remaining four operations utilize the output of the AMPCR register 32 as the Y select input 72 for adder 30.

The types of operation defined by the operation field 112 include both arithmetic and logic functions. The andard operations X + Y and X + Y + 1 are performed by the logic unit 12 as well as the standard logic unctions (e.g., AND, NAND, OR and NOR). Also ossible are various non-standard logic functions. The ollowing discussion will be directed toward a brief decription of these functions, while a more thorough unerstanding may be acquired in reference to the detailed description of specific circuitry.

An arithmetic operation specifying the summation of ie X operand input 70 for adder 30 plus the output to ie B register 28 plus the quantity 1 is defined by bits through 6 of a logic unit instruction 68 being all ERO's (0000). The operation specified by an operation field 112 having the bit pattern 0001 is the summation of the X operand input 70 to adder 30 plus the output of the B register 28. An operation field 112 having bit pattern of 0010 specifies the summation of the X perand input 70 to adder 30 plus the output of the AMPCR register 32 plus the quantity 1. An operation ield 112 having the bit pattern 0011 specifies a fourth rithmetic operation being 70 the sum of the X input plus the output of the AMPCR register 32.

A bit pattern of 0100 in the operation field 112 defines a comparator logic function and is expressed mnemonically as X EQV B. This logic operation specifies hat the output of the B register 28 is compared with he x input 70 to the adder 30. The Boolean expression for the logic operation is defined as $(XB \vee \overline{XB})$.

An exclusive OR logic function, utilizing the specified X input 70 and the output of the B register 28, is specified by an operation field 112 having bit pattern of 0101. This logic operation has a mnemonic expression of X XOR B and a Boolean expression of $(X\overline{B} \vee \overline{X}B)$.

Following, for purposes of discussion, an octal code sequence for the bit pattern of the operation field 112, an arithmetic operation specifying the difference in the contents of the B register 28 and the X input 70 to adder 30 is defined by an operation field 112 having an octal code of 6 (0110). This arithmetic operation is expressed mnemonically as X − B and is performed by the Boolean logic expression $(X + \overline{B} + 1)$.

The final arithmetic operation which can be specified by the operation field 112 of the preferred embodiment is defined by a bit pattern of 0111 (octal code 7). The arithmetic operation specified by this bit pattern for the operation field 112 is the difference between the X input 70 to adder 30 and the contents of the B register 28 decreased by the quantity 1. The mnemonic expression X − B − 1 for this arithmetic operation is performed by the Boolean logic expression $(X + \overline{B})$.

The remaining eight operations, namely 9 through 16 which can be specified by the operation field 112 of a logic unit instruction 68 are all logic type functions. The first bit position of the operation field 112, i.e., the third bit of a logic unit instruction 68, for these eight operations is always a ONE.

A logic operation which is expressed mnemonically as X NOR B is specified by an operation field 112 having a bit pattern of 1,000 for bits 3 through 6, respectively, of a logic unit instruction 68. The Boolean expression for this logic operation is $(\overline{X \vee B})$.

The tenth operation which can be defined by the operation field 112 of a logic unit instruction 68 is the logic operation expressed mnemonically as X NAN B. This logic operation is specified by an operation field 112 having a bit pattern of 1001 (octal code 9). The Boolean expression for the logic operation is $(\overline{XB})$.

The eleventh and twelfth operations are, respectively, specified by an operation field 112 having bit patterns of 1010 and 1011. The logic functions specified by these two bit patterns are identical to the logic functions specified for the ninth and tenth operation discussed above with the exception that the contents of the AMPCR register 32 is used instead of the contents of the B register 28. The mnemonic expression for the logic operation specified by a bit pattern of 1010 for the operation field 112 is X NOR Z, Z being the designation for the AMPCR register 32. The corresponding Boolean expression for this logic operation is $(\overline{X \vee Z})$. The mnemonic expression for the logic operation specified by a bit pattern of 1011 for the operation field 112 is X NAN Z, and the corresponding Boolean expression is $(\overline{XZ})$.

A logical OR function is specified by an operation field 112 having a bit pattern of 1100 for bits 3 through 6 of a logic unit instruction 68. This bit pattern specifies that the X input 70 to adder 30 is ORed with the output of the B register 28. The mnemonic expression is X OR B, and the corresponding Boolean expression is $(X \vee B)$.

The 14 possible operation which can be specified by an operation field 112 is the logical AND function and has a bit pattern 1101. The logic function specified by this bit pattern is the AND'ed of the X input 70 to adder 30 and the output of the B register 28. The mnemonic expression for this logic operation is X AND B, while the Boolean expression is (XB).

The fifteenth possible operation which can be specified by an operation field 112 of a logic instruction 68 is a variation of the logical OR function. An operation field 112 having a bit pattern of 1110 specifies that the X input 70 to adder 30 is OR'ed with the compliment of the output of the B register 28. This logic operation is expressed mnemonically as X RIM B, and the corresponding Boolean expression is $(X \vee \overline{B})$.

The sixteenth and last possible operation which can be specified by an operation field 112 of the preferred embodiment is a variation of the logical AND operation. A bit pattern of 1111 for bits 3 through 6 of a logic unit instruction 68 specifies that the X input 70 to adder 30 is AND'ed with the inverse of the output of the B register 28. The mnemonic expression for this logic operation is X NIM B, and the corresponding Boolean expression is $(X\overline{B})$.

Note from above, that in the third (X + Z + 1), fourth (X + Z), eleventh (X NOR Z) and twelfth (X NAN Z) logic operations, the Y input 72 for the adder 30 is the output of the AMPCR register 32. In all other logic operations the Y input 72 into the adder 30 is the output of the B register 28.

The destination of the output of adder 30 is defined by the destination field 114, which comprises bits 7 through 10 of the logic unit instruction 68. As previously discussed, the output of adder 30 can be loaded into the B register 28, the AMPCR register 32, or the output line 34 to the external registers. There are 16 possible destinations which can be defined by bits 7 through 10 of the logic unit instruction 68. These destinations include the registers and the output line above discussed, and in some situations indicate a further control function or operation to be performed.

To specify the B register 28 as the destination of the output of adder 30, the destination field 114 in the preferred embodiment must have a bit pattern of 0000 for bits 7 through 10 respectively of a logic unit instruction 68.

The A1 register 22 is specified as the destination of the output of adder 30 if the destination field 114 has a bit pattern of 0001; the A2 register 24 when the bit pattern is 0010; and the A3 register 26 when the bit pattern is 0011.

If the destination field 114 of a logic unit instruction 68 has a bit pattern of 0100, then an OUT 0 destination is specified. The OUT destination will be described later.

An OUT 1 destination is specified by a bit pattern of 0101 (octal code 5) for bits 7 through 10 of a logic unit instruction 68 and an OUT 2 destination by a bit pattern of 0110 (octal code 6).

The AMPCR register 32 is specified as the destination of the output of adder 30 by a destination field 114 having a bit pattern of 0111 (octal code 7) for bits 7 through 10 respectively of a logic unit instruction 68. This destination is also denominated the OUT 3 destination.

The next four destinations, namely 9 through 12 (octal code 8 through 11), defined by the destination field 114 of a logic unit instruction 68 are identical with the first four destinations described above (B, A1, A2, A3) with the additional mnemonic flag or indicator "BEX" which signifies a serial transfer from the external DATA IN source via selection gate network 30 to the B register 28 to take place in parallel with the output of adder 30 into the other register specified by the destination field 114 (i.e., B, A1, A2, A3).

The remaining four destinations, namely 13 through 16 (octal code 12 through 15), defined by the destination field 114 of a logic unit instruction 68 are also identical with the first four destinations described above (B, A1, A2, A3) with the addition mnemonic flag S for SHIFT which indicates a one-bit right shift of the destination register end off, with the most significant bit being filled by the output of the adder 30.

From the above, it is apparent that the output of the adder 30 can be loaded into the B register 28, the A registers 22, 24 and 26, and the AMPCR register 32. The output of adder 30 always goes ungated to the external interface 20 when a logic type operation is selected, but if any of the OUT destinations (OUT 0, OUT 1, OUT 2, OUT 3) are selected as a designation, then a special 4-bit code is generated on the external control lines 90, to enable gating from the adder 30 to a specific external register. Also note that if any of the BEX destinations (destination 9 through 12 specified by the destination field 114 of a logic unit instruction 68) is selected, a 2-bit BEX code is sent out on the external control lines 90 enabling an 8-bit serial transfer from the external DATA IN source to the B register 28 to take place in parallel with the output of adder 30 into the register specified by the destination field 114 of the logic unit instruction 68 (i.e., A registers 22, 24 or 26, B register 28). If the destination register is the B register 28 with the additional BEX flag (B, BEX — destination field 114 having a bit pattern of 1000), then an OR of the output of adder 30 and the external input is performed. Normally, the output of adder 30 in this case would be set to transfer logical zeroes from the adder 30, thereby allowing a simple external load of the B register 28.

As noted earlier, if the AMPCR register 32 is not selected as a destination register, then the four operations (X+Z+1, X+Z, X NOR Z, X NAN Z) using the AMPCR register 32 as the Y input 72 into adder 30 will have "ZERO" for the Y input 72. This means that the results fo those operations using the AMPCR register 32 as a Y input 72 can only be transferred back to the AMPCR register 32. Through the use of this feature 0, not 0, X and not X can be transferred to any destination register except the AMPCR register 32.

The destinations with the flag or indicator S for SHIFT (destinations having octal code representations of 12 through 15) allow the destination register to be shifted right end off by one bit, and the most significant bit being supplied by the output of the adder 30 operating on the least significant bit of the X and Y selected operands. It should be noted, that the adder operation is performed on all eight bits of the selected input operands, and the adder condition bits (LST bit 74, MST bit 76, ABT bit 80 and AOV bit 78) are set accordingly.

For instance, if it is desired to perform a right shift (end off) of one bit of the B register 28 destination, then select for the X operand field 110, X = 0; for the operation and Y operand select field 112, X + Z; and for the destination field 114, B S; resulting in a logic unit instruction 68 having a bit pattern of (00 0011 1100 01).

Or, if it is desired to perform a circular shift of one bit of the B register 28 destination, then select for the X operand field 110, X = 0; for the operation and Y operand 112, X + B; for the destination field 114, B S; resulting in a logic unit instruction 68 having a bit pattern of (00 0001 1100 01). The primary purpose of the shift of the destination is to achieve right and circular shifts on the A registers 22, 24 and 26 and the B register 28. All other allowed functions are valid into the destination's most significant bit.

It is also interesting to observe, if the X operand field 110 is X = A1; the operation and Y select field 112 is X + B; and the destination field 114 is A1 S, then the following instruction (01 0001 1101 01) will be executed. In executing this instruction, addition will occur on bit 8 of both the A1 register 22 and the B register 28 and the resulting bit is placed into bit 1 (the most significant bit) of the A1 register 22. Thereafter, bit 7 (the least significant bit plus 1) of the A1 register 22 is added to all bits of the B register 28, and the side effects on the adder condition bits (MST bit 76, LST bit 74, AOV bit 78, and ABT bit 80) result accordingly.

The last interesting side effect of a serial implementation of the adder 30 which will be discussed is that the adder overflow condition bit 78 (AOV) is really the initial and intermediate carry flip-flop (the AOV condition register 294 described later) for the serial adder 30. As such, whenever a "+1" operation is called for, the initial carry is set. In fact, the initial carry is set whenever bit 6 of the operation and Y select field 112 of a logic unit instruction 68 is a ZERO. However, the initial carry flip-flop is enabled for intermediate carries only on arithmetic functions. For example, on the mnemonic X OR B operation (defined by bits 3 through 6 of a logic unit instruction 68 as 1100), bit 6 is ZERO, therefore the AOV condition bit 78 is set and remains set until a subsequent logic unit operation changes it.

The last type of instruction which comprises the inruction set for the programmable unit 10 of the presıt invention is the external instruction 118, see FIG.

The external instruction 118, also called a device )EV) instruction, is comprised of two fields, namely, ıe LITERAL TO DEV field 120, and the command ›de for an external instruction 118. The LITERAL O DEV field comprises the first eight bits of the inruction, while the command code is assigned to the :maining four bits of the external instruction 118. The ›mmand code for an external instruction 118 is, in the referred embodiment, 0011 for bits 8 through 12, re›ectively. In executing an external instruction 118, the rst eight bits of the instruction, which comprises the ITERAL TO DEV field 120, are sent serially out on ıe DATA OUT line 34 (bit 8 first). An external inruction 118 is utilized with respect to outside or ex:rnal devices only to the extent that a programmer and designer of input/output interfaces to these external evices deem appropriate.

The coding of the function specified by the literal to ıe device external to the programmable unit 10, and ıe design of that device's hardware should be accomlished in parallel in order to minimize the hardware xpense and maximize program efficiency. If the codıg of the function and design of the external interface 0 is not performed in parallel, then the result would robably be either a very expensive interface or an ex·emely inefficient program, or both.

Briefly with regard to timing and control signals for ıe programmable unit 10, in the preferred embodiıent timing is provided by a clock which is external to he programmable unit 10 itself. During the execution f any instruction stored in microprogram memory 14, clock pulses are counted, at which time the control nit 18 generates a LAST PULSE (LP) signal 122 and hen waits for a memory cycle complete pulse (MCC) ignal 126 before starting the next instruction (see FIG. 4). The memory cycle complete pulse 126 is always ıecessary to initiate execution of a microinstruction. 'he waiting time between instruction execution is for nemory cycling and instruction decoding. Note, how·ver, a MCC pulse 126 can be initiated any time after ; clock pulses have elasped since a preceeding MCC ›ulse 126, and after sufficient time has elasped for nemory cycling and instruction decoding.

The programmable unit 10 also generates a train of :LOCK OUT (CO) pulses 124 which is an eight count :lock signal synchronized with the clock pulses re:eived from the external clock. No CLOCK OUT ›ulses 124 are generated by the programmable unit 10 luring the period that a last pulse (LP) signal 122 is ;enerated. The CLOCK OUT pulses 124 and the last ›ulse 122 are provided by the control unit 18.

A control signal is also necessary to clear the MPCR ·egister 44 to zero address. An externally provided :LEAR (CLR) signal 128 is used to clear the MPCR ·egister 44 to zero address. With regard to data paths nto and out of the programmable unit 10, data is fed :o the B register 28 during a BEX-type logic unit instruction 68 serially by the way of the DATA-IN path. Output from the programmable unit 10 is by way of the DATA OUT line 34. This line 34 carries the output from adder 30 during all logic type instructions 68, and a literal during all external type instructions 118, otherwise the signal is undetermined and constant.

DETAILED DESCRIPTION OF THE SPECIFIC CIRCUITRY

Figures 30, 30H:
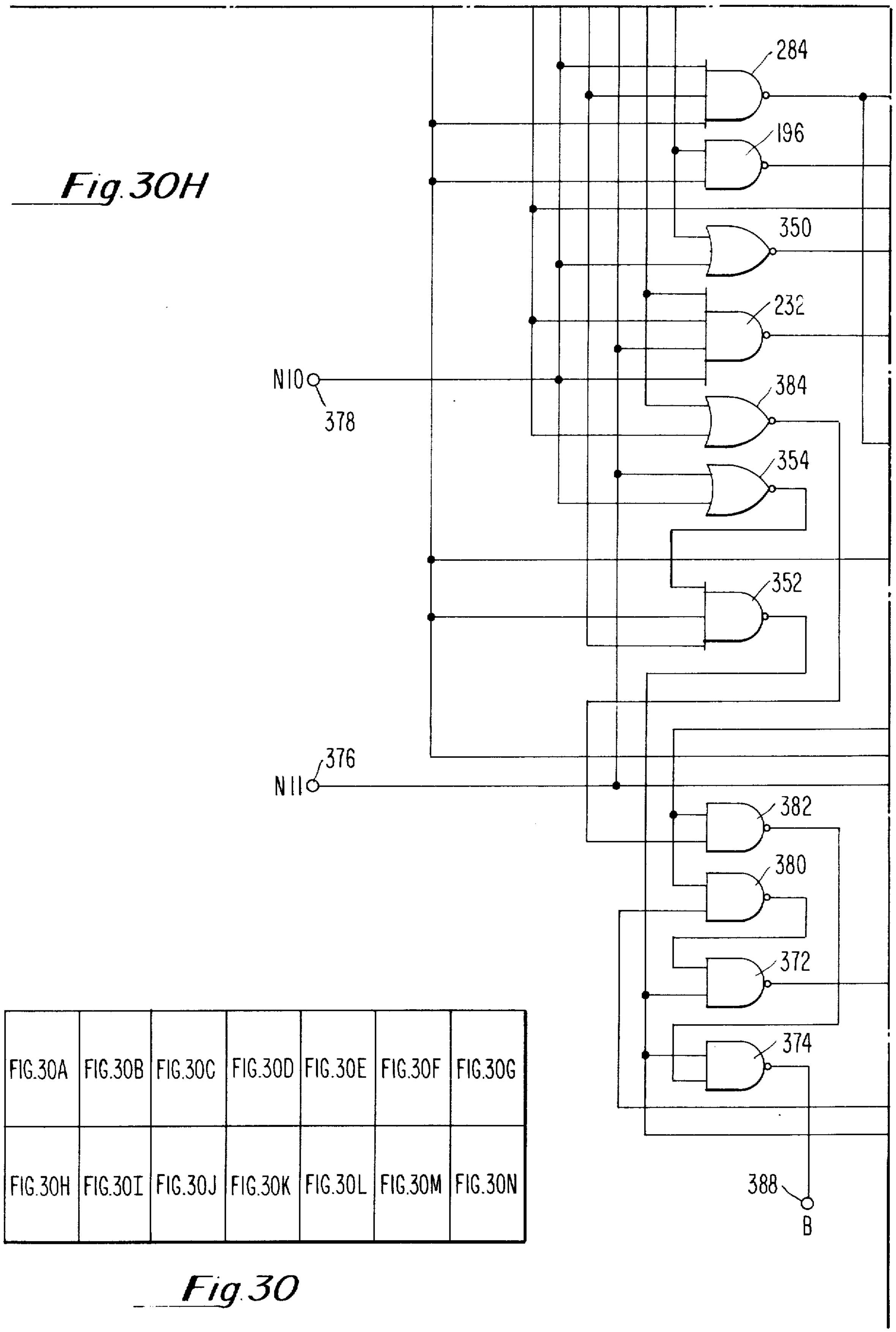
FIG. 30 comprises FIGS. 30*a* through 30*n* which together in a composite relationship is a logic block diagram of a preferred illustrative embodiment of the present invention.
Figure 30A:
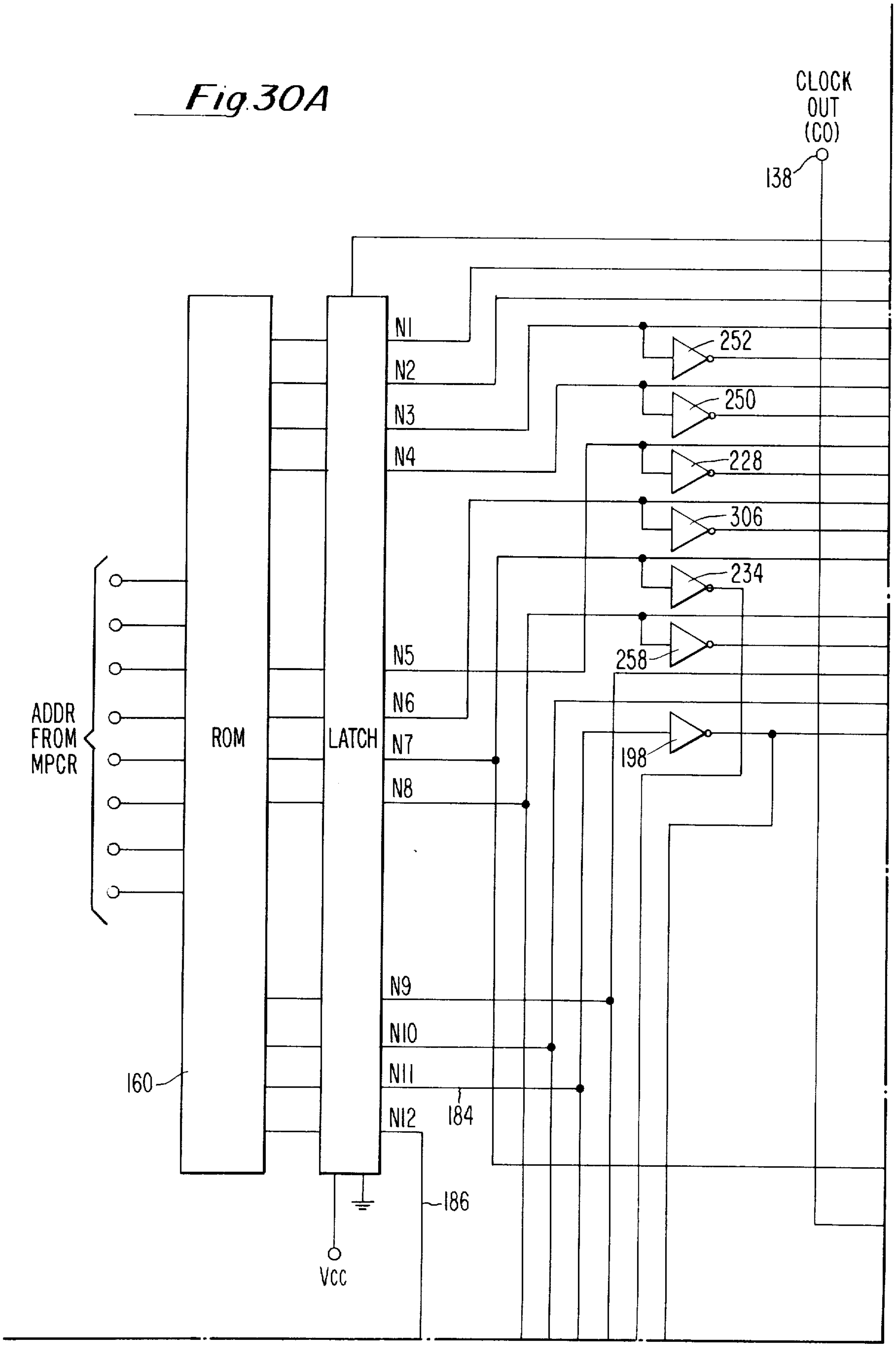
Figure 30B:
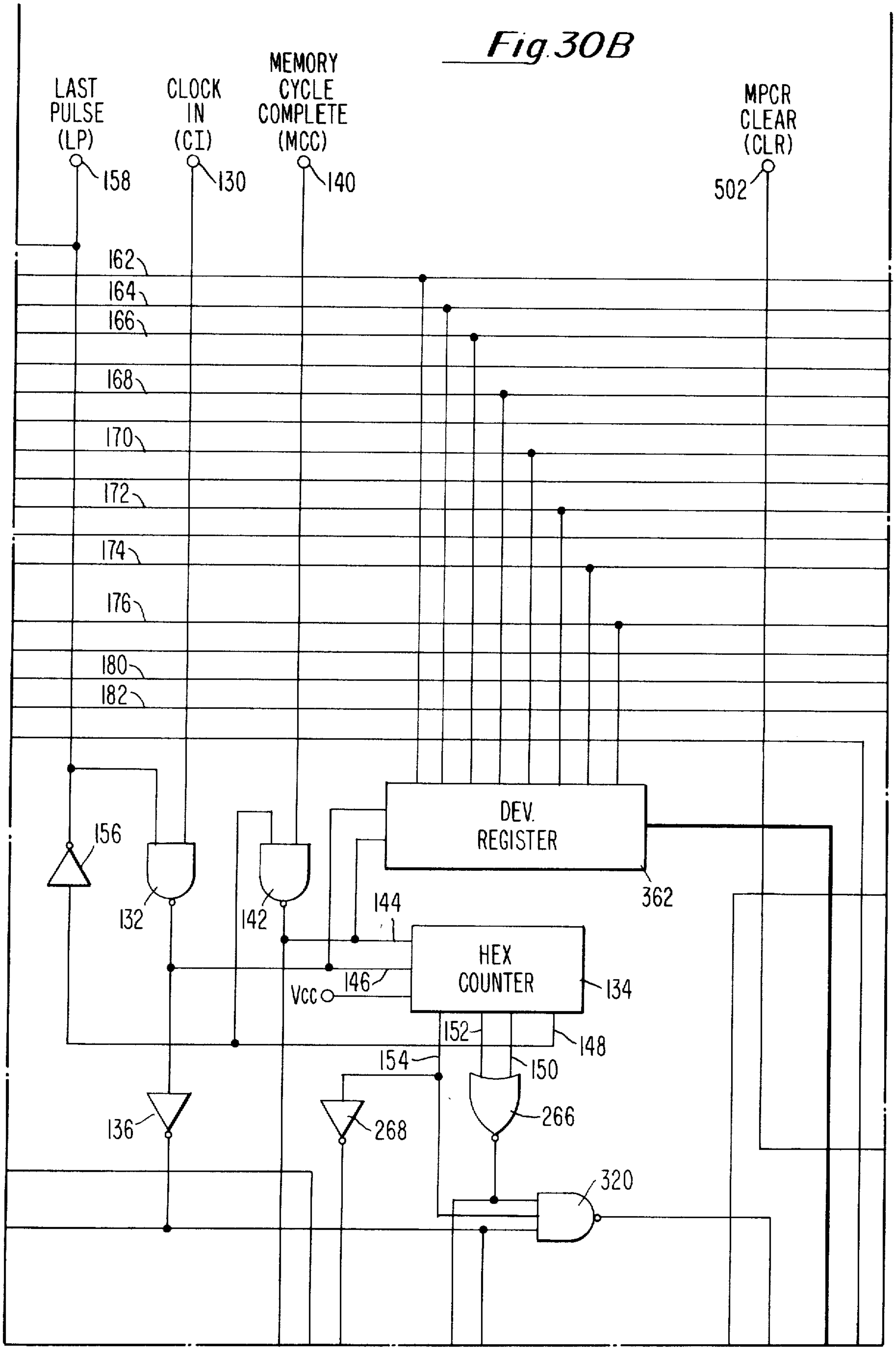
Figure 30C:
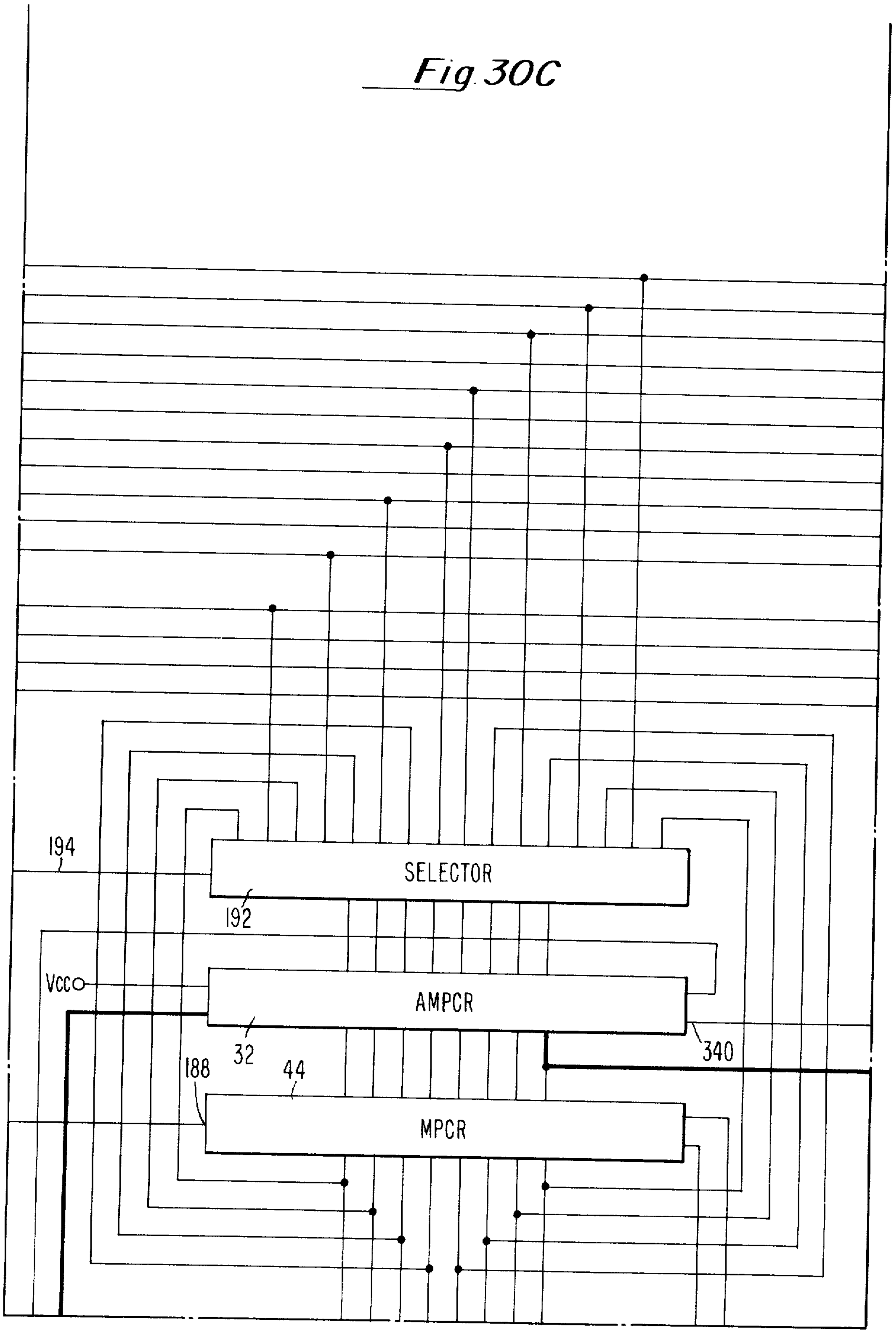
Figure 30D:
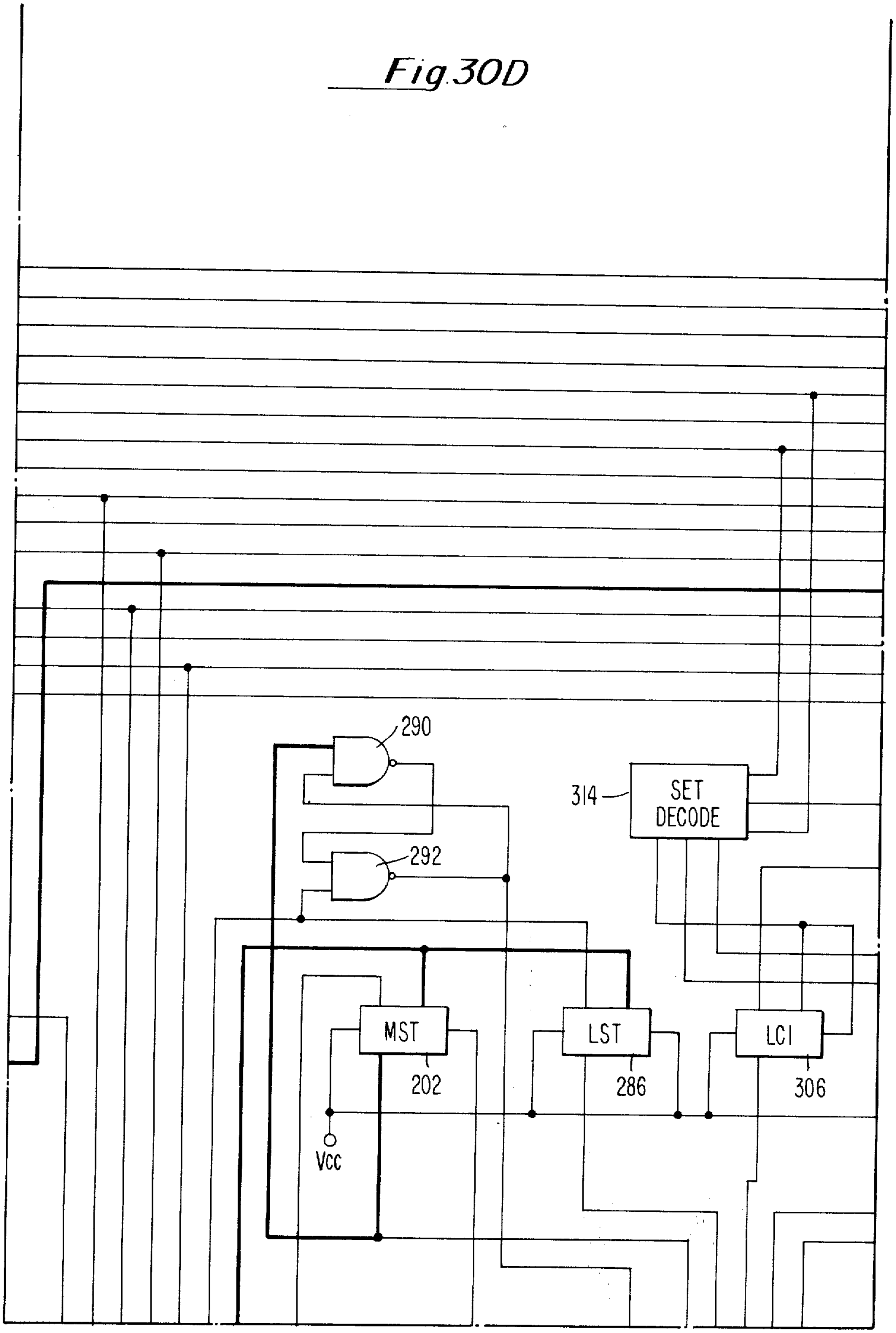
Figure 30E:
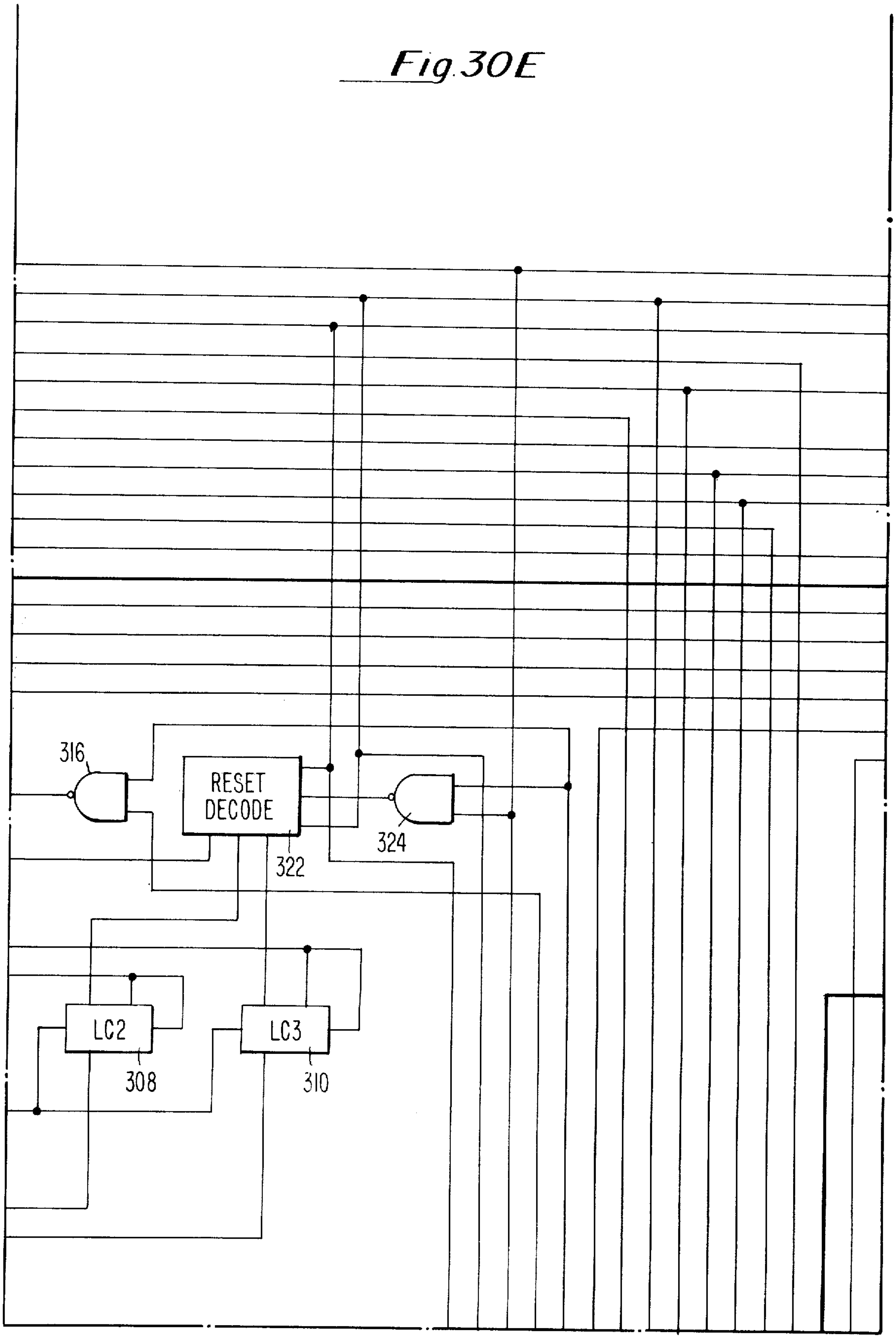

Referring now to the specific circuitry, positive going clock pluses supplied by an external clock system are applied via a CLOCK IN (CI) terminal 130 of the programmable unit 10 to a two input NAND gate 132, see FIG. 30*b*. The output of NAND gate 132 is connected to a count up terminal 146 of a hexa-decimal counter 134 which is a 4-bit binary counter having four output terminals 148, 150, 152 and 154. Also connected to the output of NAND gate 132 is an inverter 136 the output of which is applied to a CLOCK OUT (CO) terminal 138 of the programmable unit 10. Memory cycle complete (MCC) pulses 126, which are also supplied by the external clock, as shown in FIG. 2, are applied to an input terminal 140 of the programmable unit 10. The input terminal 140 is connected to a two input NAND gate 142 the output of which is connected to a clear terminal 144 of the hexadecimal counter 134.

In the preferred embodiment the most significant digit of the output of the hexadecimal counter 134 is supplied by terminal 148, while the least significant digit is supplied by terminal 154. The next most significant digit is supplied by terminal 150 and the next least significant digit is supplied by terminal 152. Output terminal 148 of hexadecimal counter 134 is applied as the second input to NAND gate 142 and is also applied through an inverter 156 to the second input of NAND gate 132. From this arrangement, before a pulse can be applied to the clear terminal 144 of hexadecimal counter 134, output terminal 148, which represents the most significant digit of counter 134 must be a high. Thus, before a memory cycle complete pulse (MCC) 126 can clear hexadecimal counter 134, counter 134 must have counted at least 8 clock pulses. Moreover, from this arrangement, once counter 134 has counted 8 clock pulses, further CLOCK IN (CI) pulses are inhibited by NAND gate 132 until a memory cycle complete pulse (MCC) 126 is again applied. Furthermore, CLOCK OUT (CO) pulses which are a mirror image of CLOCK IN (CI) pulses are inhibited by action of NAND gate 132 when counter 134 has counted 8 clock pulses.

Figure 10:
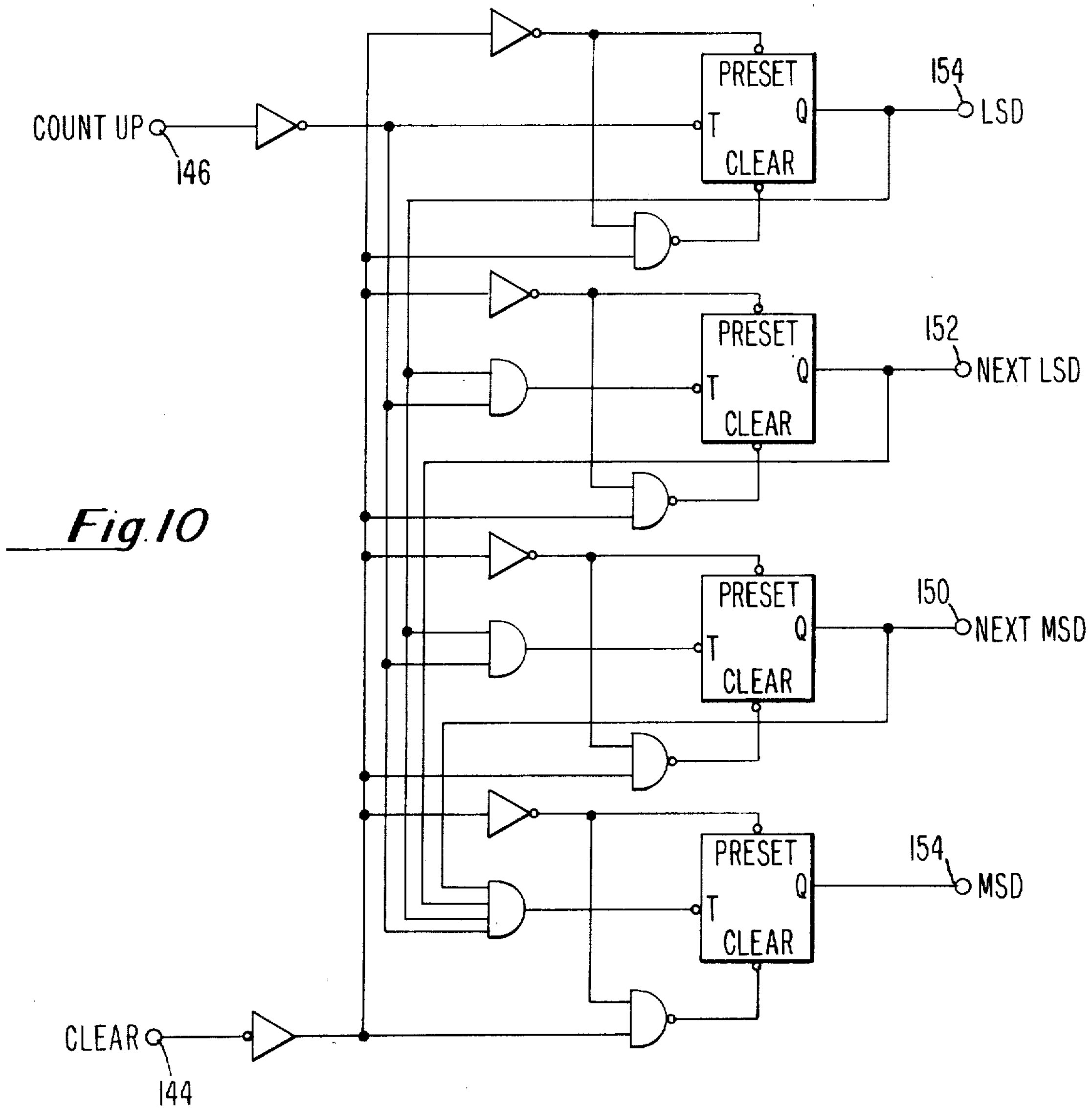
FIG. 10 is a logic diagram for a hexadecimal counter employed in the programmable unit of the present invention.
Figure 15:
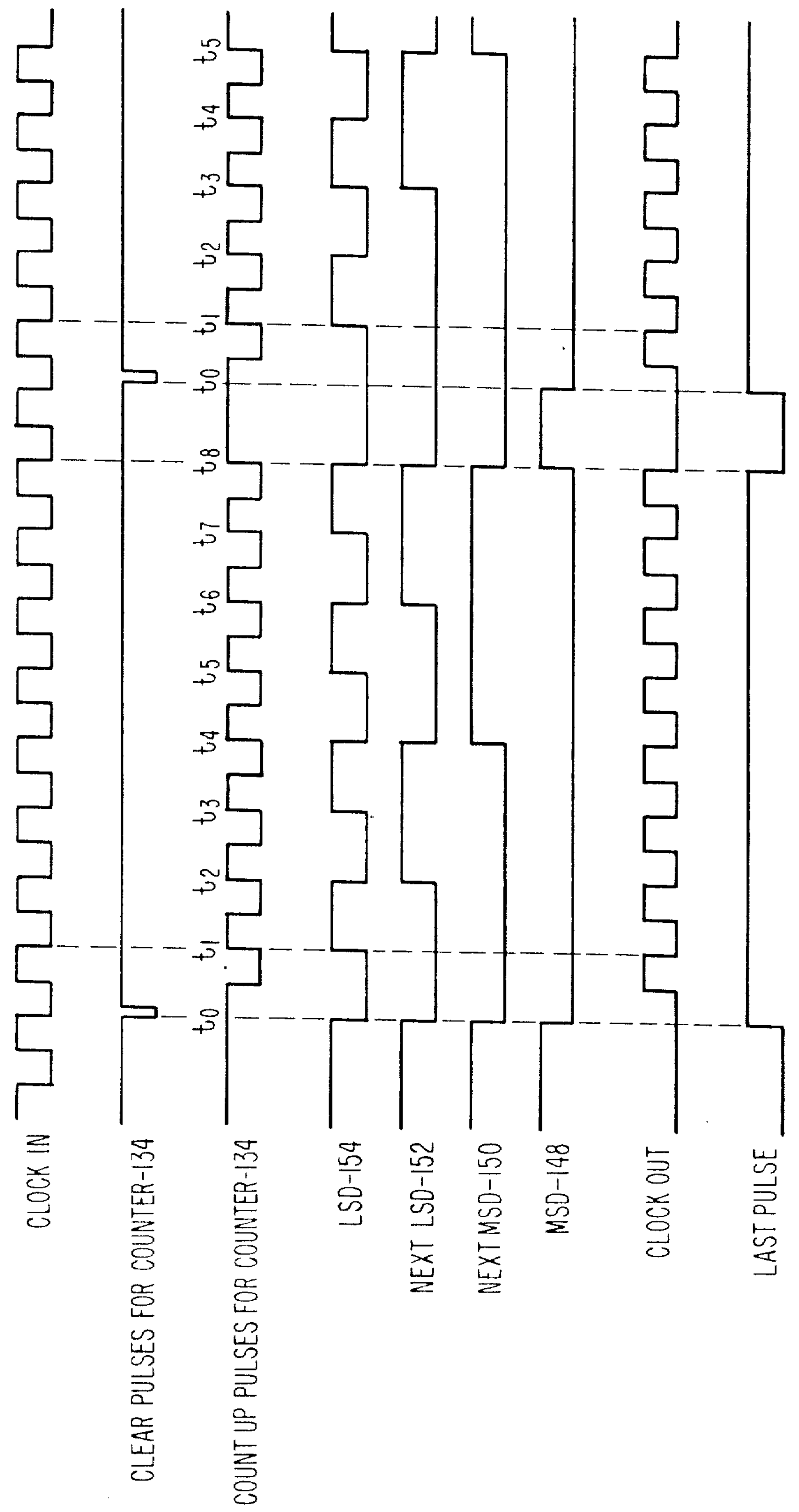
FIG. 15 is a timing chart for various clock control pulses associated with the hexadecimal counter of the present invention.

A logic diagram for counter 134 is shown in FIG. 10, and a timing diagram of the various clock and control pulses associated with counter 134 is illustrated in FIG. 15. Note that counter 134 is designed to be triggered only upon the rising edge of a count up pulse (inverted CLOCK IN pulses) and cleared upon the rising edge of a memory cycle complete pulse 126. For purposes of future discussion time $t_0$ is defined as the point in time which coincides with the leading edge of a memory cycle complete pulse 126, while time $t_n$ ($n \geq 1$) is defined as a point in time which coincides with the falling edge of positive going CLOCK IN pulses provided by the external clock.

Application of the rising edge of a Memory Cycle Complete pulse (MCC) 126 at the time $t_0$ clears the hexadecimal counter 134, thereby inhibiting NAND gate 142 by causing a low to appear on the most significant digit terminal 148 of the hexadecimal counter 134. A low on terminal 148 also allows CLOCK IN pulses to pass through NAND gate 132 to the count up terminal 146 o hexadecimal counter 134 and to the CLOCK OUT terminal (CO) 138 of the programmable unit 10 via the inverter 136. Counter 134, begins counting at time $t_1$, and upon counting to eight, (time $t_8$) causes a high to appear on terminal 148, thereby inhibiting NAND gate 132 from passing further CLOCK IN (CI) pulses to the programmable unit 10.

Also connected to the output of the inverter 156 is a LAST PULSE (LP) output terminal 158 of the programmable unit 10. From this arrangement, a LAST PULSE 122 will appear at the LP output terminal 158 only upon a count of eight being reached by the counter 134 at time $t_8$, see FIG. 15. It is also evident, that CLOCK OUT (CO) pulses will appear at the output terminal 138 of the programmable unit 10 until the LAST PULSE 122 is initiated by hexadecimal counter 134. At time $t_8$ a high on output terminal 148 of the counter 134 inhibits further CLOCK OUT pulses until application of a new MCC pulse 126. Note that the application of the rising edge of a MCC pulse 126 simultaneously clears the output of counter 134 and terminates the last pulse.

Considering a static memory for the present, a 256 word-12 bit, read only memory (ROM) 160 is provided to store only executable instructions for the programmable unit 10. In the preferred embodiment eight control lines 161 are necessary to address memory 160 and the 12-bits of each instruction that is stored by memory 160 are provided by 12 output terminals.

Figure 31:
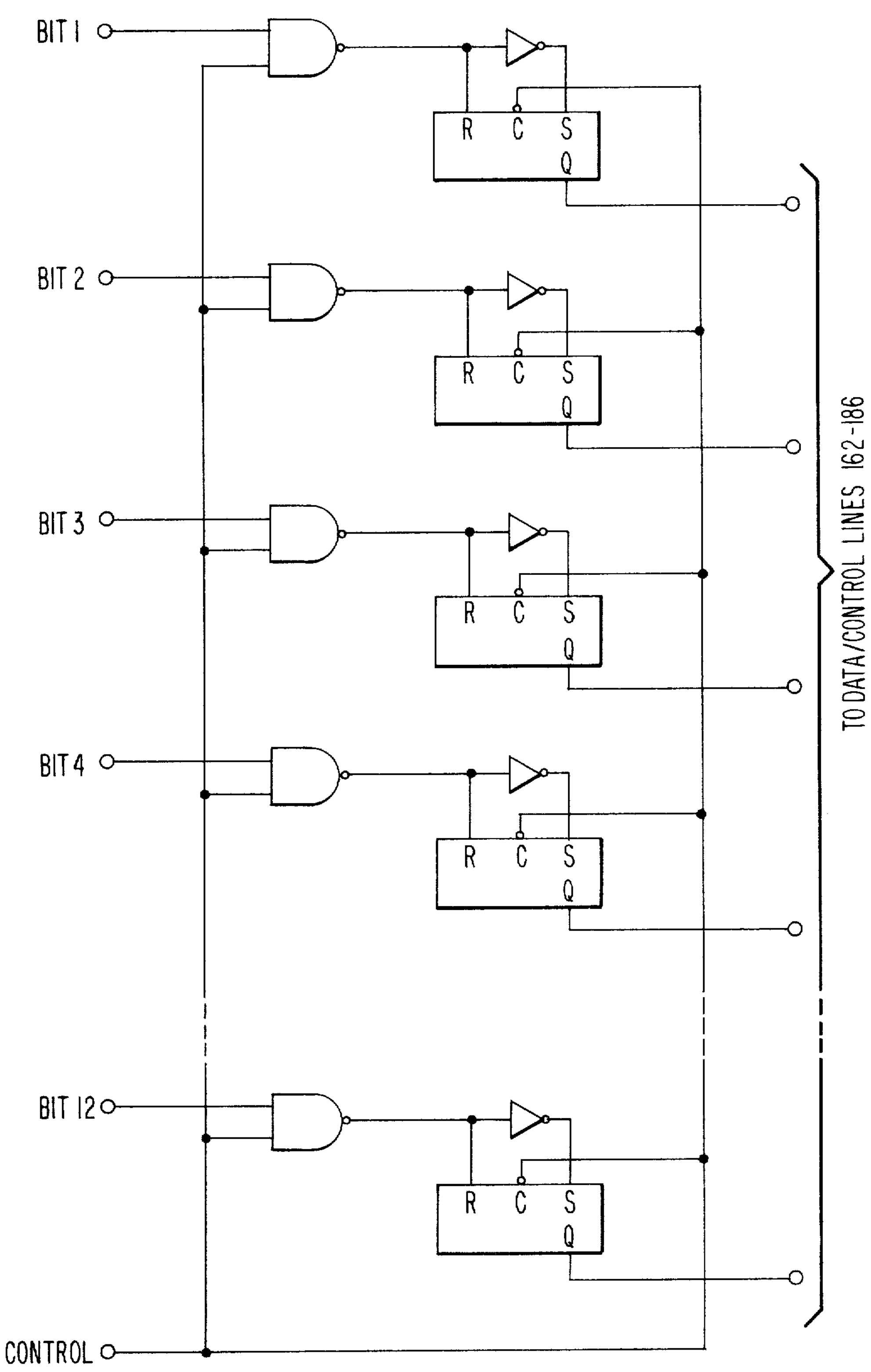
FIG. 31 is a logic diagram for a 12-bit parallel-in parallel-out instruction register employed in the programmable unit of the present invention.

An instruction register 500, FIG. 31, which will be discussed in detail later, is provided to insure that each instruction stored in the read only memory 160 is completely executed before another instruction is addressed and fetched for execution. Briefly, the instruction register 500 is a 12-bit storage register which receives the 12 binary signals of an addressed instruction from the read only memory 160 and stores these signals until a LAST PULSE 122 is generated. Twelve data/control lines 162, 164, 166, 170, 172, 174, 176, 180, 182, 184, 186, respetively, are connected to the output of the instruction register 500 for providing the data/control signals to the control and logic portion of the programmable unit 10. The MPCR register 44 has eight output terminals for supplying the address to the address control lines 161 of the read only memory 160 and eight data input terminals for receiving address information from the AMPCR register 32. In addition, the MPCR register 44 has a clear terminal 188, a count up terminal 190, and a load terminal 191. These terminals as well as the MPCR register 44 will be discussed in detail later.

The AMPCR register 32 has eight output terminals for supplying jump addresses to the MPCR register 44 and eight input terminals for receiving data from a selector 192.

Figure 11:
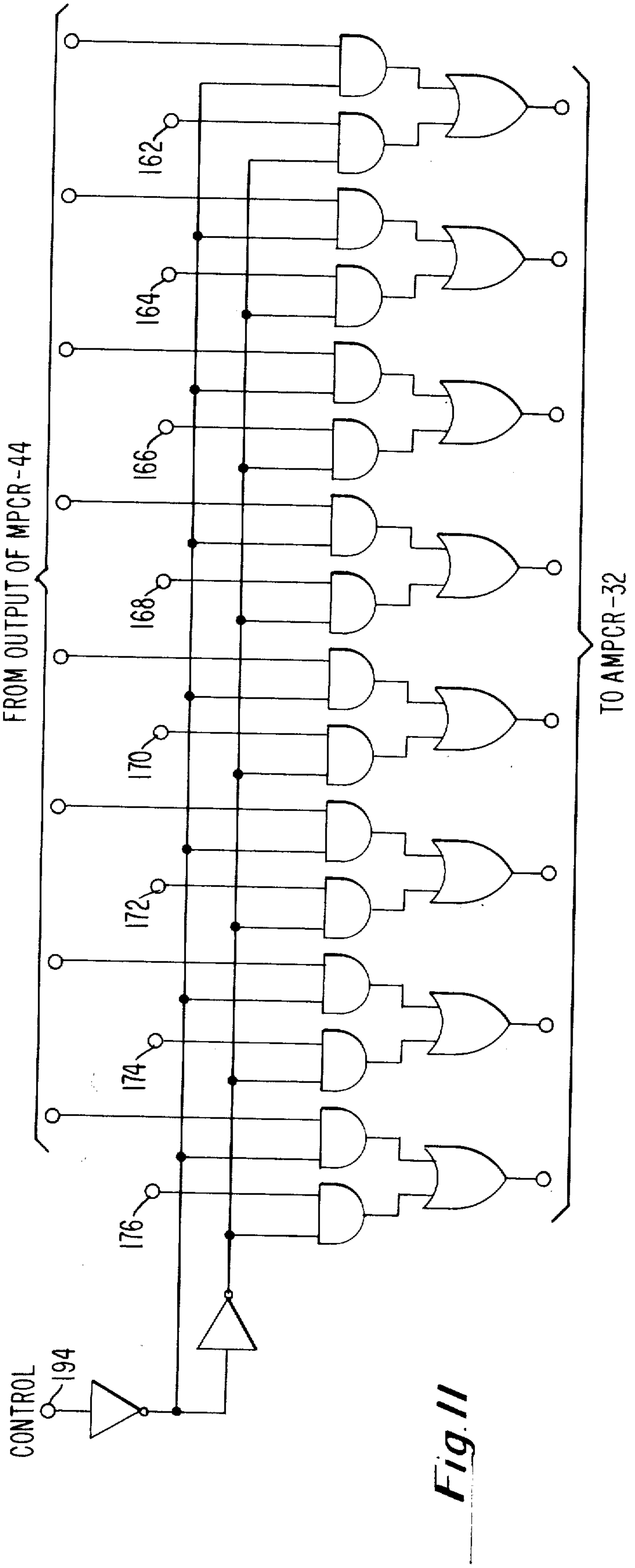
FIG. 11 is a logic diagram for a 16 line to eight line multiplexer employed in the programmable unit of the present invention.

Selector 192 has 16 data input terminals and a control input terminal 194 (FIG. 11). Eight of the data input terminals of selector 192 are connected to the first eight data/control lines (i.e. 162–176) while the remaining eight input terminals for selector 192 are connected to the eight output terminals 161 of the MPCR 44.

Depending upon the control signal applied to the control terminal 194 of the selector 192, selector 192 either loads the AMPCR register 32 with a literal value (the first eight bits of a literal type instruction 64) decoded from microinstructions stored in the read only memory 160 or with the address presently stored in MPCR register 44. Therefore, selector 192 can select between loading the AMPCR register 32 with jump addresses decoded from literal instructions stored in the read only memory 160, or cause a SAVE successor command to be executed by loading the present address stored in the MPCR register 44 into the AMPCR register 32.

As previously discussed, the twelve bits of each of the possible 256 instructions stored in the read only memory 160 of the preferred embodiments are decoded into four types of instructions: literal, condition, logic, and external (DEV). Eight of the twelve-bits can be transferred directly into the AMPCR register 32 via selector 192 or into the B register 28.

Logic Unit Instruction

To decode a logic unit instruction 68, a two input NAND gate 196 is utilized for recognizing the command code 116 of a logic instruction, see FIG. 30*h*. One input to the NAND gate 196 always receives bit 12 (data/control line 186) of any instructions stored in the read only memory 160 while the second input always receives the complement of the binary representation of bit 11 (data/control line 184) of every instruction stored in the read only memory 160. The complement of bit 11 is provided by the output of an inverter 198 the input of which is connected to the bit 11 data/control line 184. Since the command code 116 for a logic unit instruction is always 01, the output of NAND gate 196 is always low when a logic type instruction 68 is executed by the microprogrammable unit 10.

The output of NAND gate 196 is supplied as one of the two inputs to a NOR gate 198. The second input to NOR gate 198 is provided by the output of NAND gate 142, which gates memory cycle complete pulses (MCC) 126 to clear the hexadecimal counter 134.

Remembering that the output of NAND gate 142 is low only during the time period a MCC pulse 126 is provided by the external clock (assuming of course that hexadecimal counter 134 has counted at least 8 clock pulses since a preceeding MCC pulse 126), the output of NOR gate 198 will be low for all logic type instructions 68 except during the time period of a MCC pulse 126.

Clock pulses which are required for the execution of logic type instruction 68 are provided by the output of a two input NAND gate 204. The two inputs to NAND gate 204 are, respectively, the inverted output of NAND gate 196, which is high for all clocks during the execution of all logic type instructions 68, and the output of inverter 136, which represents CLOCK OUT (CO) pulses. The output of NAND gate 196 is inverted by an inverter 206. As is evident from this arrangement, the output of NAND gate 204 is high for all clocks except during the execution of a logic type instruction 68 by the programmable unit 10. During the execution of a logic instruction 68, the output of NAND gate 204 resembles the output of NAND gate 132. However, even during the execution of a logic type instruction 68, the output of NAND gate 204 must switch high during the generation of a last pulse (LP) 122 by the hexadecimal counter 134. This is true since the inverted output of the most significant digit of counter 134 (the output of terminal 148) is applied as an input to NAND gate 132, which gates CLOCK IN (CI) pulses for the processing unit 10.

The output of NAND gate 204 is applied as a clock input to each of the three A registers 22, 24, 26; (see FIG. 30f) as one of the clock inputs to the B register 28; (see FIG. 30g) as an input to the clock input of a MST ondition register 202; and as one of the inputs of a two nput NOR gate 214. The operation of the MST condiion register 202 will be described in connection with he circuitry relating to a condition test instruction 66, vhile a discussion of the function of NOR gate 214 will e deferred until the AMPCR register 32 is described.

Figure 12:
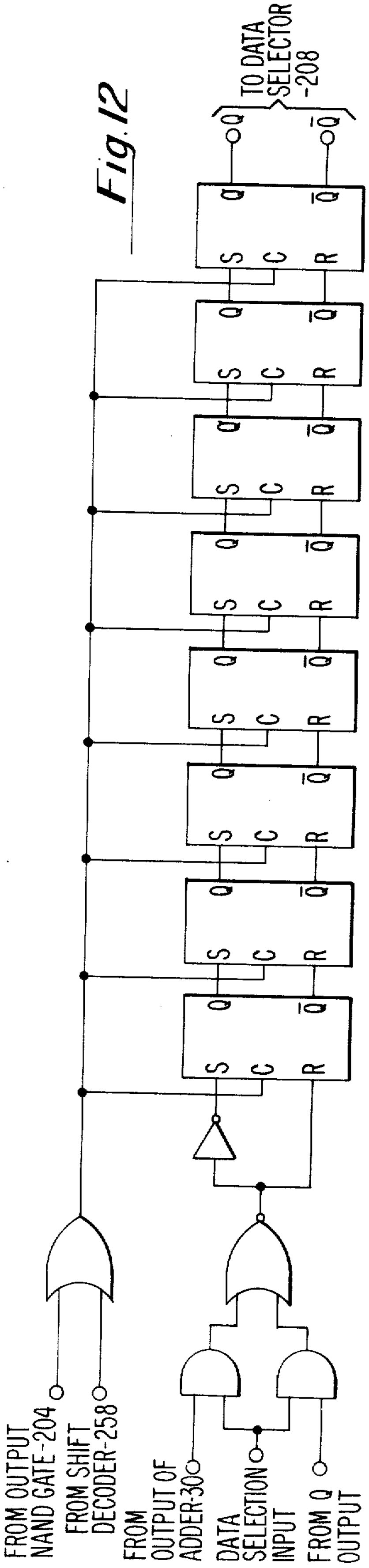
FIG. 12 is a logic diagram of an 8 bit recirculating shift register employed in the programmable unit of the present invention.
Figure 14:
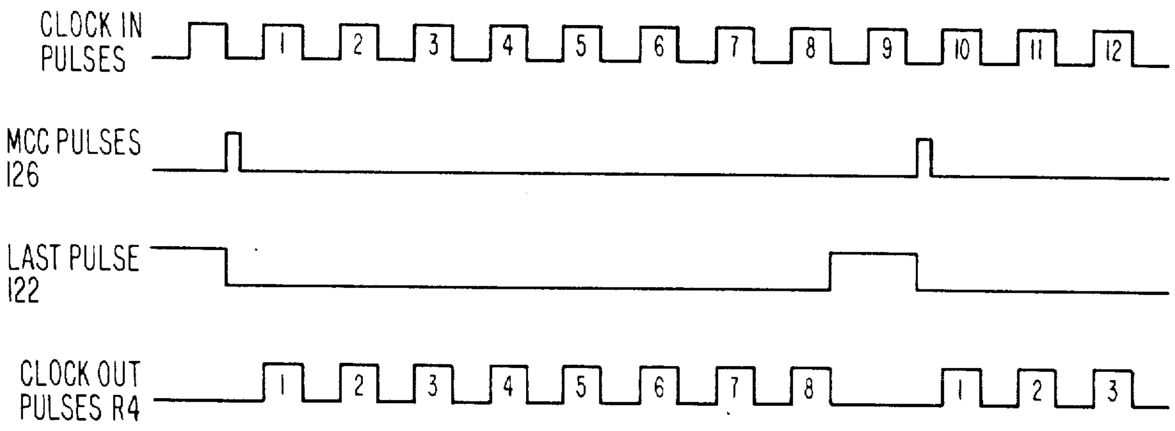
FIG. 14 is a timing chart of the various clock pulses supplied to and generated by the programmable unit of the present invention.
Figure 30F:
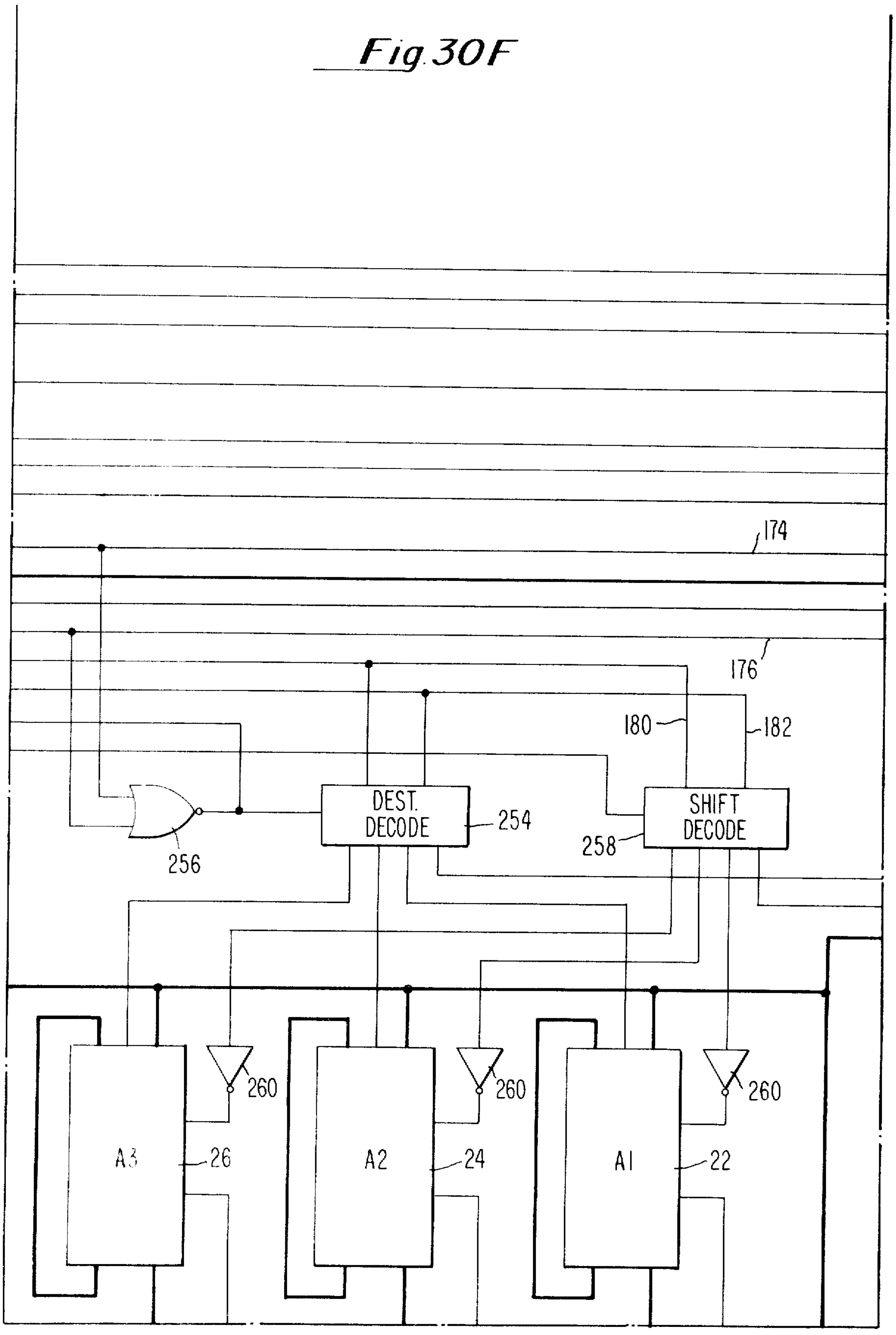
Figure 30G:
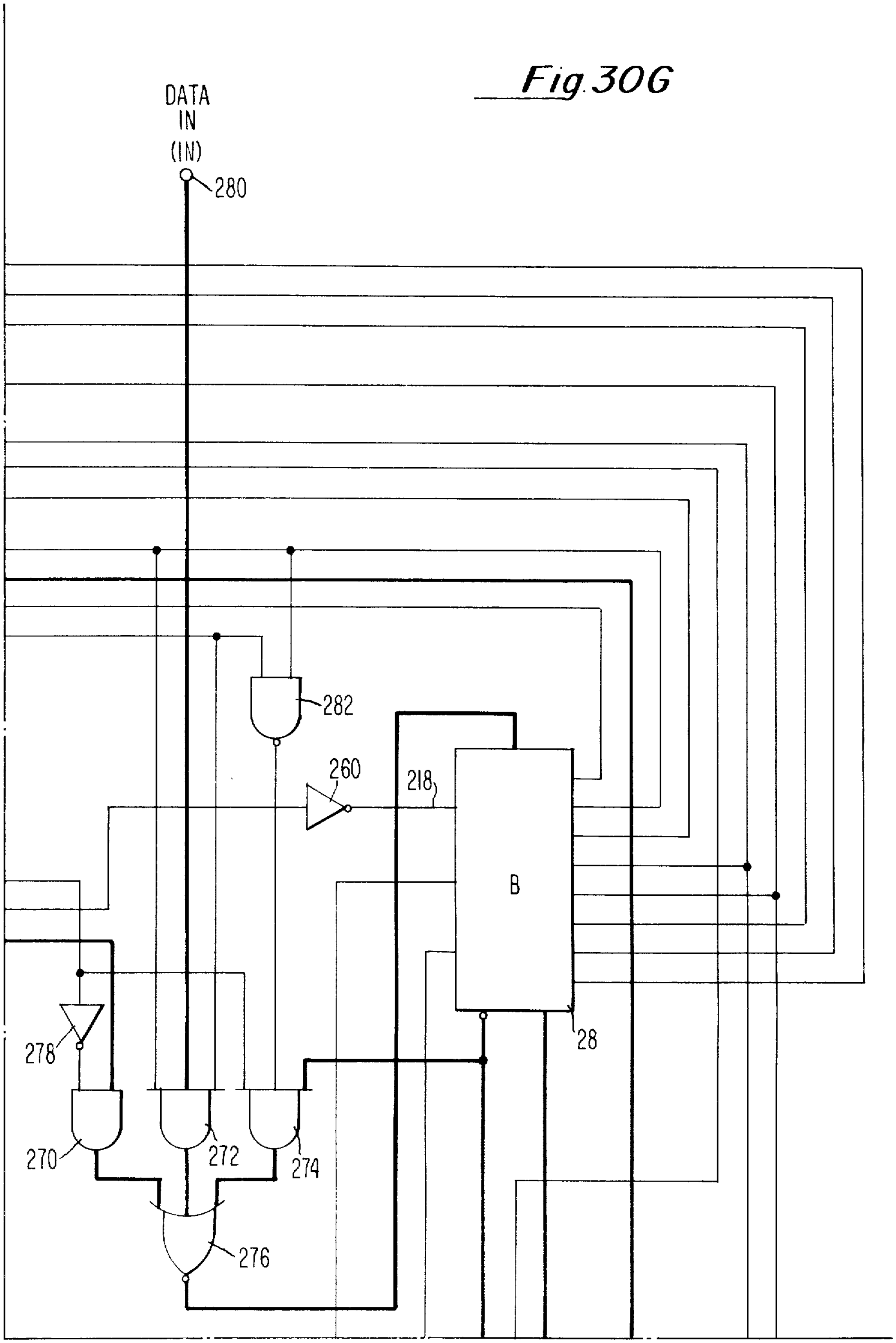
Figure 30I:
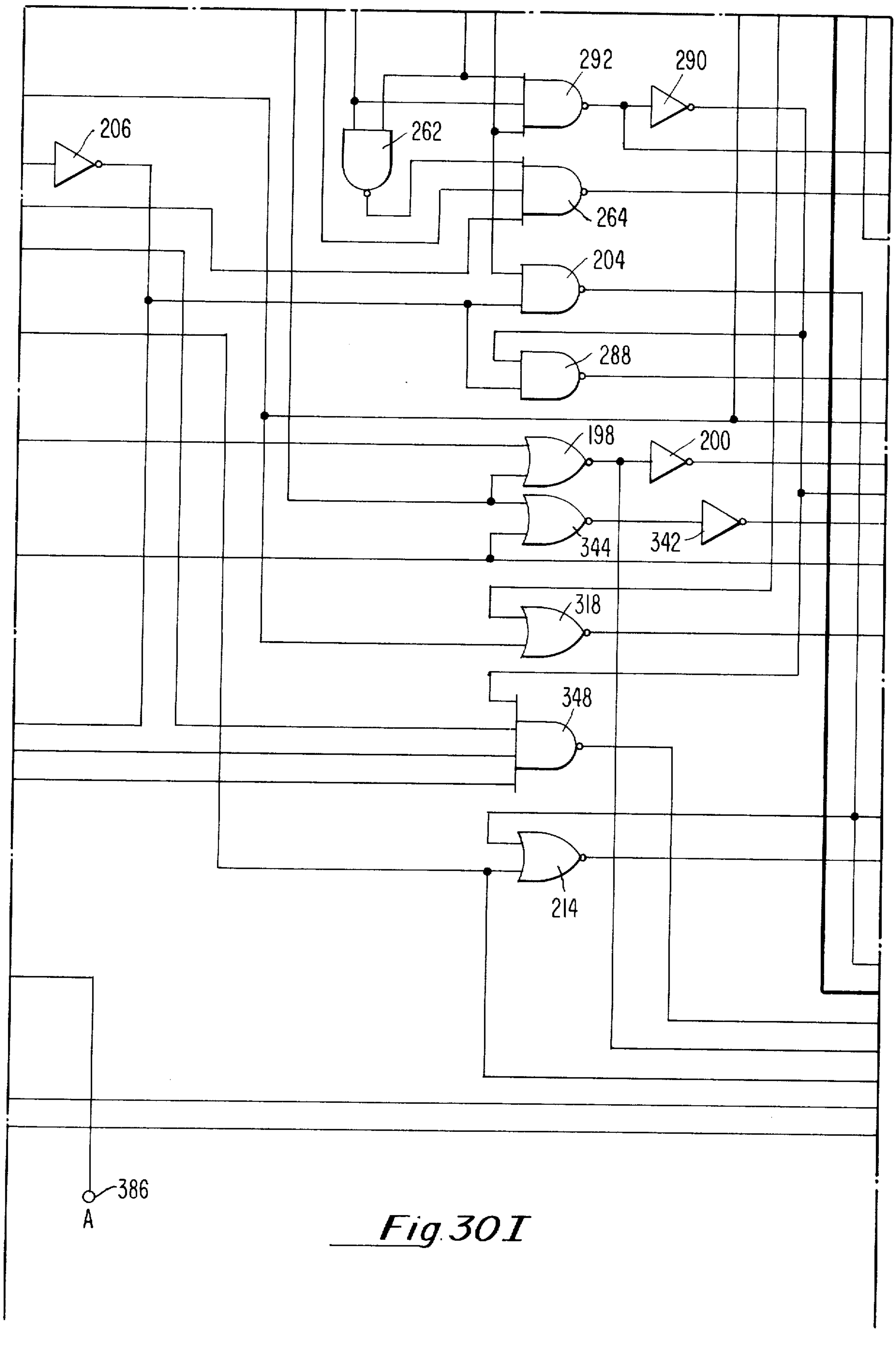
Figure 30J:
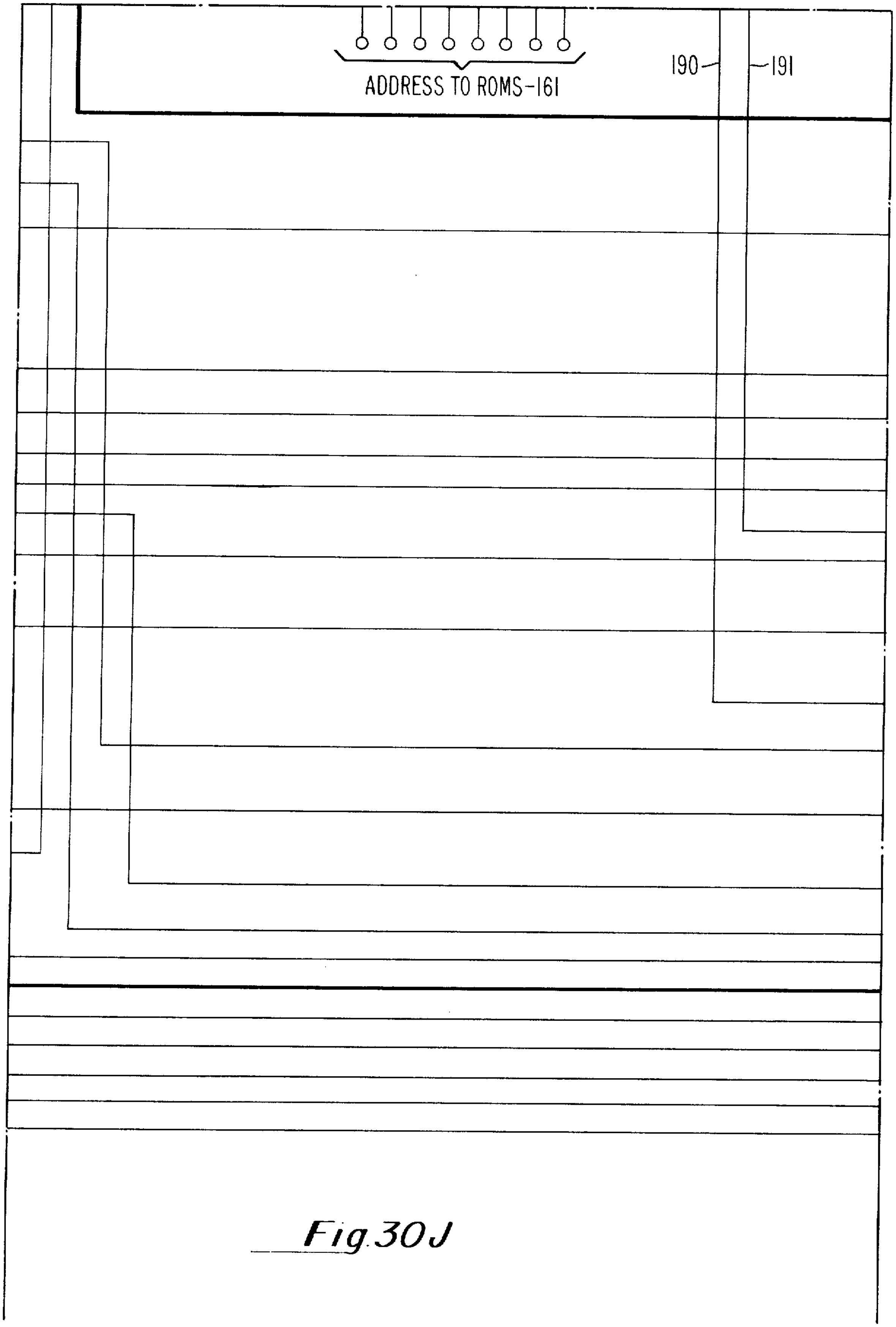

As briefly discussed, each of the A registers 22, 24, !6 is an 8-bit serial shift register, see FIG. 30f. Each egister is provided with a 2-input multiplexer circuit nd complementary serial outputs Q, and $\overline{Q}$, as shown n FIG. 12. In addition, each A register is provided with data selection input terminal for receiving control sigals for selecting which of the two inputs to the A regisers will be activated. In the preferred embodiment the ) output of each of the three A register 22, 24, 26 is ed back as one of the possible two inputs to each A egister. The $\overline{Q}$ outputs of each of the A registers 22, !4, 26 are applied as the three inputs to a data selector !08.

Figures 16, 21:
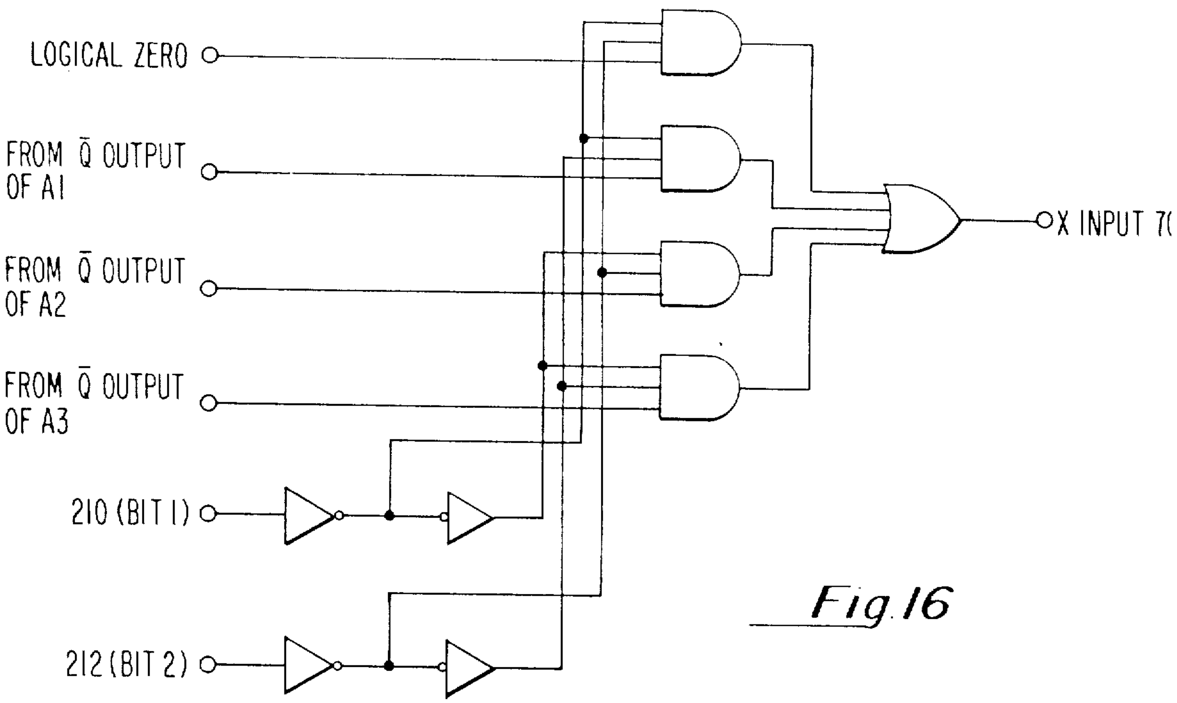
FIG. 16 is a logic diagram for a four line to one line multiplexer employed in the programmable unit of the present invention.
FIG. 21 is a truth table for the condition register of FIG. 8.

Data selector 208 (see FIG. 16) which is a conventional 2-bit multiplexer is comprised of inverters and lrivers to provide binary decoding data selection to ermit multiplexing from four lines to one line. The unction of data selector 208 is to select one or none f the $\overline{Q}$ outputs of the three A registers 22, 24, 26 as he X input 70 into the adder 30. Data selector 208 is ontrolled by two control lines 210, 212, respectively, vhich are connected to data/control lines 162, 164, respectively. These later data/control lines carry signals epresenting the binary representation of bits 1 and 2, espectively, of any microinstruction stored in the ROM memory 160. The truth table for data selector 208 is shown in FIG. 17.

As previously discussed, the Y operand input 72 into adder 30 can be provided from the output of several sources. Through appropriate gating the contents of the B register 28 and the AMPCR register 32 may serve as the Y input 72 to the adder 30.

Figure 18:
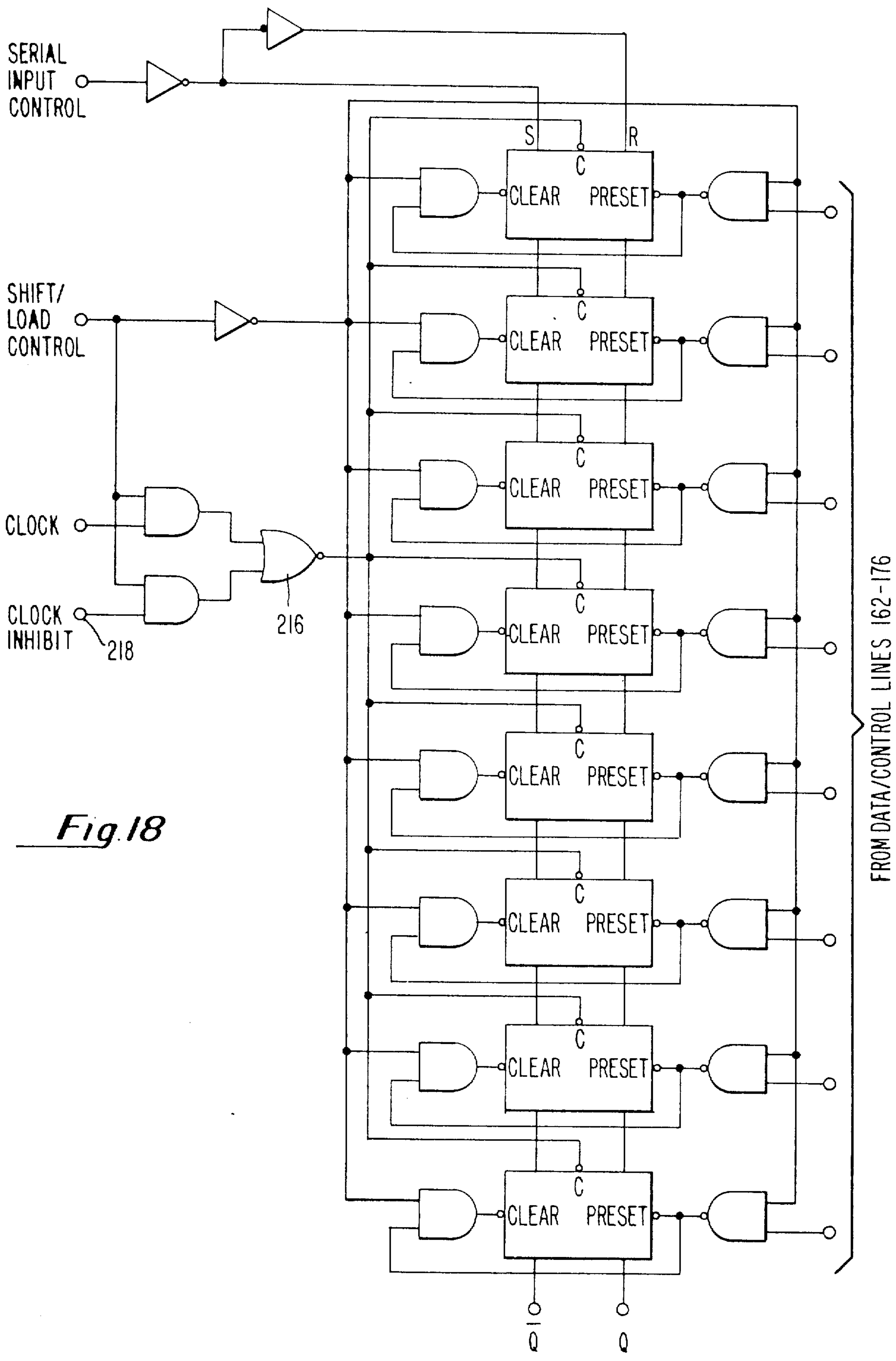
FIG. 18 is a logic diagram for a parallel-load eight-bit shift register employed in the programmable unit of the present invention.

In the preferred embodiment the B register 28 is an 8-bit parallel- to -serial data converter which shifts the data to the right when clocked, see FIG. 18. Parallel-in access to each stage is made available by 8 individual direct data inputs which are enabled by a low level at a shift-load control input terminal of the B register 28. B register 28 also features gated clock inputs and complementary outputs Q, $\overline{Q}$ from the output of the 8th stage. Clocking is accomplished by a two-input positive-NOR gate 216, permitting 1 clock input 218 to be used as a clock function. Holding either of the 2 clock inputs high inhibits clocking, and holding either clock input low with the shift-load control input high enables the other clock input. The clock-inhibit input 218 should be changed to the high level only while the clock is high. Parallel loading is inhibited as long as the shift-load control input is high. When taken low, data at the eight parallel inputs are loaded directly into the register independently of the state of the clock.

Analysis of the sixteen possible types of arithmetic and logic functions which can be defined by a logic unit instruction 68, will reveal that some arithmetic operations require the true contents of the B register 28 as opposed to the complement of the contents of the B register 28. To select between the true output (Q) of the B register 28 or its complement ($\overline{Q}$) an AND-NOR combination is employed, (see FIG. 34). This AND-NOR combination, which is shown in FIG. 2 as selection gate network 42, is comprised of three AND gates 220, 222, 224 and a NOR gate 226. AND gates 222, 224 have three inputs while AND gate 220 only has two inputs.

The output of each of the AND gates is applied as the inputs to the NOR gate 226. AND gate 220 gates the complement of the input of the B register 28 with the signal appearing on data/control line 170 (bit 5 of any instruction stored in ROM memory 160). The complement to the signal appearing on data/control line 170 is achieved by the use of an inverter 228. Thus the output of AND gate 220 is high only for those arithmetic or logic operations in which bit 5 of a logic unit instruction 68 is a binary 0. The AND gate 222 gates the true or Q output of the B register 28 along with the signals carried by data/control lines 168 (bit 4) and 170 (bit 5). From this arrangement, the output of the AND gate 222 is high only for those arithmetic or logic functions in which both bits 4 and 5 of the logic unit instruction are a binary 1.

The function of AND gate 224 is to select the serial output of the AMPCR register 32 as the Y operand input 72 to the adder 30.

As noted earlier, if the AMPCR register 32 is not selected as the destination register, then the four arithmetic/logic operations using AMPCR register 32 as the Y input 72 into the adder 30 will have 0 for the Y input 72. In the preferred embodiment these operations using the AMPCR register 32 as the Y operand input 72 to adder 30 can only be transferred back to the AMPCR register 32. Analysis of a logic unit instruction 68 will reveal that the only destination field 114 which specifies the AMPCR register 32 as the destination of the output of the adder 30 has a bit pattern of 0111 (octal 7) for bits 7 through 10, respectively. Thus, to detect the AMPCR register 32 as a destination of the output of the adder 30, a four input NAND gate 232 is employed. The four inputs to NAND gate 232 are, respectively, the signals carried by data/control lines 176 (bit 8), 180 (bit 9), 182 (bit 10), and the complement of the signal carried by data/control line 174 (bit 7). The complement of the signal carried by data/control line 174 is provided by an inverter 234. With these respective inputs, NAND gate 232 will only be low when the AMPCR register 32 is specified as a destination of the results of the output of adder 30.

To insure that the operand Y input 72 will be all ZEROS when the AMPCR register 32 is selected as the Y operand input 72 into adder 30 but not as the destination register for the output of the results of the adder 30, a two input NOR gate 230 is employed in combination with AND gate 224. One input to a NOR gate 230 is from the output of the NAND gate 232 which decodes the AMPCR register 32 as the destination of the output of the adder 30, while the other input to NOR gate 230 is the signal on data/control line 168 (bit 4). The output of NOR gate 230 along with the serial output of the AMPCR register 32 and the signal on data/control line 170 are the three inputs respectively to the AND gate 224. As is evident from this arrangement the output of the NOR gate 230 will be positive when the AMPCR register 32 is selected as the destination register for the output of adder 30 and as the Y operand input 72 for an arithmetic or logic operation, see FIG. 34.

Figure 9:
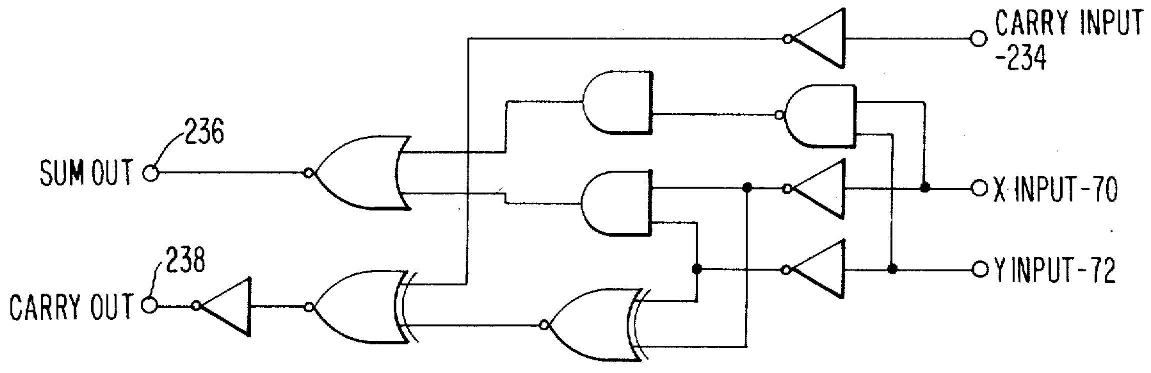
FIG. 9 is a logic diagram for a serial adder employed in the programmable unit of the present invention.

Adder 30 is a full adder designed for serial and ripple-carry parallel adder operation, see FIG. 9. The three inputs into the adder 30 are the X operand input 70, the Y operand input 72 and a carry input 234. The standard outputs of adder 30 are the sum output terminal 236 and the carry out terminal 238.

To decode whether the output of the sum out terminal 236 or the output of the carry out terminal 238 or its complement is to be the output of the adder 30, an AND-NOR gating combination is employed. A two input AND gate 240 is utilized to gate the output of the sum out terminal 236 of the adder 30. One input to the AND gate 240 is the complement of the signal appearing on the data/control line 166 (bit 3) while the other input to AND gate 240 is the output of the sum out terminal 236 of the adder 30. The complement of the signal appearing on data/control line 166 is provided by an inverter 252.

A three input AND gate 242 is employed to gate the complement of the output of the carry out terminal 238 of the adder 30. Two of the inputs to AND gate 242 are, respectively, the signal appearing on data/control line 166 (bit 3) and the complement of the signal appearing on data/control line 168 (bit 4). The third input to AND gate 242 is the complement of the output of the carry out terminal 238 of adder 30. The complement of the output of the carry out terminal 238 is achieved by an inverter 248, while the complement of the signal appearing on data/control line 168 is achieved by an inverter 250.

The true output of the carry out terminal 238 of adder 30 is gated by a three input AND gate 244. Two of the inputs to AND gate 244 are, respectively, the signal appearing on data/control line 168 (bit 4) and the signal appearing on data/control line 166 (bit 3). The remaining input to AND gate 244 is the output of the carry out terminal 238 of the adder 30. The outputs of the three AND gates 240, 242 and 244 are applied as inputs into a three input NOR gate 246.

From this AND-NOR combination, AND gate 240 gates as the output of the adder 30 the sum of the X and Y operands. Note that the results of the adder 30 will be the output of the sum out terminal 236 only when bit 3 of a logic unit instruction 68 is a ZERO.

As is evident from the sixteen possible arithmetic and logic type functions that can be specified by a logic unit instruction 68, the AND gate 240 will gate for the first 8 arithmetic/logic functions previously described the output of the sum out terminal of the adder 30. The AND gate 242 will gate, as the results of the output of adder 30, the complement of the output of the carry out terminal 238 for all logic unit instructions 68 in which the logic levels for bits 3 and 4, are respectively, 10. More specifically, AND gate 242 gates as the output of the adder 30 the carry out signal for all NOR and NAND logic functions (operations 9 through 12) which can be performed by the programmable unit 10.

The AND gate 244 gates as the output of adder 30 the output of the carry out terminal 238 when bits 3 and 4 of a logic unit instruction 68 are both binary 1. In the preferred embodiment this situation only occurs for the remaining four possible arithmetic/logic functions (operations 13 – 16) which can be specified by a logic unit instruction 68.

Figures 19, 20:
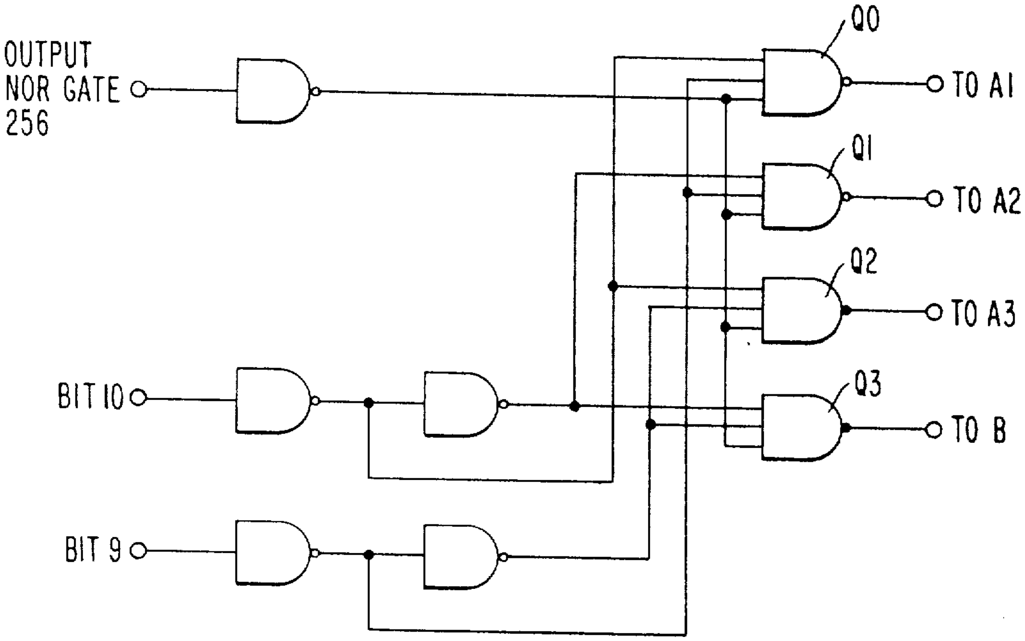
FIG. 19 is a logic diagram for a binary to one-of-four-line decoder employed in the programmable unit of the present invention.
FIG. 20 is a truth table for the binary to one-of-four-line decoder of FIG. 19.

To determine the destination of the output of the adder 30, decoder 254 is employed. Decoder 254 converts two lines of input data to a one-of-four output. To provide an inhibit capability for decoder 254 an enable input terminal is provided, see FIG. 19. A truth table for decoder 254 (FIG. 20) reveals that the enable signal must be in the low state to perform the decode operations defined by the truth table. An analysis of a logic unit instruction 68 and a review of the discussion with regard to the destinations which can be specified by a logic unit instruction 68 will reveal that, in essence, bits 9 and 10 of a logic unit instruction 68 specify the destination of the input of the adder 30, while bits 7 and 8 of the instruction specifies modifications or additional processing with regard to the output of the adder 30. The two input lines to decoder 254 are, respectively, the signal on the data/control line 180 (bit 9), and the signal on data/control line 182 (bit 10). Three of the four outputs of the decoder 254 are connected to the data select input terminals of the A register 22, 24, and 26. The fourth output terminal of decoder 254 is applied as an input into selection network 38 associated with the B register 28, see FIG. 2. This selection network will be described momentarily.

Depending upon the control input signals to decoder 254, the control signals applied to the data select input terminals of the A registers 22, 24, 26 will cause the appropriate A register to select between the data recirculated from the Q output of that register or the appropriate output of the adder 30 as the appropriate input into the A register.

When an OUT destination is decoded the operation of the decoder 254 must be inhibited. A two input NOR gate 256 is provided for this purpose. The two inputs to NOR gate 256 are, respectively, the signal appearing on data/control line 174 (bit 7) and the complement of the signal appearing on data/control line 176 (bit 8). The complement of the signal appearing on data/control line 176 is provided by an inverter 258. The output of the NOR gate 256 is applied as the control signal to the enabled input terminal of the decoder 254. From this arrangement, a high will only appear on the enabled input terminal of decoder 254 when a OUT destination or the AMPCR register 32 is specified as the destination of the output of the adder 30.

To decode a destination specified by the destination field 114 of a logic unit instruction 68 which includes the additional operation S for SHIFT, a decoder 258 is employed. Decoder 258 is identical in operation to that of decoder 254 and further details of the structure of decoder 258 may be obtained by reference to the discussion with regard to the operation of decoder 254. The two inputs to decoder 258 are, respectively, the signal appearing on data/control line 180 (bit 9) and the signal appearing on data/control line 182 (bit 10). The complement of the four outputs of shift decoder 258 are OR'ed with the output of the NAND gate 204 and applied as the clock inputs for the A registers 22, 24, 26 and the B register 28. As previously discussed the output of the NAND gate 204 provides a low level signal for all clocks during the execution of any logic unit instruction 68. The complement of each of the four outputs of the shift decoder 258 is provided by inverters 260.

As previously discussed, a destination with the indicator S for SHIFT allows the destination register (specified by bits 9 and 10) to be shifted right end-off by one bit, where the most significant bit is supplied by the adder operating on the least significant bit of the X operand input 70 and the Y operand input 72. Thus the function of shift decoder 258 is to insure that only the first bit from the output of adder 30 is entered into the destination register (specified by the destination deode register 254), all other bits from the output of adder 30 being inhibited to that register by the ORing of the clocks to the A registers 22, 24 and 26.

In the preferred embodiment the key to the proper operation of shift decoder 258 is dependent upon the signal at the enable input terminal of the shift decoder 258. This enable-inhibit signal is obtained via a gating network from the least significant digit output terminal 154 of hexadecimal counter 134. The gating network which provides the enable-inhibit signal for the shift decoder 254 is comprised of a two input NAND gate 262 the output of which is applied to one of the inputs to a three input NAND gate 264. The inputs to NAND gate 262 are, respectively, the complement of the output of terminal 154 of hexadecimal counter 134, and the output of a two input NOR gate 266. The inputs to NOR gate 266 are, respectively, the outputs of terminals 150 and 152 of hexadecimal counter 134. Besides the output of NAND gate 262, the other two inputs to NAND gate 264 are, respectively, the signal on data/control line 174 (bit 7) and the signal on data/control line 186 (bit 12). It is the output of NAND gate 264 which is applied as the enable-inhibit input to the shift decoder 258.

In operation, as soon as the MCC pulse 126 is applied to the input terminal 140 of the programmable unit 10, all of the output terminals of the hexadecimal counter 134 are set to logical ZERO. Therefore, the output of inverter 268 and the NOR gate 266 are high at time $t_o$, resulting in a low at the output of NAND gate 262 which in turn causes a high on the output of NAND gate 264 irrespective of the condition of the signals on data/control lines 174 (bit 7) and 186 (bit 12). Thus, at time $t_o$, the operation of shift decoder 258 is inhibited, and will remain inhibited until the falling edge of the first clock pulse (time $t_1$) is gated by NAND gate 132. Thus, when a destination register is flagged with the S for SHIFT operation, only the first clock pulse out of the NAND gate 204 is permitted to be clocked to the appropriate A or B register designated by the destination decoder 254, since the output of the shift decoder 258, when enabled, will inhibit all clocks to the designated register.

As briefly discussed, the B register 28 is a parallel-load 8-bit shift register comprised of eight stages which shift data from one stage to another to the right when clocked. In addition, the B register 28 also features serial input capability by providing a serial input terminal, see FIG. 18. The eight inputs into the B register 28 are, respectively, the signals on data/control lines for bits 1 through 8. The normal clock input signal for the B register 28 is from the output of NAND gate 204, while the clock inhibit signal input is from the output of the shift decoder 258 via the inverter 260.

Selection gate 38 (see FIG. 2) is comprised of three AND gates 270, 272, 274, the output of which are applied as inputs to a NOR gate 276. The output of NOR gate 276 is applied as the serial input to the B register 28. The function of AND gate 270 is to gate the input of the adder 30 serially as the input to the B register 28. Therefore, the inputs to AND gate 270 are the input of the NOR gate 246 and the output of the destination decoder 245 via an inverter 278. From this arrangement, AND gate 270 will only gate signals from the output of the adder 30 when the B register 28 is specified as the destination register by the destination field 114 of a logic unit instruction 68.

The function of AND gate 272 is to decode a BEX operation. In addition to controlling the output of the adder 30 into the register specified by the destination field 114 (i.e., A1, A2, A3, B), a BEX destination specifies a serial transfer from an external source through s DATA IN terminal of the programmable unit 10 to the B register 28. The data input to AND gate 272 is the signal applied to the DATA IN terminal 280 of the programmable unit 10, while the control inputs to AND gate 272 are the signals appearing on data/control line 174 (bit 7) and the complement of the signal appearing on data/control line 176 (bit 8), which is obtained from the output of the inverter 238. Analysis of a logic unit instruction 68 will reveal that AND gate 272 will gate signals only when a BEX type destination is specified by the destination field 114 of a logic unit instruction 68.

When an A register 22, 24, 26 is not selected as the destination register, the Q output of that register is recirculated as the data input to that register. When the B register 28 is not selected as the destination register, the $\overline{Q}$ output of the B register 28 is recirculated back into the B register. This latter operation is accomplished by the AND gate 274. The data input to AND gate 274 is from the $\overline{Q}$ output of the B register 28, while the control inputs to the AND gate 274 are from and respectively, the appropriate output of the destination decoder 254 and the output of a two input NAND gate 280. The inputs to NAND gate 280 are, respectively, the signal appearing on data/control line 174 (bit 7) and the complement of the signal appearing on data/control line 176 (bit 8). From this arrangement, the $\overline{Q}$ output of the B register 28 is serially recirculated back into the B register 28 via AND gate 274, NOR gate 276 whenever the B register is not selected as a destination register, and when the destination field 114 of a logic unit instruction 68 does not specify a BEX type operation.

Condition Test Instruction

Turning now to circuitry required for executing a condition test instruction 66, a three input NAND gate 284 is employed to decode the command code for a condition test instruction 66, see FIG. 30h. The three inputs to NAND gate 284 are, respectively, the signals appearing on data/control lines 182 (bit 10), 184 (bit 11) and 186 (bit 12). As discussed, in the preferred embodiment, a condition test instruction 66 can select one of 8 condition bits for testing (the four adder condition bits: MST bit 76, LST bit 74, AOV bit 78 and ABT bit 80; an external condition bit — EXT 88; and the three local condition bits LC1 82, LC2 84, LC3 86 which are stored in the condition register 52).

Figure 8:
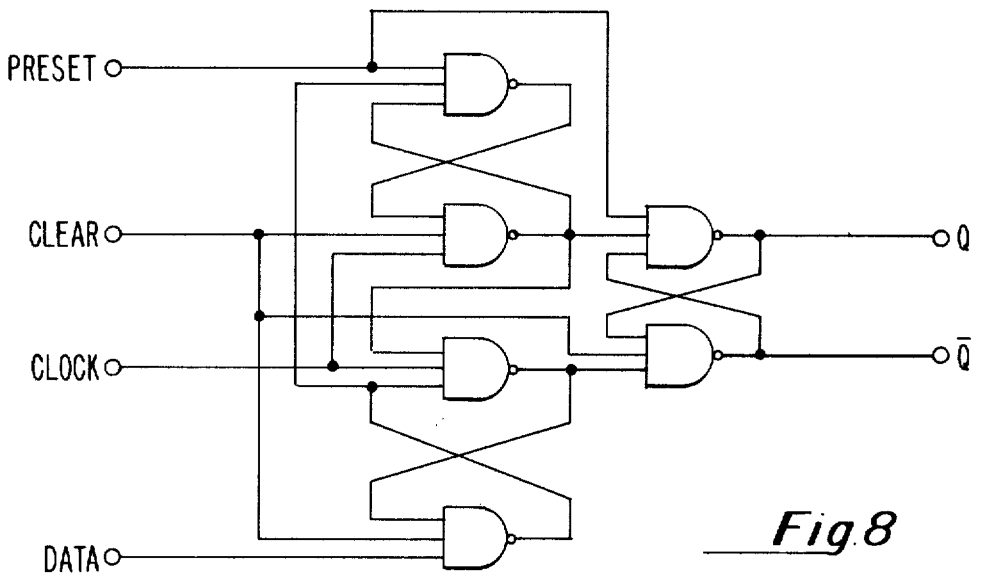
FIG. 8 is a logic diagram of a condition register employed in the programmable unit of the present invention.

The most significant bit true (MST) condition is tested by the programmable unit 10 by examining the state of a D-type flip-flop 202, see FIG. 8. D-type flip-flop 202 is the "most true bit" (MST) condition register and is set if the most significant bit or 8th bit out of the adder 30 is a binary 1 and reset if a binary 0. As is well known in the art, a D-type flip-flop has a pre-set input, a clock input, a data input, a clear input and complementary outputs Q and $\overline{Q}$. Information is transferred to the Q output on the positive edge of a clock input pulse.

The MST condition register 202 provides a one-bit storage or memory. In operation, the output of the MST condition register 202 is equal to the input delayed one clock pulse. A logic diagram for the MST condition register 202 is presented in FIG. 8. The preset and clear inputs of MST register 202, which are the asyncronous inputs, override all other inputs (e.g., clock and signal) such that a binary 0 on the pre-set terminal sets the Q output to the logical 1 level. Conversely, the Q output is set to a logical 0 by a 0 applied to the clear input. This feature is illustrated in the Truth Table for condition register 202 shown in FIG. 21. In the preferred embodiment, the clear input terminal of the MST register 202 is tied to a potential $V_{cc}$.

Signals for the preset input to the MST condition register 202 are obtained from the output of the NOR gate 198 via an inverter 200. Remembering that the output of NOR gate 198 will be high only during the time period of a MCC pulse 126, the Q output of MST condition register 202 is set to a logical 1 during the application of a MCC pulse 126. Adder 30 output information, which is applied as the data input signal for the MST condition register 202, is obtained from the output of the NOR gate 246.

Similarly, the least significant bit true (LST) condition is tested by examining the contents of a LST condition register 286. Logically, the LST condition register 286 is identical to the MST condition register 202. Adder output information which is applied as the data input to the LST register 286 is also obtained from the output of NOR gate 246. However, both the pre-set and clear terminals of the LST condition register 286 are tied to the potential $V_{cc}$.

The clock input signal for the LST condition register 286 is obtained from the output of a two input NAND gate 288. One of the inputs to NAND gate 288 is obtained from the output of the inverter 206 which is high only when a logic unit type instruction 68 is being executed by the programmable unit 10. The other input to NAND gate 288 is obtained from the output of an inverter 290, the input of which is obtained from a three input NAND gate 292. The three inputs to NAND gate 292 are, respectively, the output of the NOR gate 266, the output of the inverter 268, and the output of the inverter 136. With this arrangement of NAND gate 292 and inverter 290, the output of NAND gate 288 is low only during the first clock pulse after an MCC pulse 126 (time $t_o$ to $t_1$). Thus, the LST condition register 286 receives only one clock pulse which corresponds to the first clock pulse after a MCC pulse 126. The output of the LST condition register 286 is equal to the signal at the data input terminal of that register delayed by the one clock pulse applied to the clock input terminal of the condition register 286.

To test the all bits true (ABT) condition, a pair of two input NAND gates 290, 292 are utilized. The Q output of the MST condition register 202 is applied as one of the inputs into the first NAND gate 290, the output of which is applied as one of the two inputs into the second NAND gate 292. The other input into the NAND gate 292 is from the output of the NAND gate 288 while the second input into the NAND gate 290 is obtained from the output of the NAND gate 292. As a result of this arrangement, irrespective of the signal at the output of NAND gate 290, the output of NAND gate 292 will be high during the first clock pulse. If all the bits of the output of the adder 30 are true (ONE's), the output of NAND gate 290 must be low, thereby forcing the output of NAND gate 292 to be high for all clocks of a given adder operation. Should, however, any of the eight bits of the adder output be a low, then the output of NAND gate 292 must switch low and remain low until the execution of the next instruction address by the MPCR register 44.

An adder overflow condition (AOV) is tested by examining an AOV condition register 294. The AOV condition register 294 is identical in logic and structure to that of the MST condition register 202 and that of the LST condition register 286. The data input to the AOV condition register 294 is obtained from the carry out terminal 238 of the adder 30, while clock input signals are obtained from the output of a three input NAND gate 296. The three inputs to NAND gate 296 are, respectively, the output of the NAND gate 204 via an inverter 298; the complement of the signal on data/-control line 166 (bit 3) which is obtained from the output of the inverter 252; and the output of a two input NAND gate 300. The two inputs to the NAND gate 300 are, respectively, the signal appearing on data/control line 168 (bit 4) and the complement of the signal appearing on data/control line 170 (bit 5) which is obtained from the output of the inverter 228. The function of the NAND gate 300 is to decode the exclusive OR (X XOR B) and the equivalent (X EQV B) logic type functions by producing a low at the input of NAND gate 296 when either of these two logic functions are specified by a logic unit instruction 68.

The function, therefore, of NAND gate 296 is to decode strictly all arithmetic operations by producing a low at the clock input, terminal of the AOV condition register 294 for all clocks during the execution of a logic unit instruction 68. A signal for the preset input to the AOV condition register 294 is obtained from the output of a two input NAND gate 302, while a signal for the clear input terminal of the condition register 294 is obtained from a two input NAND gate 304. One input to each of the NAND gates 302,304 is the input of the NOR gate 198 which is low only during the application of a MCC pulse 126 when a logic type instruction 68 is being executed. The other input to NAND gate 302 is the signal appearing on data/control line 172 (bit 6) while the second input to NAND gate 304 is the complement of the signal appearing on data/control line 172 which is obtained from the output of an inverter 306.

Remembering that the preset and clear inputs to the AOV condition register 294 are independent of the clock input signal, a low input to the preset input terminal sets the Q output of the condition register 294 to a logical one, while a low input to the clear terminal sets the Q output to a logical 0. Thus, the function of NAND gate 302 is to set the Q output of the AOV condition register 294 to a logical 1 at time $t_o$ for the following arithmetic operations: $X + B$, $X + Z$, and $X - B - 1$. On the other hand, the function of NAND gate 304 is to set the Q output of the AOV condition register 294 to a logical ZERO at time $t_o$ for the following arithmetic operations: $X + B + 1$, $X \div Z + 1$, and $X + \overline{B} + 1$. The Q output of AOV condition register 294 is applied as the input to the carry in terminal 234 of the adder 30 to achieve the proper results for a given arithmetic operation. Note, the AOV condition register 294 is appropriately set when a MCC pulse 126 initiates an instruction execution cycle.

The three local condition bits 82, 84, 86 (LC1, LC2, LC3) are tested by examining, respectively, a LC1 condition register 306, a LC2 condition register 308, and a LC3 condition register 310. The three local condition :gisters 306, 308, 310 are logically identical to the [ST condition register 202.

As briefly discussed, the local condition bits are reset hen tested, and the set field 100 of a condition test in-ruction 66 is used to set a local condition register. foreover, it is necessary to test a condition which is ·ue in order to be able to set a local condition register. lore detail as to the operation of the local condition :gister will follow the discussion as to how the appro-riate test condition is selected.

Figure 22:
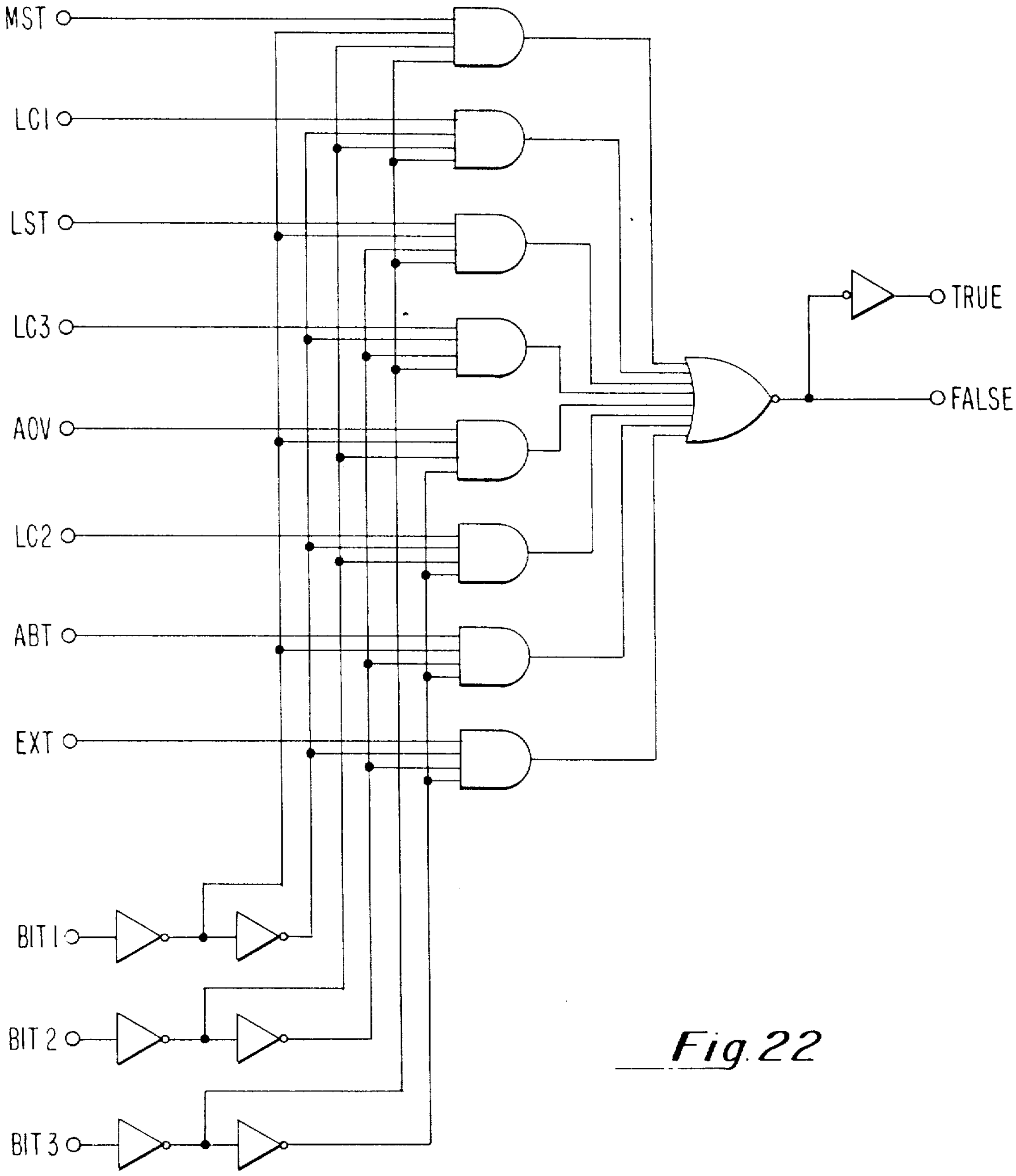
FIG. 22 is a logic diagram for an eight input data selector-multiplexer employed in the programmable unit of the present invention.

To determine which condition bit is to be tested, a ondition selector 312 is employed, see FIG. 22. In re-ɔonse to three control signals, condition selector 312 :lects one-of-eight data sources and provides comple-ientary outputs. The three control signals are, respec-vely, the signal appearing on data/control line 162 bit 1), the signal appearing on data/control line 164 bit 2), and the signal appearing on data/control line 66 (bit 3). The eight data inputs to condition selector 12 are the four adder condition bits (LST bit 74, MST it 76, AOV bit 78 and ABT bit 80), the external atten-ion level bit (EXT 88) and the three local condition its (LC1 bit 82, LC2 bit 84 and LC3 bit 86). The MST ·it 76 is obtained from the Q output of the MST condi-ion register 202, while the LST condition bit 74 is ob-ained from the Q output of the LST condition register :86. The AOV condition bit 78 is obtained from the $\overline{Q}$ ıutput of the AOV condition register 294 while the \BT condition bit 80 is obtained from the output of NAND gate 292. The EXT bit 88 is is obtained from an :xternal condition terminal 314 of the programmable ınit 10, while the three local condition bits are ob-ained from the Q outputs of the local condition regis-ers 306, 308, 310, respectively.

The Q output of condition selector 312 is employed ıs a control signal for setting the local condition regis-.er 306, 308, 310, while the complement of the output ɔf condition selector 312 is employed as a control for ıddress successor selection.

To determine which local condition register 306, 308, 310 is to be set a set decoder 314 is employed for decoding bits 4 and 5 of a condition test instruction 66.

Figures 23, 24:
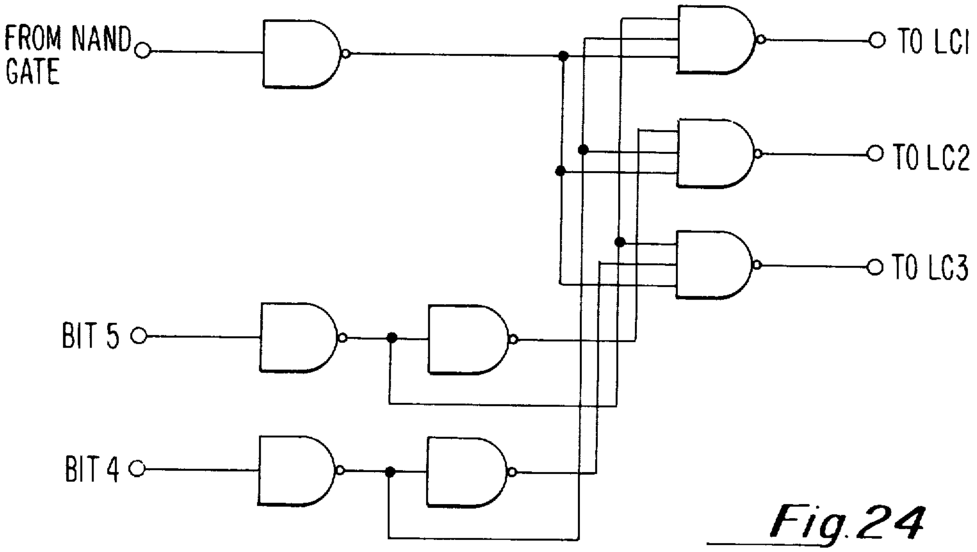
FIG. 23 is a truth table for the data selector-multiplexer of FIG. 22.
FIG. 24 is a logic diagram for a binary to one-of-three-line decoder employed in the programmable unit of the present invention.

The structure and logic of set decoder 314 is similar to that for destination decoder 254 and shift decoder 258, with the exception that the two input terminals are decoded into only three possible outputs. The logic dia-gram for set decoder 314 is shown in FIG. 24, and a corresponding Truth Table is shown in FIG. 25. The two control inputs for set decoder 314 are, respec-tively, the signal appearing on data/control line 168 (bit 4) and the signal appearing on data/control line 170 (bit 5). The three outputs of set decoder 314 are connected, respectively, to the data input terminals of the LC1 condition register 306, the LC condition regis-ter 308, and the LC condition register 310. In the pre-ferred embodiment, the clear inputs to each of the three local condition registers 306, 308, and 310 are tied to their respective data input terminals to insure that the Q outputs of the registers are set to a logical O when a low input is supplied by set decoder 314 to the appropriate data input terminal responsive to the signals appearing on data/control line 168, 170 (bits 4 and 5). Moreover, to insure that signals appearing at the preset inputs to the three condition registers 306, 308, 310 do not influence the operation of the regis-ters, the preset inputs to each condition register is tied to the potential $V_{cc}$.

The enable signal for set decoder 314 is obtained from the output of a two input NAND gate 316, the function of which is to enable the set decoder 314 to set the appropriate local condition register 306, 308, 310 only when the condition tested by condition selec-tor 312 is true. Two input to NAND gate 316, are re-spectively, the Q output of condition selector 312 which is high only if the condition tested is true, and the output of a two input NOR gate 318.

Figure 27:
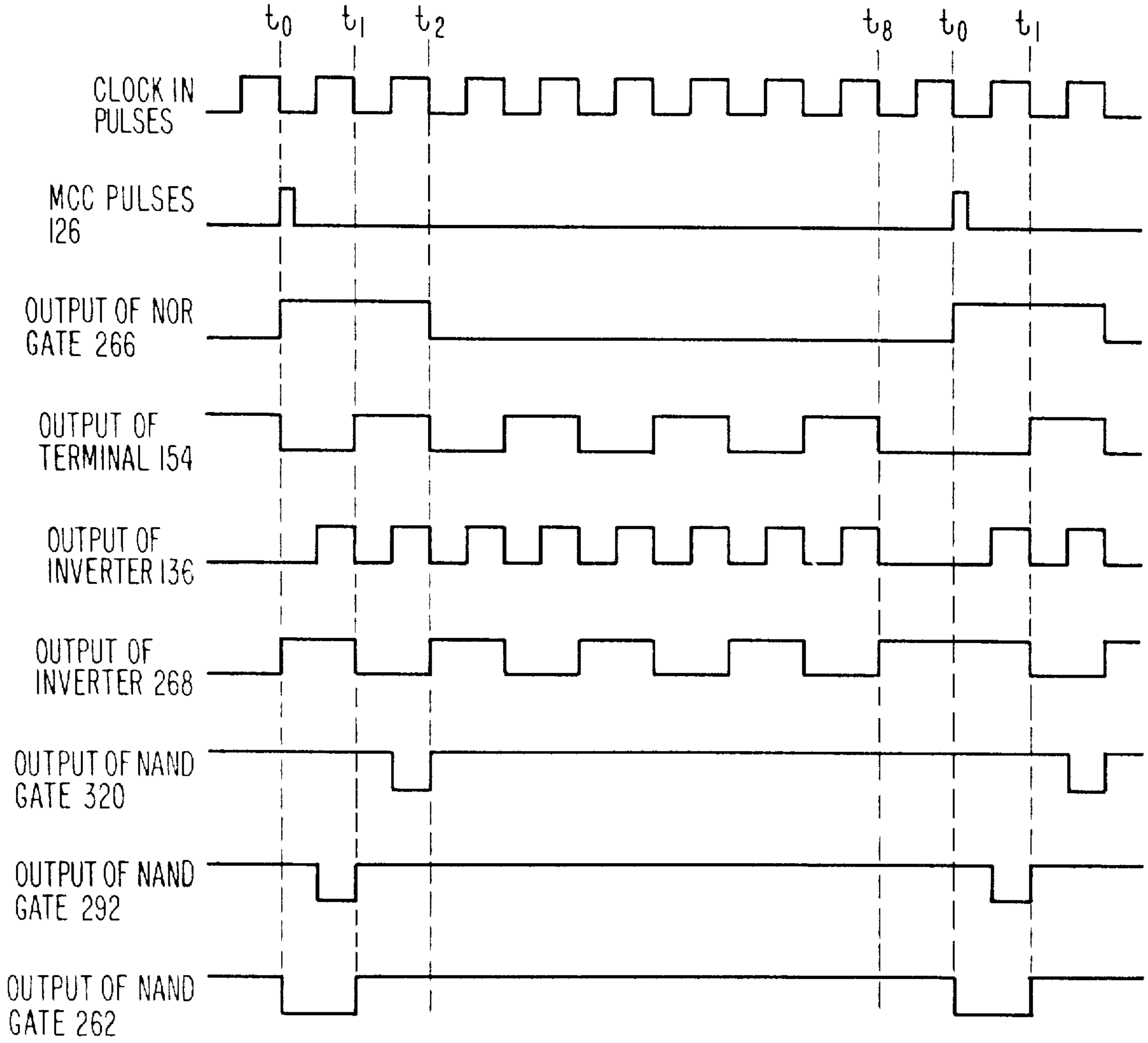
FIG. 27 is a timing chart of various clock control pulses generated by the programmable unit of the present invention.

The function of NOR gate 318 is to provide a high level signal only during the second clock time (time $t_2$) for the execution of a condition test instruction 66. The two inputs to NOR gate 318 are, respectively, the out-put of NAND gate 284 which is low only when a condi-tion test instruction 66 is executed, and the output of a three input NAND gate 320. The function of the NAND gate 320 is to provide a low level signal only during the second clock when a condition test instruc-tion 66 is being executed by the programmable unit 10. The three inputs of the NAND gate 320 are, respec-tively, the output of the NOR gate 266, the output of the least significant digit terminal 154 of the hexadeci-mal counter 134, and the output of the inverter 136. Analysis of FIG. 27 will reveal that these three inputs to NAND gate 320 will cause a low to appear at the output of NAND gate 320 only during the second clock which occurs after the application of a MCC pulse 126.

As discussed, of the eight possible conditions which can be tested by the programmable unit 10, only the three local conditions (LC1, LC2, LC3) are reset upon testing. To accomplish this operation a reset decoder 322 is employed. Reset decoder 322 is structurally and logically identical to the set decoder 314. Analysis of a condition test instruction 66 will reveal that bits 2 and 3 of that instruction specify which local condition regis-ter 306, 308, 310 is to be tested, while bit 1 of that type instruction specifies that a local condition is to be tested. Thus, the two control inputs to reset decoder 322 are, respectively, the signal appearing on data/con-trol line 164 (bit 2) and the signal appearing on data/-control line 166 (bit 3).

The enable signal for reset decoder 322 is obtained from the output of the two input NAND gate 324. The function of NAND gate 324 is to enable the reset de-coder 322 only when a local condition is tested. The two inputs, therefore, to NAND gate 324 are, respec-tively, the signal appearing on data/control line 162 (bit 1) and the output of the NOR gate 318 which is high only during the second clock when a condition test instruction 66 is executed.

The three outputs of reset decoder 322 are con-nected, respectively, to the clock input terminal of the local condition registers 306, 308, 310. In operation, reset decoder 322 will provide a clock signal to the ap-propriate local condition register 306, 308, 310, when a local condition is selected to be tested by condition test instruction 66.

Figure 13:
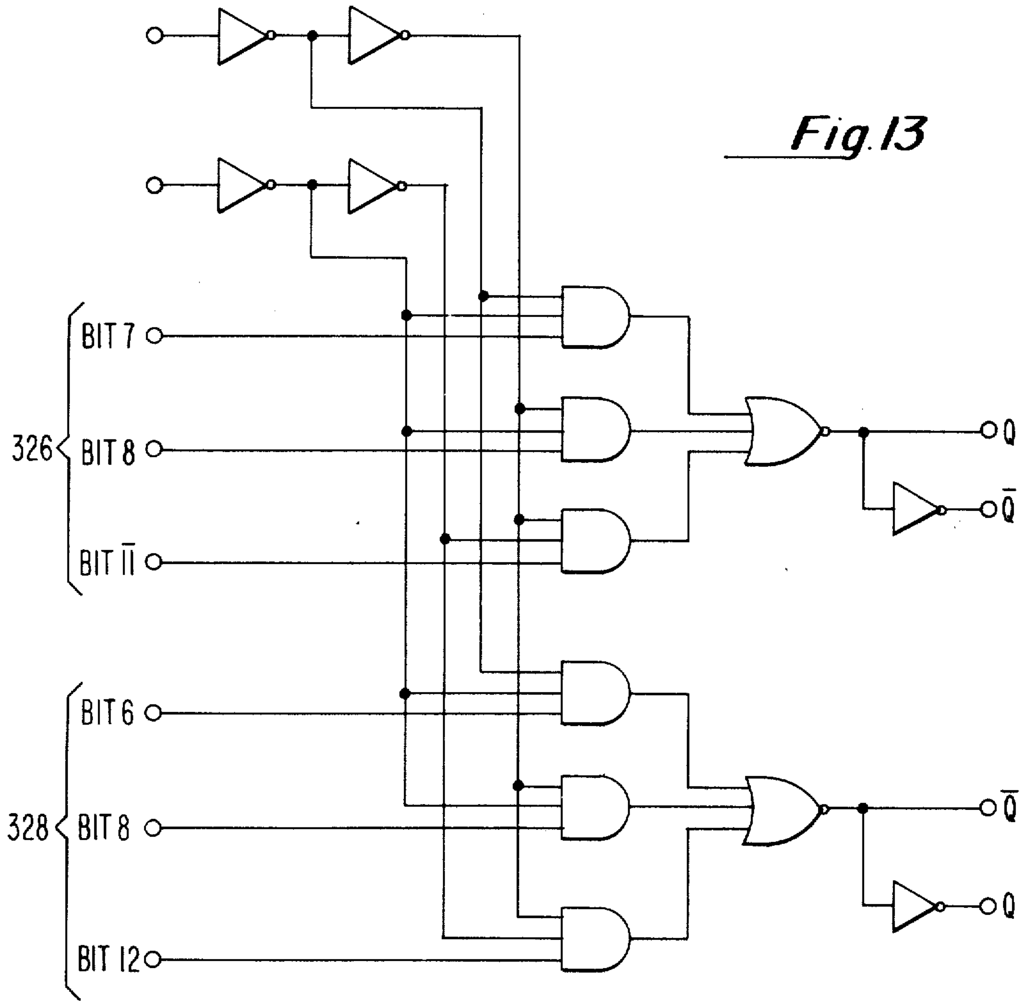
FIG. 13 is a logic diagram for a data selector employed in the programmable unit of the present invention.

With regared to successor selection, a successor se-lector 324 is employed. In the preferred embodiment, successor selector 324 comprises two three-channel data selectors 326, 328, see FIG. 13, with two common control lines. Each of the two three-channel data selec-tors has three data inputs and complementary outputs.

The two control signals for the successor selector 324 are, respectively, the complement of the output of con-dition selector 312, and the output of the NAND gate 284. The three data inputs to data selector 326 are, respectively, the signal appearing on data/control line 174 (bit 7), the signal appearing on data/control line 180 (bit 9), and the complement of the signal appearing on data/control line 184 (bit 11) which is obtained from the output of the inverter 198. The three data inputs for data selector 328 are, respectively, the signal appearing on data/control line 172 (bit 6), the signal appearing on data/control line 176 (bit 8), and the signal appearing on data/control line 186 (bit 12).

In the preferred embodiment, when the output of the AND gate 284 is low, and the complement of the output of condition selector 312 is high, then the true (Q) output of the three-channel data selector 326 will be the signal appearing on data/control line 176 (bit 8), while the Q output of the other three-channel data selector 328 will the be signal appearing on data/control line 180 (bit 9). If, however, the complement of the output of condition selector 312 is low while the output of NAND gate 284 is low, the signal at the Q output of the three-channel data selector 326 will be the signal appearing on data/control line 172 (bit 6), while the signal appearing at the Q output of the other three-channel data selector 328 will be the signal appearing on data/control line 174 (bit 7). Should the output of the NAND gate 284 be high, the signal at the Q output of the first three-channel data selector 326 will be the signal appearing on data/control line 186 (bit 12) while the signal appearing at the Q output of the other three-channel data selector 328 will be the complement to the signal appearing on data/control line 184 (bit 11) irrespective of the control signal output to successor selector 324 from the condition selector 312.

From this arrangement, the successor selector 324 provides as its output, the signals which represent bits 6 through 9 of any condition test instruction which is executed by the programmable unit 10. Whenever a condition test instruction is not being executed by the programmable unit 10, successor selector 324 provides at its output the signal which represent bits 11 and 12 of the instruction then being executed. Analysis of the possible outputs of successor selector 324 in responsive to the control signals applied, reveals that for any condition test instruction 66 executed by the programmable unit 10, the output of successor selector 324 will define a true successor if the condition selected by condition selector 312 tests true, while the output of the successor selector 324 will specify the appropriate false successor specified by a condition test instruction 66, if the condition tested by condition selector 312 proves false.

The true output of the three-channel data selector 326 of successor selector 324 is supplied as an input to a three input NAND gate 330, while its complement is applied as an input to a three input NAND gate 332. The true output of the three-channel data selector 328 is applied as an input to a three input NAND gate 334, while its complement is applied as the second input to NAND gates 330 and 332. The third input to both NAND gates 330 and 334 is from the output of the NOR gate 318 which is high only during the second clock when a condition test instruction 66 is being executed by the programmable unit 10. The third input to NAND gate 332 is from the output of the inverter 290 which is high only during the first clock for the execution of any instruction retrieved from memory 160.

Figure 26B:
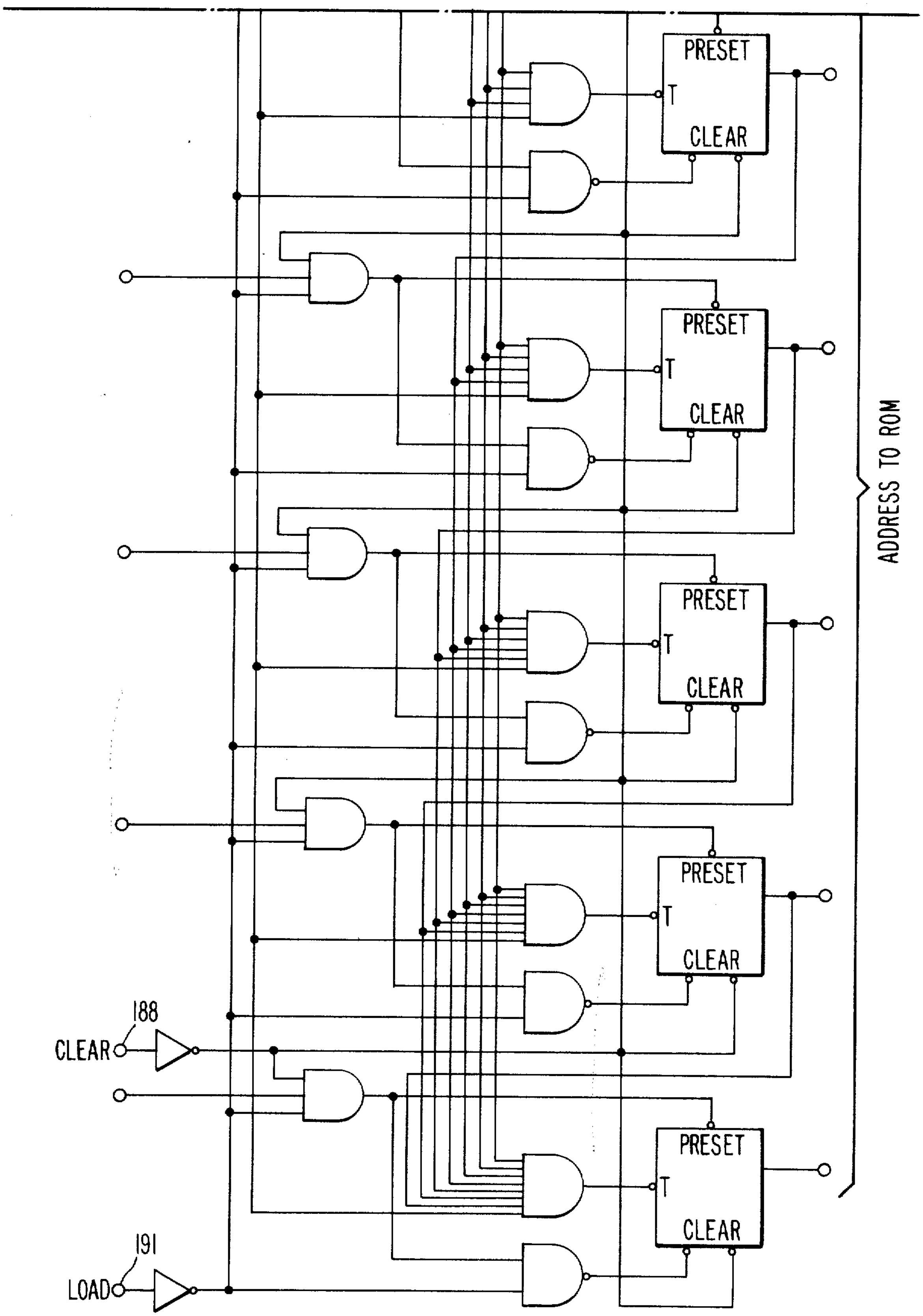
FIG. 26 comprises FIG. 26*a* and FIG. 26*b* which together in side by side relationship provide a logic diagram for a synchronous 8-bit up counter employed in the programmable unit of the present invention.

The function of the NAND gate 332 is to decode a JUMP successor while the function of NAND gate 330 is to decode a SKIP successor. A SAVE successor is decoded by NAND gate 334. The output of NAND gate 332 is applied as the load control signal to the load terminal 191 of the MPCR register 44, see FIG. 26.

The MPCR register 44 is an 8-bit up-counter comprised of eight master-slave flip-flops. Synchronous operation is provided by having all flip-flops of the up-counter clocked simultaneously so that the outputs of the flip-flops change coincidentally with each other when so instructed by the steering logic. This mode of operation eliminates the output counting spikes which are normally associated with asynchronous (ripple-clock) counters. The outputs of the eight master-slave flip-flops of the MPCR register 44 are triggered by a low-to-high-level transition appearing on the count up input 190.

The MPCR register 44 is fully programmable; that is, the outputs may be preset to any state by entering the desired data at the appropriate data inputs while the load input terminal 191/is low. The eight outputs of the MPCR register 44 will change to agree with the data inputs independently of the count pulses.

In addition, a clear input has been provided which forces all eight outputs of the MPCR register 44 to a low level when a high level is applied to the clear input terminal 188 of the MPCR register 44. The clear function is independent of the count and load inputs 190, 192, respectively. The clear signal 128, which is necessary to set the MPCR register 44 to zero address, is provided a clear terminal 502 for the programmable unit 10. Thus, externally provided clear signals 128 can be applied to the MPCR register 44 via the clear terminal 502.

With this arrangement, if NAND gate 332 decodes a JUMP successor from the output of successor selector 324, a low level signal will be applied at the load terminal 191 of the MPCR register 44 only during the first clock pulse (time $t_1$) when a condition test instruction 66 executed: At all other times and for all other instructions the output of the NAND gate 332 and, therefore, the input to the load terminal 191 of the MPCR register 44 will be high. Thus, when the control pulse to the load terminal 192 is at a low level, the address specified by the AMPCR register 32 will be loaded into the MPCR register 44 independent of the control signals applied to the count up terminal 190 of the MPCR register 44. Thus, when a JUMP successor is specified, as either the true or false successor, the address specified in the AMPCR register 32 will become the address of the next instruction to be executed by the programmable unit 10.

To execute a SKIP successor, the output of the NAND gate 330 is applied as an input to a two input NAND gate 336, the output of which is applied to the count up terminal 190 of MPCR register 44. The second input to NAND gate 336 is from the output of the NAND gate 292, which is low only during the first clock (time $t_1$) for any instruction executed by the programmable unit 10. Thus, the NAND gate 336 will provide a low-to-high-level transition at the count up terminal 190 of the MPCR register 44 at time $t_1$ for any instruction executed by the programmable unit 10 and at time $t_2$ if a SKIP successor is specified by a condition test instruction 66.

Note, irrespective of the output of the NAND gate 330, the output of the NAND gate 336 will be high at time $t_1$, due to the time pulses decoded by the NAND gate 292. Thus, the function of the NAND gate 336 is to implement the STEP succesor function, irrespective of the type of condition that is executed by the programmable unit 10 by causing the contents of the MPCR register 44 to be incremented by 1. This STEP feature will not interfere with a JUMP successor, since the control signal for a JUMP successor is applied to the load terminal 191 which overrides any signals applied to the count-up terminal 190.

Figure 30K:
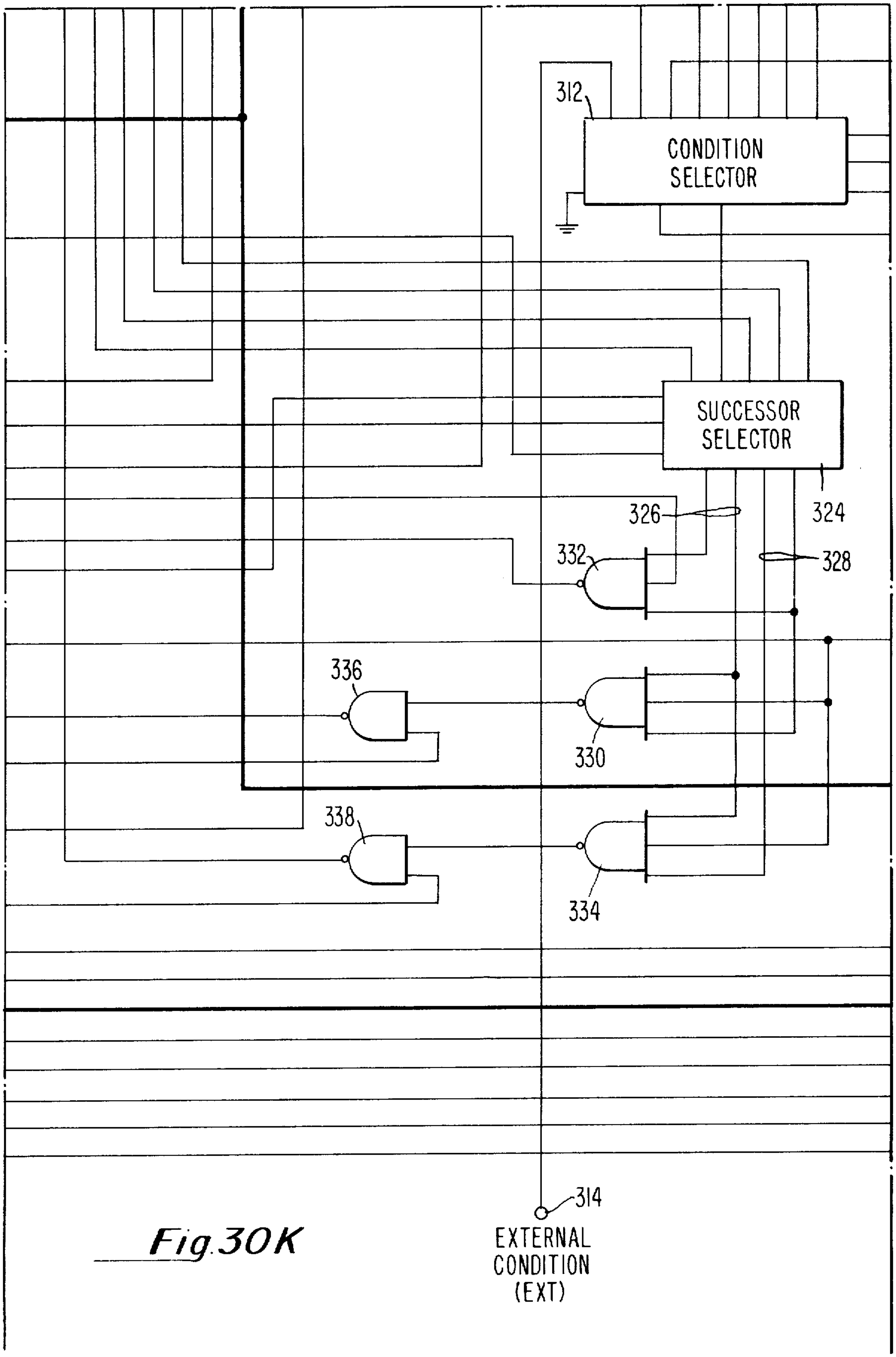
Figure 30L:
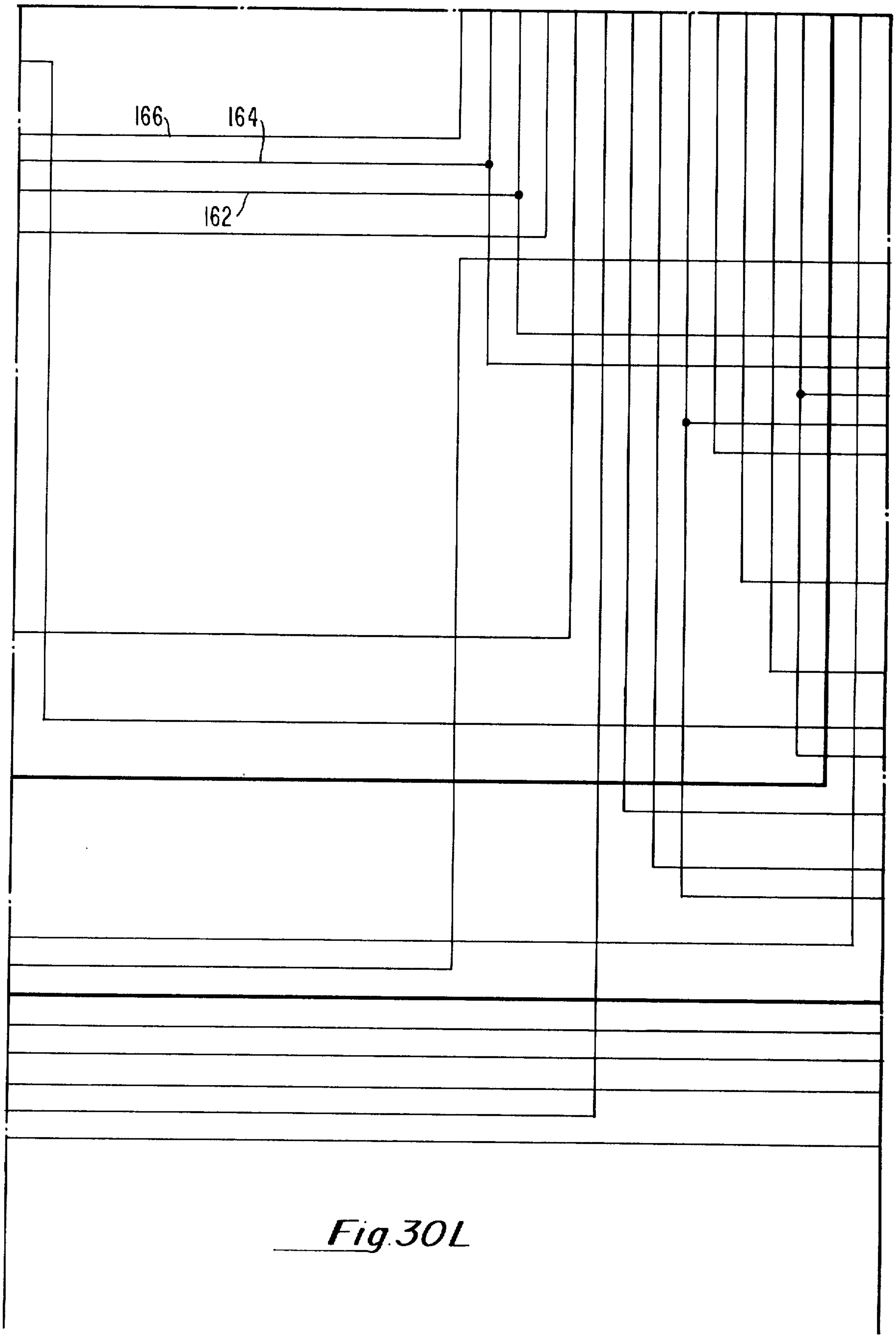
Figure 30M:
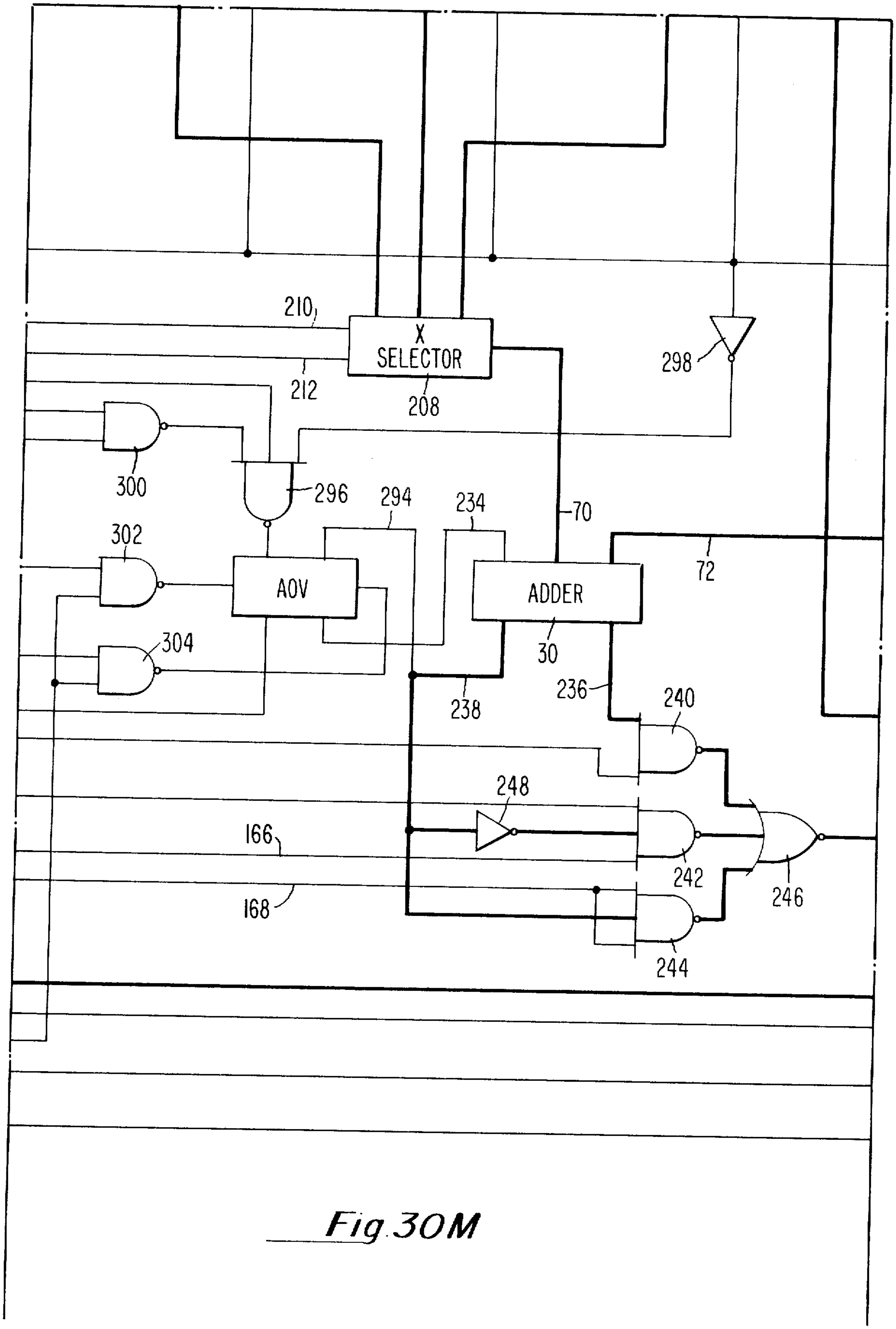

To implement a SAVE successor, the output of the NAND gate 334 is applied as an input to a two input NAND gate 338, the output of which is applied to a load terminal 340 of the AMPCR register 32, see FIG. 30k. The second input to the NAND gate 338 is from the output of an inverter 342 the input of which is obtained from the output of a two input NOR gate 344.

The function of the NOR gate 344 is to decode a GO TO LITERAL instruction 64c and a LITERAL TO AMPCR instruction 64*a*. Analysis of the command codes for the different types of instructions which can be executed by the programmable unit 10 will reveal that only the above-two instructions have a binary 0 for bit 12 of their respective instruction. The data and clock inputs, therefore, to the NOR gate 344 are, respectively, the signal appearing on data/control line 186 (bit 12) and the output of the NAND gate 142, which is low only for the duration of a MCC pulse 126.

The output of the NAND gate 338 will cause the AMPCR register 32 to be loaded at time $t_0$ with the selected output of the selector 192 whenever a GO TO LITERAL instruction 64*c* or a LITERAL TO AMPCR instruction 64*a* is specified by a literal instruction 64. In addition, the output of the NAND gate 338 will cause the AMPCR register 32 to be loaded at time $t_2$ with the output of the selected output of the selector 192 whenever a SAVE successor is decoded by successor selector 324 and the SAVE decode NAND gate 334. At all other times (e.g., $t_1$ and $t_3$ through $t_8$) the output of the NAND gate 338 is low.

Figure 28B:
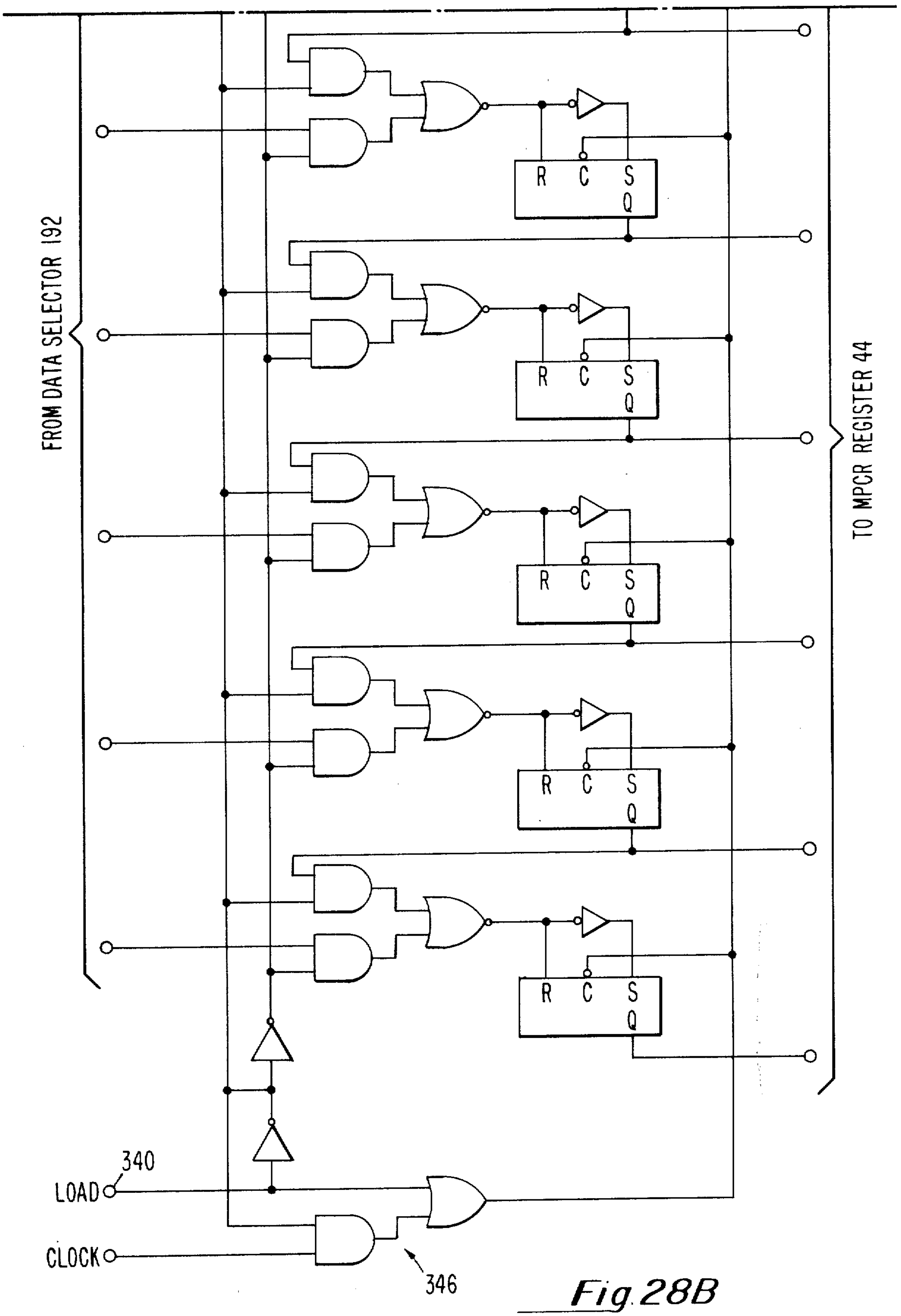
FIG. 28 comprises FIG. 28*a* and FIG. 28*b* which together in side by side relationship is a logic diagram for an 8-bit parallel-in parallel-out register employed in the programmable unit of the present invention.

In the preferred embodiment, the AMPCR register 32 is an 8-bit right shift register which is also used as a parallel-in, parallel-out storage register, see FIG. 28. Aside from the eight data inputs and outputs and the load control input 340, the AMPCR register 32 is provided with a serial in input terminal and a clock control terminal.

The AMPCR register 32 is comprised of eight R-S master-slave flip-flops, eight AND-OR-INVERT gates, one AND-OR gate 346, and 10 invertersdrivers. Interconnection of these functions provide a versatile register which will perform a right-shift operation upon the application of the proper logic input to its load control input terminal 340.

Clocking signals for the AMPCR register 32 are provided by the output of the two input NOR gate 214. As discussed, one of the inputs to the NOR gate 214 is from the output of the NAND gate 204, which provides the clocking pulses necessary for the execution of a logic unit instruction 68. The other input to the NOR gate 214 is from the output of the NAND gate 232, which is low only when the AMPCR register 32 is specified as the destination register by a logic unit instruction 68.

Each AND-OR-INVERT gate of the AMPCR register 32 is comprised of two AND gates denominated AND gate 1 and AND gate 2. When a logic ZERO level is applied to the load control input terminal 340 of the AMPCR register 32, the number 1 AND gates are enable and the number 2 AND gates are inhibited. In this mode of operation, the output of each R-S flip-flop is coupled to the R-S inputs of the succeeding flip-flop and a right-shift operation is performed by clocking at the clock input. In addition, serial data is entered at the serial in input, while the eight parallel inputs are inhibited by the number 2 AND gates.

When a logical ONE level is applied to the load control input 340, the number 1 AND gates are inhibited (decoupling the outputs of succeeding R-S inputs to prevent right shift) and the number 2 AND gates are enabled to allow entry of data through the eight parallel inputs. This mode of operation permits parallel loading of the AMPCR register 32.

Clocking for the shift register is accomplished by the AND-OR gate 346, which permits the clock-source to be used only for the shift right mode of operation. Information must be present at R-S inputs of the master-slave flip-flops prior to clocking. Transfer of information to the Q-output terminal of the eighth flip-flop of the AMPCR register 32 occurs when the clocking input goes from a logical 1 to a logical 0.

Thus, when the AMPCR register 32 is specified as the destination register by the destination field 114 of a logic unit instruction 68, the serial output of the adder 30 will be applied to the serial in input of the AMPCR register 32 via the NOR gate 246, with clocking for this operation provided by the output of the NOR gate 214. On the other hand, for the execution of a SAVE successor or a GO TO LITERAL or LITERAL TO AMPCR instruction, the eight data inputs of the AMPCR register 32 will receive in parallel the appropriate output of the selector 192 in response to the load control signals provided by the NAND gates 338, 334.

The parallel inputs for the AMPCR register 32 are determined by the signal appearing at the control terminal 194 of the selector 192. The control signal for the control terminal 194 of the selector 192 is obtained from the output of the NAND gate 284, which is a low level only when a logic type instruction 68 is being executed by the programmable unit 10. Thus, whenever a logic type instruction is being executed by the programmable unit 10, selector 192 will provide as the parallel inputs for the AMPCR register 32, the output of the MPCR register 44. For all other instructions, the selector 192 will provide as the input to the MPCR register 44 the signals appearing, respectively, on data/control lines 162–176 (bits 1 through 8).

Literal Instruction

The circuitry relating to LITERAL TO AMPCR instruction 64a and the GO TO LITERAL instruction 64c have been discussed in connection with a portion of the circuitry relating to the execution of a condition test instruction 66. The circuitry relating to the remaining literal instruction, namely, LITERAL TO B instruction 64b will now be discussed.

A LITERAL TO B operation is decoded by a four-input NAND gate 348 the output of which is applied as the control signal to the shift/load input terminal of the B register 28, see FIG. 17. Two of the four inputs to the NAND gate 348 are, respectively, the signals appearing on data/control lines 182 (bit 9) and 186 (bit 12), see FIG. 30g. The third input to the NAND gate 348 is obtained from the output of the inverter 290, which is high only during the period of the first clock pulse, see FIG. 27. The remaining input to NAND gate 348 is from the output of a two input NOR gate 350.

The function of the NOR gate 350 is to decode the remaining two bits (bit 10 and 11 of the command code for a LITERAL TO B instruction 64b. The two inputs, therefore, to the NOR gate 350 are, respectively, the signal appearing on data/control line 182 (bit 10) and the complement of the signal appearing on data control line 184 (bit 11) which is obtained from the output of inverter 198.

From this arrangement, the NAND gate 348 will only provide a low level signal to the shift/load input terminal of the B register 28 when a LITERAL TO B instruction **64*b* is specified by a literal instruction 64.** Analysis of the operation of the B register will reveal that when a low level signal is applied to the shift/load terminal of that register, data at the eight parallel inputs of the B register is loaded directly into the register independently of the state of the clock control pulses applied.

Thus, when a LITERAL TO B instruction **64*b* is specified, the literal value portion of the instruction is parallel loaded into the B register 28 when the NAND gate 348** decodes the proper command code.

Figure 30N:
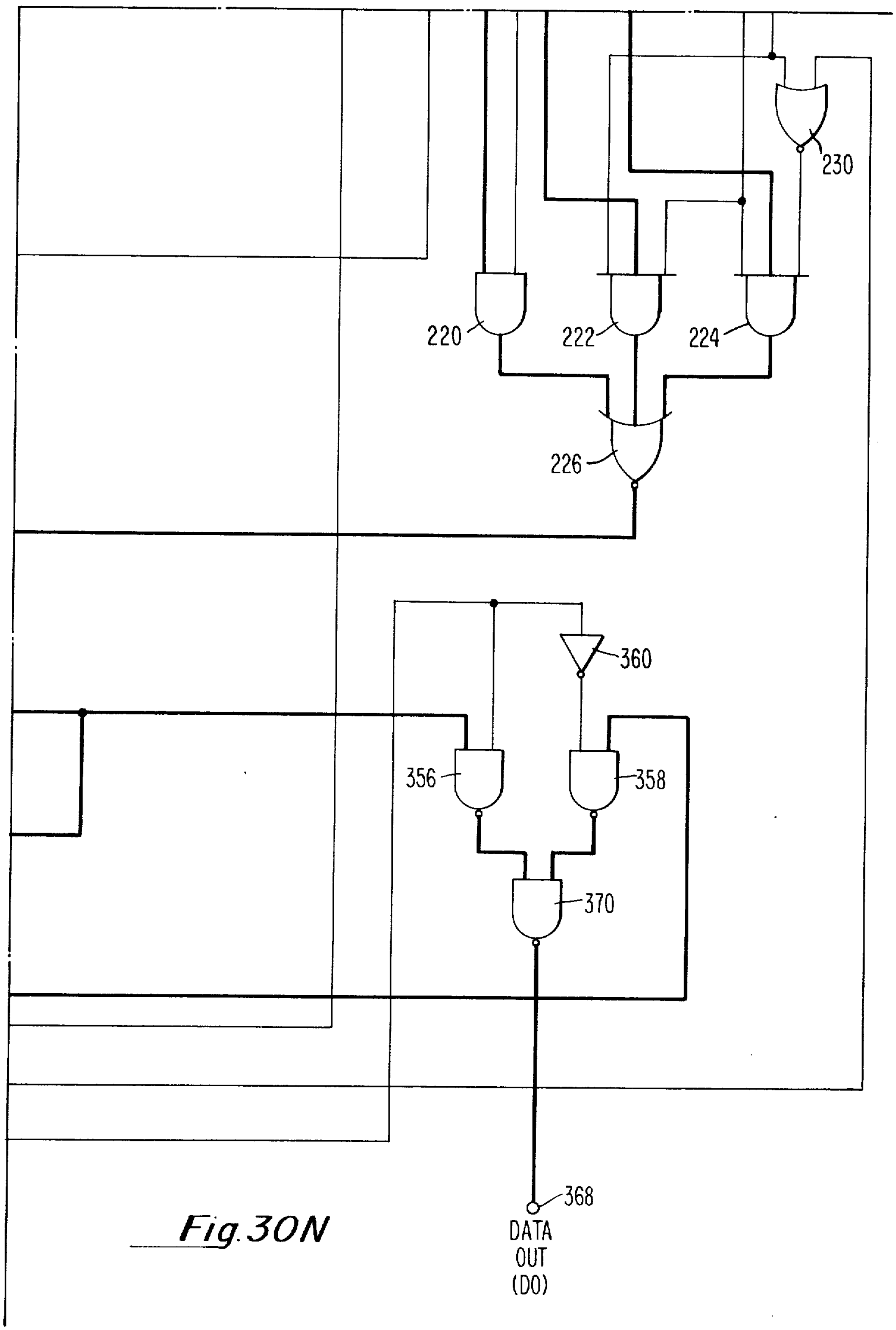

With this arrangement, the output of the NAND gate 352 will be low only when a DEV type instruction 118 is to be executed by the programmable unit 10. The output of the NAND gate 352 is applied as an input into a two input NAND gate 356, while the complement of the output of NAND gate 352 is applied as an input into a two input NAND gate 358. The complement of the output of NAND gate 352 is provided by an inverter 360, see FIG. 30n.

Figure 29:
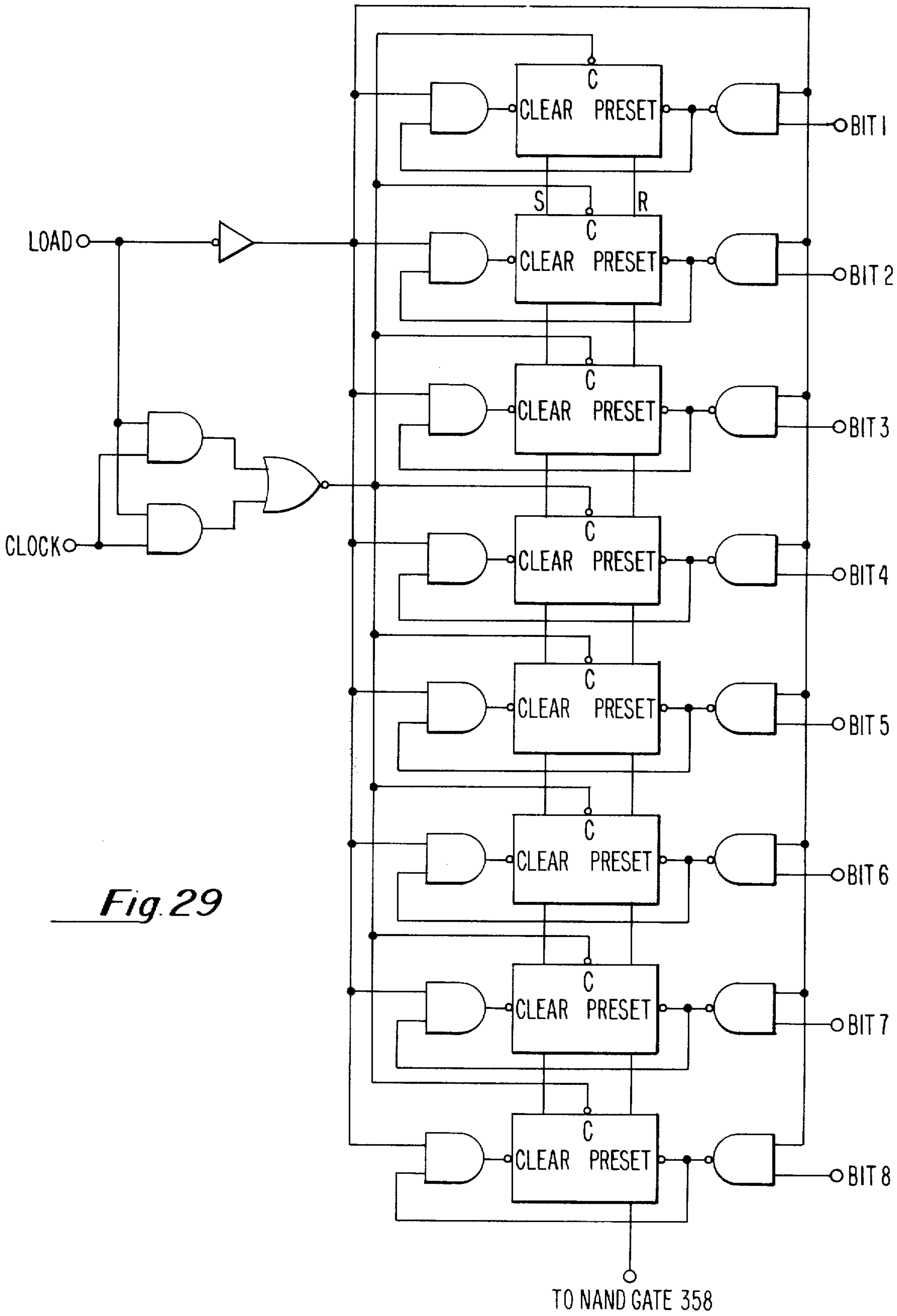
FIG. 29 is a logic diagram for a parallel-in serial-out eight-bit shift register employed in the programmable unit of the present invention.

The other input to the NAND gate 356 is from the output of the NOR gate 246 which gates the appropriate output of the adder 30, while the second input to the NAND gate 358 is from the serial output of a device register 362, see FIG. 29. The device register 362 is shown as a buffer 364 in FIG. 2. The outputs of NAND gates 356, 358 are applied as inputs to a two input NOR gate 370.

The device register 362 is an 8-bit parallel to serial shift register which shifts the data to the right when clocked. The eight inputs to the device register 362 are, respectively, the signal appearing on data/control lines 162–176 (the first eight bits of each instruction). A control signal for parallel loading the device register 362 is obtained from the output of the NAND gate 142 which gates the MCC pulses 126 to the count up terminal 146 of the hexadecimal counter 134. Clocking for the device register 362 is obtained from the output of the NAND gate 132, which gates CLOCK IN pulses for the programmable unit 10, see FIG. **30*b*.**

In operation, when a MCC pulse is applied to the programmable unit 10 at time $t_0$, the device register 362 is parallel loaded with the first eight bits of the instruction addressed by the MPCR register 44. AT times $t_1$ through $t_8$, the contents of the device register 362 are serially applied as an input to the NAND gate 358 (bit 8 first).

Since the DEV instruction decode NAND gate 352 is low only when a DEV instruction 118 is to be executed, the function of the NAND gate 358 is to gate to a DATA OUT terminal 368 of the programmable unit 10 the literal value portion 120 of a DEV instruction 118 via the NOR gate 370. On the other hand, the NAND gate 356 will always gate to the DATA OUT terminal 368 via the NOR gate 370, the appropriate output of the adder 30 via the NOR gate 246, except when a DEV instruction is specified.

External Control Lines

The 4 bit external control lines 90, which are used to aid in the flow of information into and out of the programmable unit 10, are provided by two of the twelve data/control lines and the outputs of two NAND gates 373, 374, respectively. The signals appearing on data/control lines 180 (bit 9) and 182 (bit 10) are provided as external control output signals, which can be obtained from output terminals 376, 378, respectively, of the programmable unit 10. The signals appearing on the external control output terminals 376, 378 of the programmable unit 10 indicate to the outside world (e.g., a peripheral device) which register, OUT O, OUT 1, OUT 2, or OUT 3 is specified during a logic unit instruction 68. These two signals are actually the 9th and 10th bits of the instruction word.

The remaining two external control bits are obtained from the outputs of the NAND gates 372, 374, respectively. The function of the NAND gate 372 is to provide an external control bit A only when a OUT destination is specified or when a DEV type instruction 118 is executed by the programmable unit 10. These two external control bits A and B can be obtained from output terminals 376, 378, respectively, of the programmable unit 10.

In the preferred embodiment, the four possible combinations of the external control bits A and B indicate the following: 1) bit A = 0, bit B = 0 indicates no externally significant instruction being executed; 2) bit A = 0, bit B = 1 indicates a BEX type instruction; 3) bit A = 1, bit B = 0 indicates a OUT type instruction; and 4) bit A = 1, bit B = 1 indicates a DEV type instruction 118.

Each NAND gate 372, 374 has two inputs, see FIG. **30*h*. One input into each NAND gate 372, 374 is from the output of the NAND gate 352, which is low only when a DEV type instruction 118 is being executed by the programmable unit 10. The other input to NAND gate 372 is from the output of a two input NAND gate 380. The two input to the NAND gate 380 are, respectively, the output of the inverter 206 which is high only when a logic type instruction 68 is being executed, and the output of the NOR gate 256 which is high only when a OUT destination is specified. Thus, the function of the NAND gate 380 is to provide a low level signal as an input to the NAND gate 372 only when a OUT destination is specified by the destination field 114 of a logic unit instruction 68. With its respective inputs, the NAND gate 272 will provide a high level signal (external control bit A) only when a DEV type instruction 118** is executed or a OUT destination is specified.

The second input to the NAND gate 374 is from the output of a two input NAND gate 382. The two inputs to the NAND gate 383 are, respectively, the output of the inverter 206, the output of a two input NOR gate 384. The two inputs to the NOR gate 384 are, respectively, the signal appearing on data/control line 176 (bit 8), and the complement of the signal appearing on data/control line 174 (bit 7), which is obtained from the output of the inverter 234.

In operation, the NOR gate 384 will provide a high level signal only when a "BEX" type destination is specified. This high level signal will be gated by the NAND gate 383, to provide a low level signal input for the NAND gate 374. Thus, the NAND gate 374 will ıly provide a high level signal (external control bit B) . output terminal 388 of the programmable unit 10 hen either a BEX type destination or a DEV type inruction is specified.

ddressing

In response to the instruction address at the output f the MPCR register 44, the memory 160 will provide ıe appropriate 12 bit instruction word at the input of ıe instruction register 500, see FIG. 30a. As briefly iscussed, instruction register 500 is a twelve bit paral-l-in parallel-out storage register which transfers forıation to the output terminals when a clock input for ıe register 500 goes from a high level to a low level. he twelve inputs to the instruction register 500 are om the memory 160 while the twelve outputs of the ıstruction register provide the data/control signals for nes 162–186. Clocking for the instruction register is rovided by the output of the inverter 156 which proides last pulse signals 122 to the last pulse output terıinal 158 of the programmable unit 10. Note, analysis f the output of the hexadecimal counter 154 will reeal that a high level to a low level signal transition will ccur at the clock control terminal of the instruction egister only at time $t_8$. Thus, a new instruction will not e loaded into the instruction register 500 until the preious instruction has been completely executed by the rogrammable unit 10.

nput and Output Terminals

By implementing work functions in microprogram, ll necessary control and data signals are stored in nemory thereby eliminating unnecessary connections vith the external environment. In the preferred emodiment, twelve connections to the external environnent are provided. Five terminals, namely the DATA N terminal 280, the CLOCK IN terminal 130, the MCC terminal 140, the MPCR CLEAR terminal 502, nd the EXTERNAL CONDITION terminal 314 are rovided for control and clock signals to the programnable unit 10. Signal provided by the programmable nit 10, namely, the CLOCK OUT terminal 138, the LAST PULSE terminal 158, the DATA OUT terminal 368, and the four external control bit terminals 376, 378, 386, 388 provide control and data signals for inorming the external environment as to the status of the rogrammable unit 10. Two additional connection terninals are required for supplying the necessary electrical power when the programmable unit 10 is implenented with LSI tecchnology. These two additional terminals are shown as "VOLTAGES" and "GROUND" in FIG. 2.

General

Although a programmable read only memory has been discussed, micromemory 14 (see FIG. 2) can be any suitable type microprogram memory. When considering LSI implementation with a ROM type memory, a read-write type memory can first be used to develop the optimum program for a given work function. From this optimum program, a bit pattern for a ROM type memory can be generated and incorporated with the non varying logical portion of the processing unit which then can be implemented as a single LSI chip.

Moreover, while only an instruction set comprising literal, logic, condition and DEV type instructions has been disclosed, any modifications through addition or deletion to the instruction set will not change the basic structure and design considerations involved. Employing a soft-hardware or soft-machine design through microprogramming technique, circuitry can be easily added or deleted to execute the additional or deleted operations specified by the modifications. Furthermore, additional memory capability as well as instruction work length modification are facilitated by a soft-machine architecture, since the necessary modifications to the specific circuitry are essentially modular in nature.

From the above description, it will be recognized that a processor is provided by the present invention which permits implementation with LSI technology. The design of the programmable unit has the advantage that all circuitry represents minimally committed logic, which becomes committed to a specific task by control signals which originate in the microprogram. If the microprogram is stored in a ROM type memory which is integral with the processing unit described, the numbers of external connections required is greatly reduced.

Thus, while the invention has been particularly shown and described with reference to a preferred embodiment thereof, it will be understood by those skilled in the art that various changes in form and details may be made therein.

What is claimed is:

1. An apparatus for processing data in accordance with a stored program comprising:

memory means for storing a plurality of microinstructions, each of said microinstructions including control information;

a serial input bus for receiving information bits to be processed;

a serial output bus for transferring processed information bits from said processor;

means connected between said buses and coupled to said memory means for accessing at least one of said plurality of microinstructions and providing said control information; and at least one logical unit connected between said buses and responsive to said provided control information received in parallel from said means for accessing for serially performing logical operations on information bits received by said input bus.

2. An apparatus according to claim 1 wherein said means for accessing includes:

control means for generating gating pulses;

first means responsive to said control means for selectively retrieving from said memory means said at least one of said plurality of microinstructions from said memory means; and second means coupled to said first means and responsive to certain of said gating pulses for decoding said retrieved instruction.

3. An apparatus according to claim 2 wherein said first means includes;

a unique serial path connecting said input bus to said output bus, said unique path including a first register for receiving address information bits for said memory means;

a second register connected between said first register and said memory means for addressing said memory means, said second register receiving address information bits in parallel from said first register;

a first parallel path from said second means to said first register, said first parallel path including a selection gate;

a second parallel path from said second register to said selection gate; and second control means coupled to said selection gate and said first register and responsive to certain of said provided control information for loading in parallel said first register with decoded information provided by said second means or the contents of said second register to allow repeated retrieval of said at least one of said plurality of microinstructions addressed by said second register or to allow retrieval of a microinstruction specified by said at least one of said plurality of microinstructions or for loading serially said first register with address information bits communicated by said unique serial path.

4. An apparatus according to claim 1 wherein said logical unit includes;

first register means connected to said input bus for storing said received information bits within said apparatus;

an arithmetic unit having a first and second input;

first gating means connected between said first register means and said arithmetic unit for selectively communicating said stored received information bits to said first input of said arithmetic unit, said arithmetic unit performing arithmetic manipulations on said stored received information bits;

second register means connected to said second input of said arithmetic unit for storing said manipulated received information bits within sid apparatus; and second gating means connected between said output bus and said arithmetic unit for selectively communicating said manipulated received information bits from said arithmetic unit to said output bus or said second register means.

5. A programmable data processor comprising:

a source of microinstructions, each of said microinstructions including control information;

a serial input bus for receiving information bits to be processed;

a serial output bus for transferring processed information bits;

means connected between said buses for selectively retrieving from said source of microinstructions at least one of said plurality of microinstructions;

control means coupled to said source of microinstructions and connected between said buses for providing in parallel said control information by decoding said at least one of said plurality of microinstructions;

an arithmetic unit;

a plurality of serial data paths from said input bus to said output bus, each of said paths including at least one register means and said arithmetic unit; and means coupled to each of said one register means and responsive to said provided control information received in parallel from said control means for transferring said received information bits to said output bus.

6. In a data processing system including a plurality of input and output registers, an apparatus for processing data in accordance with a stored program comprising:

a serial input bus for receiving information bits to be processed;

a serial output bus for transferring processed information bits;

memory means for storing a plurality of microinstructions, each of said microinstructions having control information;

means coupled to said input bus and said memory means for accessing at least one of said plurality of microinstructions;

means coupled to said memory means and said plurality of input and output registers and responsive to a portion of said control information provided by said at least one of said plurality of microinstructions for controlling transfer of information bits from said plurality of input registers to said input bus and from said output bus to said plurality of output registers; and a logic unit connected between said buses and coupled to said memory means for performing logical operations on said received information bits responsive to another portion of said control information of said provided at least one of said plurality of microinstructions.

7. An apparatus for processing data in accordance with a stored program comprising:

memory means for storing a plurality of microinstructions, each of said microinstructions including control information, certain of said microinstructions including a data information portion;

a serial input bus for receiving information bits to be processed;

a serial output bus for transferring processed information bits;

address means coupled to said input bus and said memory means for selectively retrieving from said memory means at least one of said plurality of microinstructions, said retrieved at least one of said plurality of microinstructions including said data information portion;

decoding means coupled to said memory means for providing said control and said data information of said retrieved at least one of said plurality of microinstructions;

first register means coupled to said decoding means for storing said decoded data information;

an arithmetic unit;

second register means connected between said input bus and said arithmetic unit for storing said received information bits within said apparatus, said arithmetic unit performing arithmetic manipulations on said stored received information bits; and gating means connected between said output bus and said arithmetic unit and said first register means and responsive to said provided control information for selectively gating said stored decoded data information from said first register means or said manipulated received information bits from said arithmetic unit to said output bus.

8. A microprogrammable processor comprising:

a source of microinstructions, each of said microinstructions including control information;

a serial input bus for receiving command information and data information bits;

a serial output bus for communicating processed data information bits from said processor;

command means coupled to said input bus and said source of microinstructions and responsive to said received command information for selecting at least one microinstruction from said source of microinstructions; and a logic unit connected between said buses and coupled to said command means and responsive to said control information of said selected at least one microinstruction for performing logical operations on data information received by said input bus.

9. A microprogrammable processor comprising:

a single semiconductor chip; said chip having fabricated thereon;

memory means for storing a plurality of microinstructions, each of said microinstructions including control information;

a serial input bus for receiving information bits to be processed;

a serial output bus for communicating processed information bits from said processor;

address means connected to said input bus and said memory means for selectively retrieving from said memory means individual ones of said microinstructions; and a logic unit connected between said serial buses and coupled to said memory means for performing logical operations on said received information bits in accordance with said control information from each of said individual ones of said microinstructions.

* * * * *